US012615371B2

(12) United States Patent
Pfaff et al.

(10) Patent No.: US 12,615,371 B2
(45) Date of Patent: Apr. 28, 2026

(54) MIP FOR ALL CHANNELS IN THE CASE OF 4:4:4-CHROMA FORMAT AND OF SINGLE TREE

(71) Applicant: Fraunhofer-Gesellschaft zur Förderung der angewandten Forschung e.V., Munich (DE)

(72) Inventors: Jonathan Pfaff, Berlin (DE); Tobias Hinz, Berlin (DE); Philipp Helle, Berlin (DE); Philipp Merkle, Berlin (DE); Björn Stallenberger, Berlin (DE); Michael Schäfer, Berlin (DE); Benjamin Bross, Berlin (DE); Heiko Schwarz, Berlin (DE); Detlev Marpe, Berlin (DE); Thomas Wiegand, Berlin (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 0 days.

(21) Appl. No.: 19/015,151

(22) Filed: Jan. 9, 2025

(65) Prior Publication Data

US 2025/0150593 A1 May 8, 2025

Related U.S. Application Data

(63) Continuation of application No. 17/916,574, filed as application No. PCT/EP2021/058558 on Apr. 1, 2021, now Pat. No. 12,225,198.

(30) Foreign Application Priority Data

Apr. 2, 2020 (EP) .................................... 20167808

(51) Int. Cl.
*H04N 19/132* (2014.01)
*H04N 19/105* (2014.01)
(Continued)

(52) U.S. Cl.
CPC ......... *H04N 19/132* (2014.11); *H04N 19/105* (2014.11); *H04N 19/159* (2014.11); *H04N 19/176* (2014.11); *H04N 19/186* (2014.11)

(58) Field of Classification Search
None
See application file for complete search history.

(56) References Cited

U.S. PATENT DOCUMENTS

2008/0170627 A1   7/2008   Yamada
2017/0006293 A1   1/2017   Lee
(Continued)

FOREIGN PATENT DOCUMENTS

EP   1947860 A2   7/2008

OTHER PUBLICATIONS

Taiwanese Notice of Allowance, dated Jul. 31, 2025, TW International Application No. 114124679, filed Apr. 1, 2021.
(Continued)

*Primary Examiner* — Rebecca A Volentine
(74) *Attorney, Agent, or Firm* — Conley Rose, P.C.

(57) ABSTRACT

A video decoder includes one or more processors that are configured to: determine that a picture is in a 4:4:4 color sampling format, determine, based at least in part on an index signaled in a data stream, a matrix-based intra prediction (MIP) mode, decode a luma block of the picture using the MIP mode, determine, for a chroma block of the picture, whether a coding tree of the chroma block is a single tree, select an intra prediction mode for decoding the chroma block, and decode the chroma block using the selected intra prediction mode. The selected intra prediction mode is the MIP mode in response to the coding tree of the chroma block being the single tree, and the selected intra prediction mode is a planar intra prediction mode in response to the coding tree of the chroma block not being the single tree.

18 Claims, 15 Drawing Sheets

(51) Int. Cl.
    *H04N 19/159*      (2014.01)
    *H04N 19/176*      (2014.01)
    *H04N 19/186*      (2014.01)

(56)          References Cited

U.S. PATENT DOCUMENTS

2019/0149822 A1    5/2019  Kim
2022/0248017 A1*  8/2022  Lim ....................... H04N 19/70

OTHER PUBLICATIONS

Bross, Benjamin, et al., "Versatile Video Coding (Draft 8)", Joint Video Experts Team (JVET) of ITU-T SG 16 WP 3 and ISO/IEC JTC 1/SC 29/WG 11, Document: JVET-Q2001-vE, 17th Meeting: Brussels, BE, Jan. 7-17, 2020.

Chen, Jianle, et al., "Algorithm Description for Versatile Video Coding and Test Model 8 (VTM 8)", Joint Video Experts Team (JVET) of ITU-T SG 16 WP 3 and ISO/IEC JTC 1/SC 29/WG 11, Document: JVET-Q2002-v3, 17th Meeting: Brussels, BE, Jan. 7-17, 2020.

Pfaff, Jonathan, et al., "CE3: Affine Linear Weighted Intra Prediction (CE3-4.1, CE3-4.2)", Joint Video Experts Team (JVET) of ITU-T SG 16 WP 3 and ISO/IEC JTC 1/SC 29/WG 11, Document: JVET-N0217, 14th Meeting: Geneva, CH, Mar. 19-27, 2019.

Pfaff, Jonathan, et al., "MIP for All Channels in the Case of 4:4:4-Chroma Format and of Single Tree", Joint Video Experts Team (JVET) of ITU-T SG 16 WP3 and ISO/IEC JTC 1/SC 29/WG 11, Document: JVET-R0350-v1, 18th Meeting: Alpbach, AT, Apr. 15-24, 2020.

Sullivan, Gary J., et al., "New Standardized Extensions of MPEG4-AVC/H.264 for Professional-Quality Video Applications", IEEE International Conference of Image Processing, Sep. 1, 2007, pp. 1-13.

* cited by examiner

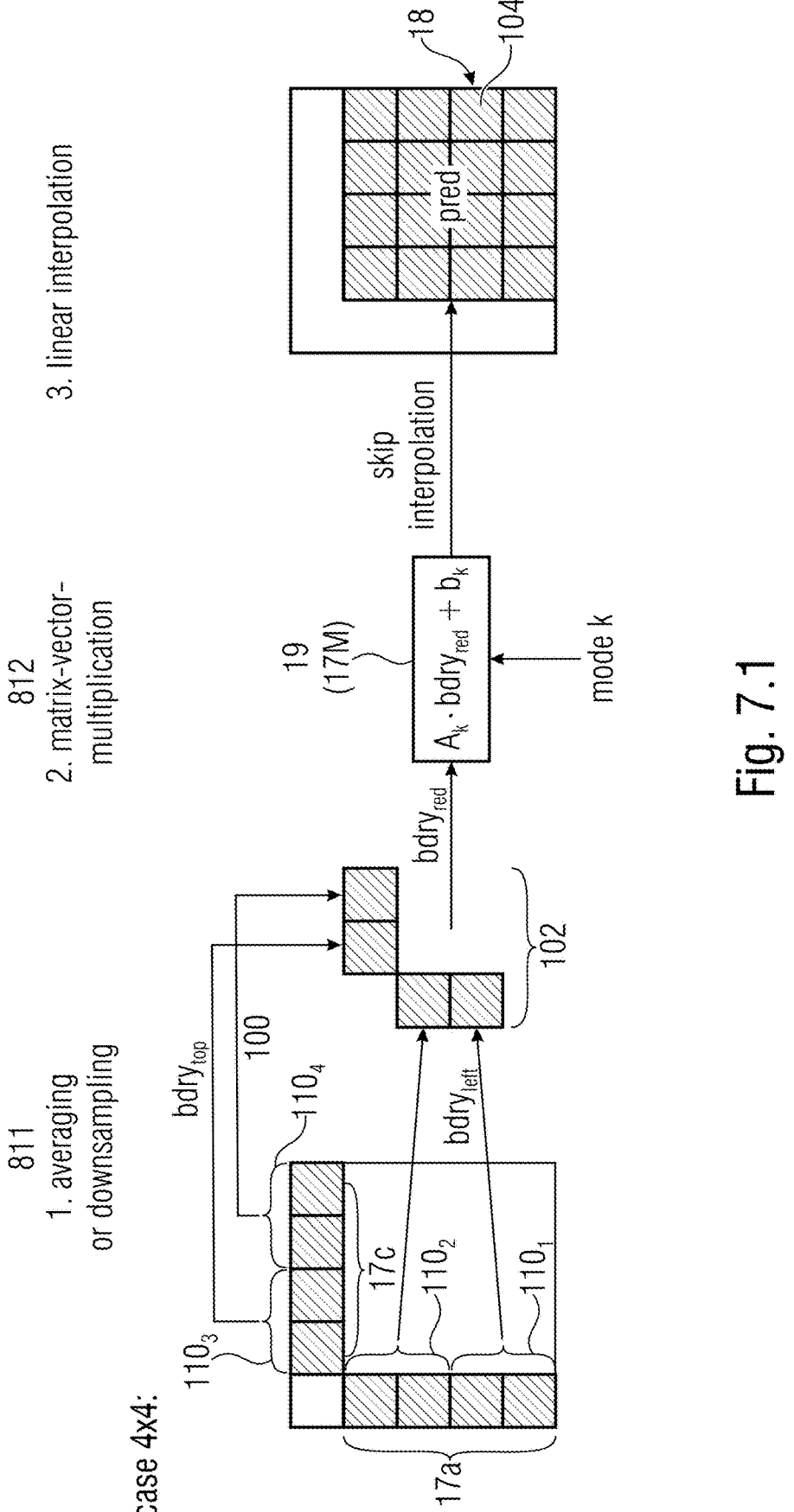
Fig. 7.1

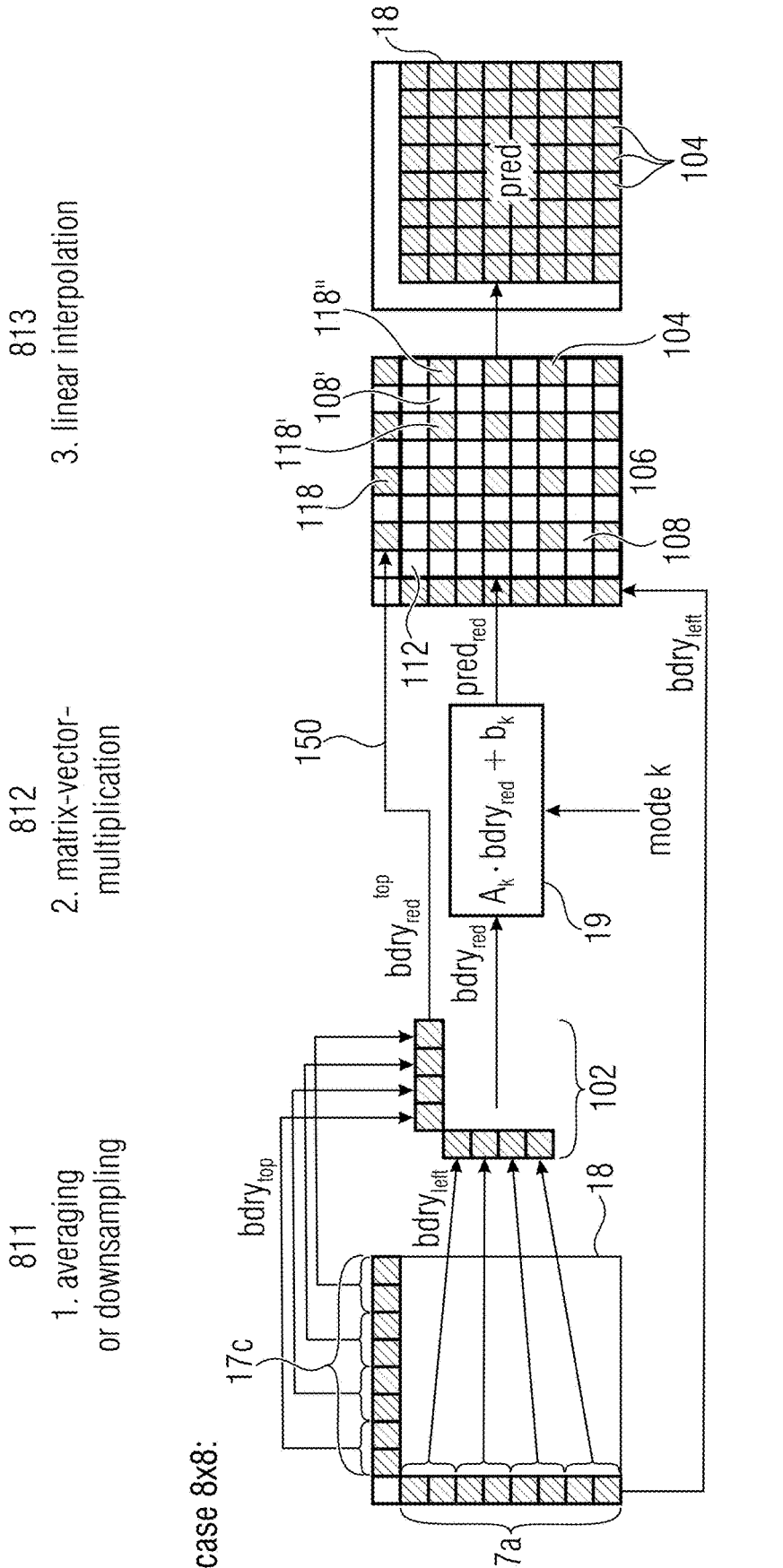
Fig. 7.2

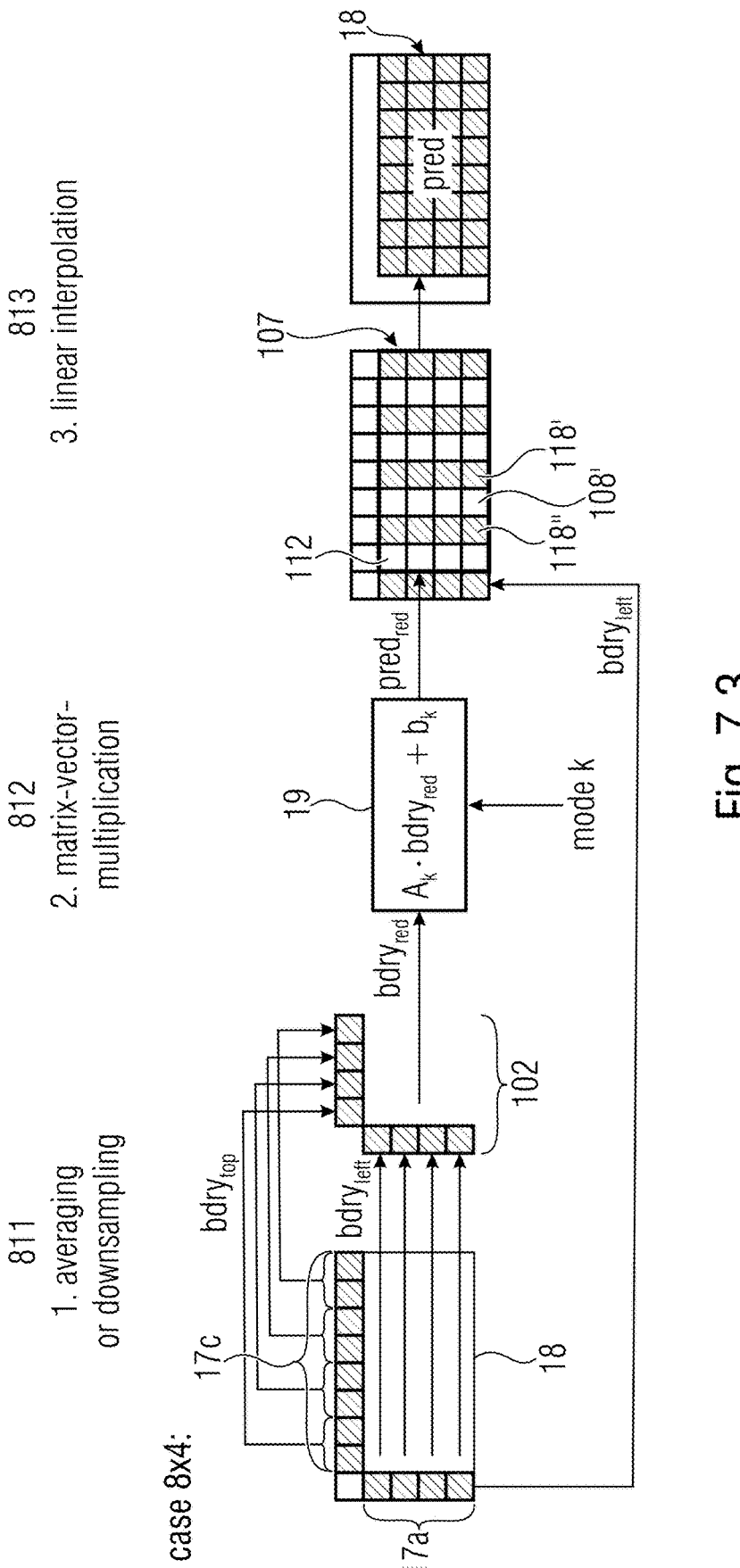
Fig. 7.3

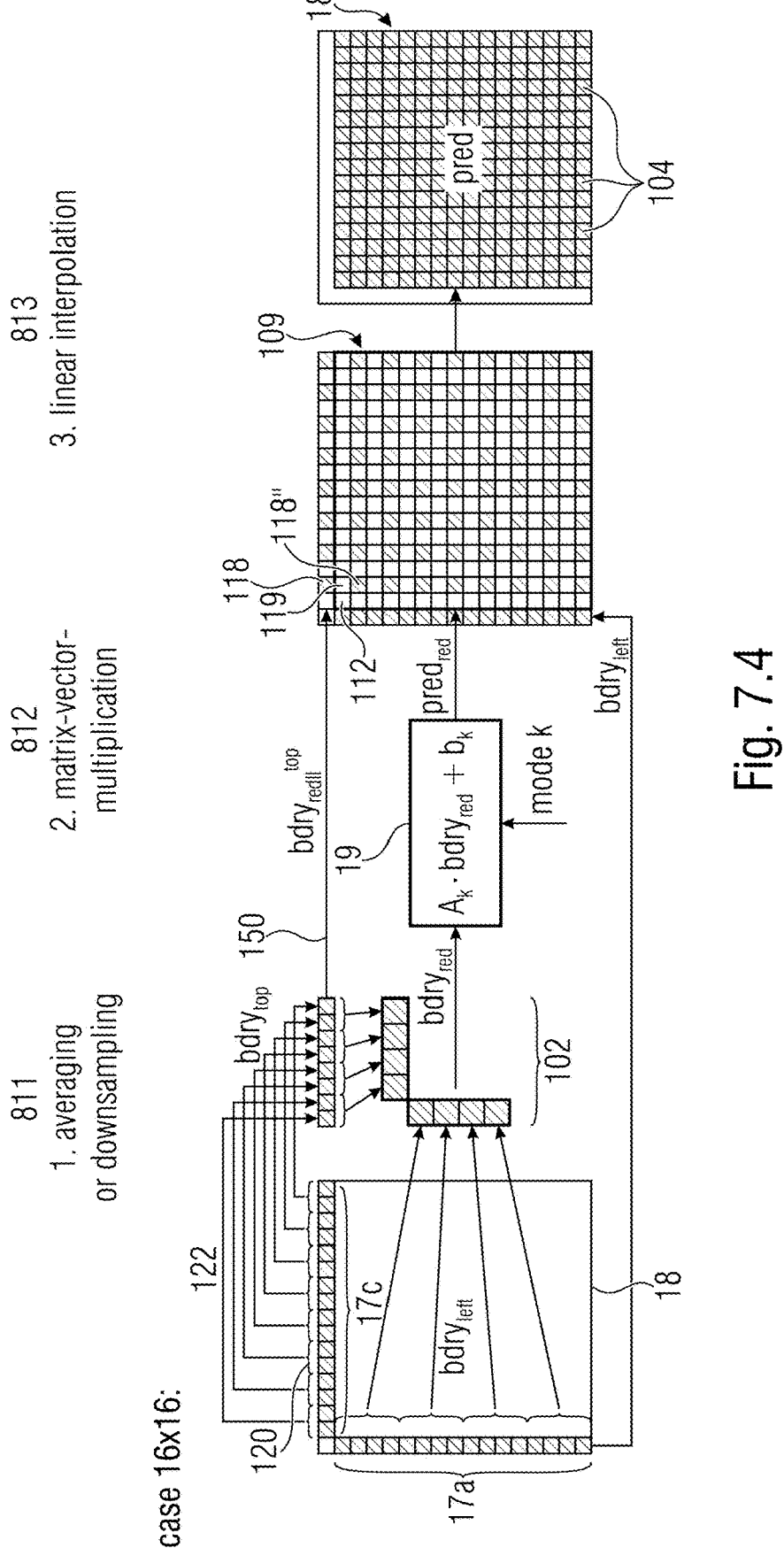
Fig. 7.4

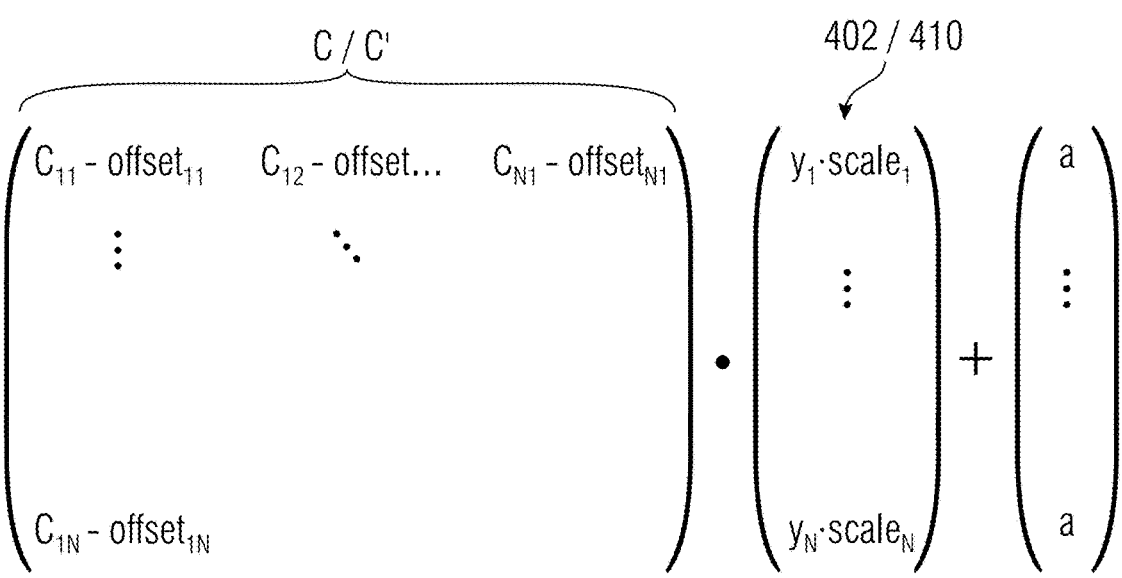

$$\overbrace{\begin{pmatrix} C_{11} - \text{offset}_{11} & C_{12} - \text{offset...} & C_{N1} - \text{offset}_{N1} \\ \vdots & \ddots & \\ C_{1N} - \text{offset}_{1N} & & \end{pmatrix}}^{C \,/\, C'} \bullet \begin{pmatrix} y_1 \cdot \text{scale}_1 \\ \vdots \\ y_N \cdot \text{scale}_N \end{pmatrix} + \begin{pmatrix} a \\ \vdots \\ a \end{pmatrix}$$

e.g. $\text{offset}_{ij} = \text{offset}_{nm}$ for $\forall$ all $i = n$ or for $\forall$ $j = m$ e.g. $\text{scale}_i = \text{scale}_j$ for $\forall$ $i, j$

Fig. 10

$$\text{scale} \bullet \begin{pmatrix} C_{11} & C_{12} & C_{N1} \\ \vdots & \ddots & \\ C_{1N} & & \end{pmatrix} \bullet \begin{pmatrix} y_1 \\ \vdots \\ y_N \end{pmatrix} - \begin{pmatrix} \text{offset} \cdot y_1 \\ \vdots \\ \text{offset} \cdot y_N \end{pmatrix} \bullet \text{scale} + \begin{pmatrix} a \\ \vdots \\ a \end{pmatrix}$$

Fig. 11

MIP FOR ALL CHANNELS IN THE CASE OF 4:4:4-CHROMA FORMAT AND OF SINGLE TREE

CROSS-REFERENCE TO RELATED APPLICATIONS

This application is a continuation of U.S. application Ser. No. 17/916,574, filed on Oct. 1, 2022, which claims priority as the national stage application of International Application No. PCT/EP2021/058558, filed Apr. 1, 2021, and additionally claims priority from European Application No. EP 20167808.3, filed Apr. 2, 2020; all of which are incorporated herein by reference in their entirety.

DESCRIPTION

Technical Field

Embodiments according to the invention related to apparatuses and methods for encoding or decoding a picture or a video using matrix-based intra prediction (MIP) for all channels in the case of 4:4:4-chroma format and of single tree.

Background of the Invention

In the current VTM, MIP is used only for the luma-component [3]. If on a chroma intra-block the intra-mode is the direct mode (DM) and if the intra-mode of the co-located luma block is a MIP-mode, then the chroma block has to generate the intra-prediction signal using the planar mode. It is asserted that the main reason for this treatment of the DM-mode in the case of MIP is that for the 4:2:0 case or for the case of dual-tree, the co-located luma block can have a different shape than the chroma block. Thus, since an MIP-mode cannot be applied for all block-shapes, the MIP mode of the co-located luma block may not be applicable to the chroma block in that case.

Therefore, it is desired to provide concepts for rendering picture coding and/or video coding more efficient to support matrix-based intra-prediction for all channels. Additionally, or alternatively, it is desired to reduce a bit stream and thus a signalization cost.

This is achieved by the subject matter of the independent claims of the present application.

Further embodiments according to the invention are defined by the subject matter of the dependent claims of the present application.

SUMMARY OF THE INVENTION

In accordance with a first aspect of the present invention, the inventors of the present application realized that one problem encountered when trying to use matrix-based intra prediction modes (MIP-modes) for predicting samples of a predetermined block of a picture stems from the fact that it is currently not possible to use MIP for all color components of a picture. According to the first aspect of the present application, this difficulty is overcome, for example, by using the same MIP mode for intra-predicted blocks of two color components sharing the same location in the picture, i.e. co-located intra-predicted blocks, in case the two color components are equally sampled and equally partitioned into blocks. The inventors found, that it is advantageous to use the same MIP mode for co-located intra-predicted blocks of two or more color components of a picture. This is based on the idea that a strong correlation of the prediction signals across all color components of a picture is beneficial and that such a correlation can be increased if the same intra-prediction mode is used for two or more color components of an intra-predicted block of the picture. A bit stream and thus a signalization cost might be decreased due to the usage of the same MIP mode for co-located blocks of different color components of the same picture. Additionally, a coding complexity might be reduced.

Accordingly, in accordance with a first aspect of the present application, a block based decoder/encoder is configured to partition a picture of more than one color component and of a color sampling format, according to which each color component is equally sampled, e.g., a first color component of the picture has the same sampling as all other color components of the picture, e.g., all color components of the picture have the same spatial resolution, into blocks using a partitioning scheme, according to which the picture is equally partitioned with respect to each color component, e.g., a first color component of the picture is partitioned the same way as all other color components of the picture, e.g., all color components have the same spatial resolution. The picture might be composed of a luma component and two chroma components, e.g., in a YUV, YPbPr and/or YCbCr color space, wherein the luma component and the two chroma components represent the more than one color components. It is also possible, e.g., in an RGB color space, that the picture might be composed of a red component, a green component and a blue component representing the more than one color components. The picture, for example, is composed of a first color component, a second color component and optionally of a third color component. It is clear that the described block based decoder/encoder can also be used for pictures with other color components and for pictures with a different number of color components. For example, the picture is equally partitioned with respect to each color component, by partitioning the first color component into first color component blocks, by partitioning the second color component into second color component blocks and optionally by partitioning the third color component into third color component blocks. A decision whether a color component of a picture is inter-predicted, i.e. inter-coded, or intra-predicted, i.e. intra-coded, may be done at a granularity or in units of the color component blocks. The block based decoder/encoder is configured to decode/encode the first color component of the picture from/into a data stream in units of the blocks, i.e. in units of the first color component blocks, with selecting, for each of intra-predicted first color component blocks of the picture, i.e. for each of first color component blocks associated with intra-prediction, one out of a first set of intra-prediction modes. First color component blocks associated with inter-prediction, i.e. inter-predicted first color component blocks, would be treated differently. The first set of intra-prediction modes comprises matrix-based intra prediction modes according to each of which a block inner is predicted by deriving a sample value vector out of references samples, neighboring the block inner, computing a matrix-vector product between the sample value vector and a prediction matrix associated with the respective matrix-based intra prediction mode so as to obtain a prediction vector, and predicting samples in the block inner on the basis of the prediction vector. Additionally, the block based decoder/encoder is configured to decode/encode the second color component of the picture in units of the blocks by intra-predicting a predetermined second color component block of the picture using the matrix-based intra prediction mode selected for a co-located intra-predicted first color component block. The first color component of the picture might be a luma component of the picture and the second color component of the picture might be a chroma component of the picture.

According to an embodiment, a number of components of the prediction vector is lower than a number of samples in the block inner and the block based decoder/encoder is configured to predicting the samples in the block inner on the basis of the prediction vector by interpolating the samples based on the components of the prediction vector assigned to supporting sample positions in the bock inner. This is based on the idea, that the total number of multiplications needed in the computation of the matrix-vector product might be reduced to obtain such a prediction vector, for which reason the decoder/encoder complexity and a signalization cost might be reduced.

According to an embodiment, the block based decoder/encoder is configured to select for each of intra-predicted second color component blocks of the picture, i.e. for each of second color component blocks associated with intra-prediction, one out of a first option and a second option. At the first option an intra-prediction mode for the respective intra-predicted second color component block is derived based on an intra-prediction mode selected for a co-located intra-predicted first color component block in a manner so that the intra-prediction mode for the respective intra-predicted second color component block equals the intra-prediction mode selected for the co-located intra-predicted first color component block in case of the intra-prediction mode selected for the co-located intra-predicted first color component block is one of the matrix-based intra prediction modes. At the second option an intra-prediction mode for the respective intra-predicted second color component block is selected based on an intra mode index present/signaled in the data stream for the respective intra-predicted second color component block. For example, the decoder/encoder might be configured to select the first option in case a direct mode or a residual coding color transform mode is indicated for the intra-predicted second color component block. Otherwise, by selecting the second option, for example, the mode signaled in the data stream is used for the prediction of the intra-predicted second color component block.

According to an embodiment, the block based decoder/encoder is configured so that the matrix-based intra prediction modes comprised by the first set of intra-prediction modes are selected, depending on block dimensions of the respective intra-predicted first color component block, so as to be one subset of matrix-based intra prediction modes out of a collection of mutually disjoint subsets of matrix-based intra prediction modes. For example, each subset of matrix-based intra prediction modes might be associated with a certain block dimension. For example, only the matrix-based intra prediction modes of the selected subset are comprised by the first set of intra-prediction modes. The first set of intra-prediction modes, out of which the intra-prediction mode for the respective intra-predicted first color component block is selected, might differ for different block dimensions. Thus, the decoder/encoder is configured to preselect intra-prediction modes, which might be suitable for the respective intra-predicted first color component block based on the block dimensions of the intra-predicted first color component block. This might reduce the decoder/encoder complexity and signalization costs.

According to an embodiment, prediction matrices associated with the collection of mutually disjoint subsets of matrix-based intra prediction modes are machine-learned, prediction matrices comprised by one subset of matrix based intra-prediction modes are of mutually equal size, and prediction matrices comprised by two subsets of matrix based intra-prediction modes which are selected for different block sizes are of mutually different size. Each subset might group a plurality of matrix-based intra prediction modes associated with prediction matrices of the same dimensions.

According to an embodiment, the block based decoder/encoder is configured so that prediction matrices associated with matrix-based intra prediction modes comprised by the first set of intra-prediction modes are of mutually equal size and machine-learned.

According to an embodiment, the block based decoder/encoder is configured so that intra prediction modes comprised by the first set of intra-prediction modes, other than the matrix-based intra prediction modes comprised by the first set of intra-prediction modes, comprise a DC mode, a planar mode and directional modes. The first set of intra-prediction modes, for example, comprises additionally to the matrix-based intra prediction modes the DC mode and/or the planar mode and/or directional modes.

According to an embodiment, the block based decoder/encoder is configured to select the partitioning scheme out of a set of partitioning schemes. The set of partitioning schemes comprises a further partitioning scheme according to which the picture is partitioned with respect to the first color component using first partitioning information present/signaled in the data stream and the picture is partitioned with respect to the second color component using second partitioning information which is present/signaled in data stream separate from the first partitioning information. Thus, the set of partitioning schemes, for example, comprises the partitioning scheme according to which the picture is equally partitioned with respect to each color component and the further partitioning scheme according to which the picture is partitioned with respect to the first color component differently than with respect to the second color component.

According to an embodiment, the block based decoder/encoder is configured to select for each of intra-predicted second color component blocks of the picture, one out of a first option and a second option, e.g., as already indicated above. At the first option an intra-prediction mode for the respective intra-predicted second color component block is derived based on an intra-prediction mode selected for a co-located intra-predicted first color component block in a manner so that the intra-prediction mode for the respective intra-predicted second color component block equals the intra-prediction mode selected for the co-located intra-predicted first color component block in case of the intra-prediction mode selected for the co-located intra-predicted first color component block is one of the matrix-based intra prediction modes. At the second option an intra-prediction mode for the respective intra-predicted second color component block is selected based on an intra mode index present/signaled in the data stream for the respective intra-predicted second color component block. Additionally, the block based decoder/encoder is configured to partition a further picture of more than one color component and of a color sampling format, according to which each color component is equally sampled, into further blocks using the further partitioning scheme, i.e. the further picture is partitioned with respect to the first color component differently than with respect to the second color component, as, e.g., mentioned above. A first color component of the further picture might be partitioned into first color component further blocks and A second color component of the further picture might be partitioned into second color component further blocks. The decoder/encoder, for example, is configured to decode/encode the first color component of the further picture in units of the further blocks with selecting, for each of intra-predicted first color component further blocks of the further picture, one out of the first set of intra-prediction modes. Additionally, the decoder/encoder might be configured to select for each of intra-predicted second color component further blocks of the further picture, one out of the first option and the second option. At the first option an intra-prediction mode for the respective intra-predicted second color component further block is derived based on an intra-prediction mode selected for a co-located first color component further block in a manner so that the intra-prediction mode for the respective intra-predicted second color component further block equals a planar intra-prediction mode in case of the intra-prediction mode selected for the co-located first color component further block is one of the matrix-based intra prediction modes. At the second option an intra-prediction mode for the respective intra-predicted second color component further block is selected based on an intra mode index present/signaled in the data stream for the respective intra-predicted second color component further block. As already outlined above the first option, for example, indicates that a prediction mode for an intra-predicted second color component block is derived directly from the prediction mode of a co-located intra-predicted first color component block. This derivation might depend on the partitioning scheme selected for the picture. Thus, the implementation of the first option might be different for the picture compared to the further picture, since the picture is partitioned using the partitioning scheme according to which the picture is equally partitioned with respect to each color component and the further picture is partitioned using the further partitioning scheme according to which the picture is partitioned with respect to the first color component using first partitioning information present/signaled in the data stream and the picture is partitioned with respect to the second color component using second partitioning information which is present/signaled in data stream separate from the first partitioning information.

According to an embodiment, the block based decoder/encoder is configured to select for each of intra-predicted second color component blocks of the picture, one out of a first option and a second option, e.g., as already indicated above. At the first option an intra-prediction mode for the respective intra-predicted second color component block is derived based on an intra-prediction mode selected for a co-located intra-predicted first color component block in a manner so that the intra-prediction mode for the respective intra-predicted second color component block equals the intra-prediction mode selected for the co-located intra-predicted first color component block in case of the intra-prediction mode selected for the co-located intra-predicted first color component block is one of the matrix-based intra prediction modes. At the second option an intra-prediction mode for the respective intra-predicted second color component block is selected based on an intra mode index present/signaled in the data stream for the respective intra-predicted second color component block. Additionally, the block based decoder/encoder is configured to partition an even further picture of more than one color component and of a different color sampling format, according to which the more than one color components are differently sampled, and decode/encode the first color component of the even further picture in units of the even further blocks with selecting, for each of intra-predicted first color component even further blocks of the even further picture, one out of the first set of intra-prediction modes. The block based decoder/encoder might be configured to select for each of intra-predicted second color component even further blocks of the even further picture, one out of the first option and the second option. At the first option an intra-prediction mode for the respective intra-predicted second color component even further block is derived based on an intra-prediction mode selected for a co-located first color component even further block in a manner so that the intra-prediction mode for the respective intra-predicted second color component even further block equals a planar intra-prediction mode in case of the intra-prediction mode selected for the co-located first color component even further block is one of the matrix-based intra prediction modes. At the second option an intra-prediction mode for the respective intra-predicted second color component even further block is selected based on an intra mode index present/signaled in the data stream for the respective intra-predicted second color component even further block. As already outlined above the first option, for example, indicates that a prediction mode for an intra-predicted second color component block is derived directly from the prediction mode of a co-located intra-predicted first color component block. This derivation might depend on the color sampling format of the picture. Thus, the implementation of the first option might be different for the picture compared to the further picture, since the picture has a color sampling format, according to which each color component is equally sampled and the further picture has a different color sampling format, according to which the more than one color components are differently sampled.

According to an embodiment, the block based decoder/encoder is configured to select the partitioning scheme out of a set of partitioning schemes, the set of partitioning schemes comprising a further partitioning scheme according to which the picture is partitioned with respect to the first color component using first partitioning information in data stream and the picture is partitioned with respect to the second color component using second partitioning information which is present/signaled in data stream separate from the first partition information. The block based decoder/encoder is configured to partition the even further picture of more than one color component using the partitioning scheme or the further partitioning scheme.

According to an embodiment, the block based decoder/encoder is configured to perform the selection out of the first and second options depending on a signalization present/signaled in the data stream for the respective intra-predicted second color component block if a residual coding color transform mode is signaled to be deactivated for the respective intra-predicted second color component block in the data stream, and by inferring that the first option is to be selected if the residual coding color transform mode is signaled to be activated for the respective intra-predicted second color component block in the data stream.

An embodiment is related to a method for block based decoding/encoding, comprising partitioning a picture of more than one color component and of a color sampling format, according to which each color component is equally sampled, into blocks using a partitioning scheme according to which the picture is equally partitioned with respect to each color component. Additionally, the method comprises decoding/encoding a first color component of the picture in units of the blocks with selecting, for each of intra-predicted first color component blocks of the picture, one out of a first set of intra-prediction modes, the first set comprising matrix-based intra prediction modes according to each of which a block inner is predicted by deriving a sample value vector out of references samples, neighboring the block inner, computing a matrix-vector product between the sample value vector and a prediction matrix associated with the respective matrix-based intra prediction mode so as to obtain a prediction vector, and predicting samples in the block inner on the basis of the prediction vector. Additionally, the method comprises decoding/encoding a second color component of the picture in units of the blocks by intra-predicting a predetermined second color component block of the picture using the matrix-based intra prediction mode selected for a co-located intra-predicted first color component block.

The method as described above is based on the same considerations as the above-described encoder/decoder. The method can, by the way, be completed with all features and functionalities, which are also described with regard to the encoder/decoder.

An embodiment is related to a data stream having a picture or a video encoded thereinto using a herein described method for encoding.

An embodiment is related to a computer program having a program code for performing, when running on a computer, a herein described method.

BRIEF DESCRIPTION OF THE DRAWINGS

The drawings are not necessarily to scale emphasis instead generally being placed upon illustrating the principles of the invention. In the following description, various embodiments of the invention are described with reference to the following drawings, in which:

FIG. 7.1 shows a prediction of a block with a reduced sample value vector according to an embodiment;

FIG. 7.2 shows a prediction of a block using an interpolation of samples according to an embodiment;

FIG. 7.3 shows a prediction of a block with a reduced sample value vector, wherein only some boundary samples are averaged, according to an embodiment;

FIG. 7.4 shows a prediction of a block with a reduced sample value vector, wherein groups of four boundary samples are averaged, according to an embodiment;

FIG. 10 shows detailed matrix operations performed by an apparatus using offset and scaling parameters, according to an embodiment;

FIG. 11 shows detailed matrix operations performed by an apparatus using offset and scaling parameters, according to a different embodiment;

DETAILED DESCRIPTION OF THE EMBODIMENTS

Figure 1:
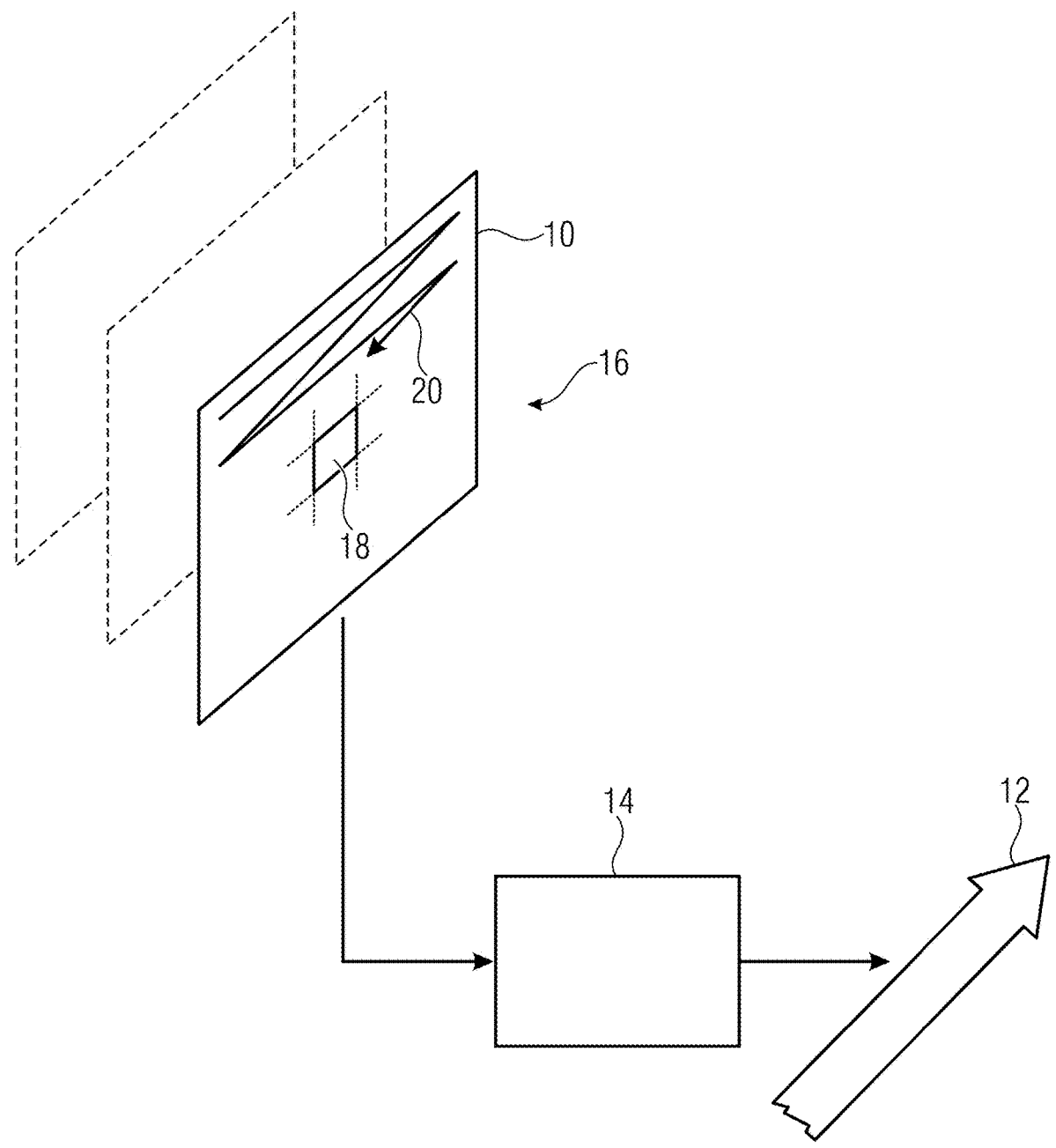
FIG. 1 shows an embodiment of an encoding into a data stream.

Equal or equivalent elements or elements with equal or equivalent functionality are denoted in the following description by equal or equivalent reference numerals even if occurring in different figures.

In the following description, a plurality of details is set forth to provide a more throughout explanation of embodiments of the present invention. However, it will be apparent to those skilled in the art that embodiments of the present invention may be practiced without these specific details. In other instances, well-known structures and devices are shown in block diagram form rather than in detail in order to avoid obscuring embodiments of the present invention. In addition, features of the different embodiments described herein after may be combined with each other, unless specifically noted otherwise.

1 INTRODUCTION

In the following, different inventive examples, embodiments and aspects will be described. At least some of these examples, embodiments and aspects refer, inter alia, to methods and/or apparatus for video coding and/or for performing block-based Predictions e.g. using linear or affine transforms with neighboring sample reduction and/or for optimizing video delivery (e.g., broadcast, streaming, file playback, etc.), e.g., for video applications and/or for virtual reality applications.

Further, examples, embodiments and aspects may refer to High Efficiency Video Coding (HEVC) or successors. Also, further embodiments, examples and aspects will be defined by the enclosed claims.

It should be noted that any embodiments, examples and aspects as defined by the claims can be supplemented by any of the details (features and functionalities) described in the following chapters.

Also, the embodiments, examples and aspects described in the following chapters can be used individually, and can also be supplemented by any of the features in another chapter, or by any feature included in the claims.

Also, it should be noted that individual, examples, embodiments and aspects described herein can be used individually or in combination. Thus, details can be added to each of said individual aspects without adding details to another one of said examples, embodiments and aspects.

It should also be noted that the present disclosure describes, explicitly or implicitly, features of decoding and/or encoding system and/or method.

Moreover, features and functionalities disclosed herein relating to a method can also be used in an apparatus. Furthermore, any features and functionalities disclosed herein with respect to an apparatus can also be used in a corresponding method. In other words, the methods disclosed herein can be supplemented by any of the features and functionalities described with respect to the apparatuses.

Also, any of the features and functionalities described herein can be implemented in hardware or in software, or using a combination of hardware and software, as will be described in the section "implementation alternatives".

Moreover, any of the features described in parentheses ("( . . . )" or "[ . . . ]") may be considered as optional in some examples, embodiments, or aspects.

2 ENCODERS, DECODERS

In the following, various examples are described which may assist in achieving a more effective compression when using block-based prediction. Some examples achieve high compression efficiency by spending a set of intra-prediction modes. The latter ones may be added to other intra-prediction modes heuristically designed, for instance, or may be provided exclusively. And even other examples make use of both of the just-discussed specialties. As a vibration of these embodiments it may be, however, that intra prediction is turned into an inter prediction by using reference samples in another picture instead.

In order to ease the understanding of the following examples of the present application, the description starts with a presentation of possible encoders and decoders fitting thereto into which the subsequently outlined examples of the present application could be built. FIG. 1 shows an apparatus for block-wise encoding a picture 10 into a datastream 12. The apparatus is indicated using reference sign 14 and may be a still picture encoder or a video encoder. In other words, picture 10 may be a current picture out of a video 16 when the encoder 14 is configured to encode video 16 including picture 10 into datastream 12, or encoder 14 may encode picture 10 into datastream 12 exclusively.

As mentioned, encoder 14 performs the encoding in a block-wise manner or block-based. To this, encoder 14 subdivides picture 10 into blocks, units of which encoder 14 encodes picture 10 into datastream 12. Examples of possible subdivisions of picture 10 into blocks 18 are set out in more detail below. Generally, the subdivision may end-up into blocks 18 of constant size such as an array of blocks arranged in rows and columns or into blocks 18 of different block sizes such as by use of a hierarchical multi-tree subdivisioning with starting the multi-tree subdivisioning from the whole picture area of picture 10 or from a pre-partitioning of picture 10 into an array of tree blocks wherein these examples shall not be treated as excluding other possible ways of subdivisioning picture 10 into blocks 18.

Further, encoder 14 is a predictive encoder configured to predictively encode picture 10 into datastream 12. For a certain block 18 this means that encoder 14 determines a prediction signal for block 18 and encodes the prediction residual, i.e. the prediction error at which the prediction signal deviates from the actual picture content within block 18, into datastream 12.

Encoder 14 may support different prediction modes so as to derive the prediction signal for a certain block 18. The prediction modes, which are of importance in the following examples, are intra-prediction modes according to which the inner of block 18 is predicted spatially from neighboring, already encoded samples of picture 10. The encoding of picture 10 into datastream 12 and, accordingly, the corresponding decoding procedure, may be based on a certain coding order 20 defined among blocks 18. For instance, the coding order 20 may traverse blocks 18 in a raster scan order such as row-wise from top to bottom with traversing each row from left to right, for instance. In case of hierarchical multi-tree based subdivisioning, raster scan ordering may be applied within each hierarchy level, wherein a depth-first traversal order may be applied, i.e. leaf nodes within a block of a certain hierarchy level may precede blocks of the same hierarchy level having the same parent block according to coding order 20. Depending on the coding order 20, neighboring, already encoded samples of a block 18 may be located usually at one or more sides of block 18. In case of the examples presented herein, for instance, neighboring, already encoded samples of a block 18 are located to the top of, and to the left of block 18.

Intra-prediction modes may not be the only ones supported by encoder 14. In case of encoder 14 being a video encoder, for instance, encoder 14 may also support inter-prediction modes according to which a block 18 is temporarily predicted from a previously encoded picture of video 16. Such an inter-prediction mode may be a motion-compensated prediction mode according to which a motion vector is signaled for such a block 18 indicating a relative spatial offset of the portion from which the prediction signal of block 18 is to be derived as a copy. Additionally, or alternatively, other non-intra-prediction modes may be available as well such as inter-prediction modes in case of encoder 14 being a multi-view encoder, or non-predictive modes according to which the inner of block 18 is coded as is, i.e. without any prediction.

Figure 2:
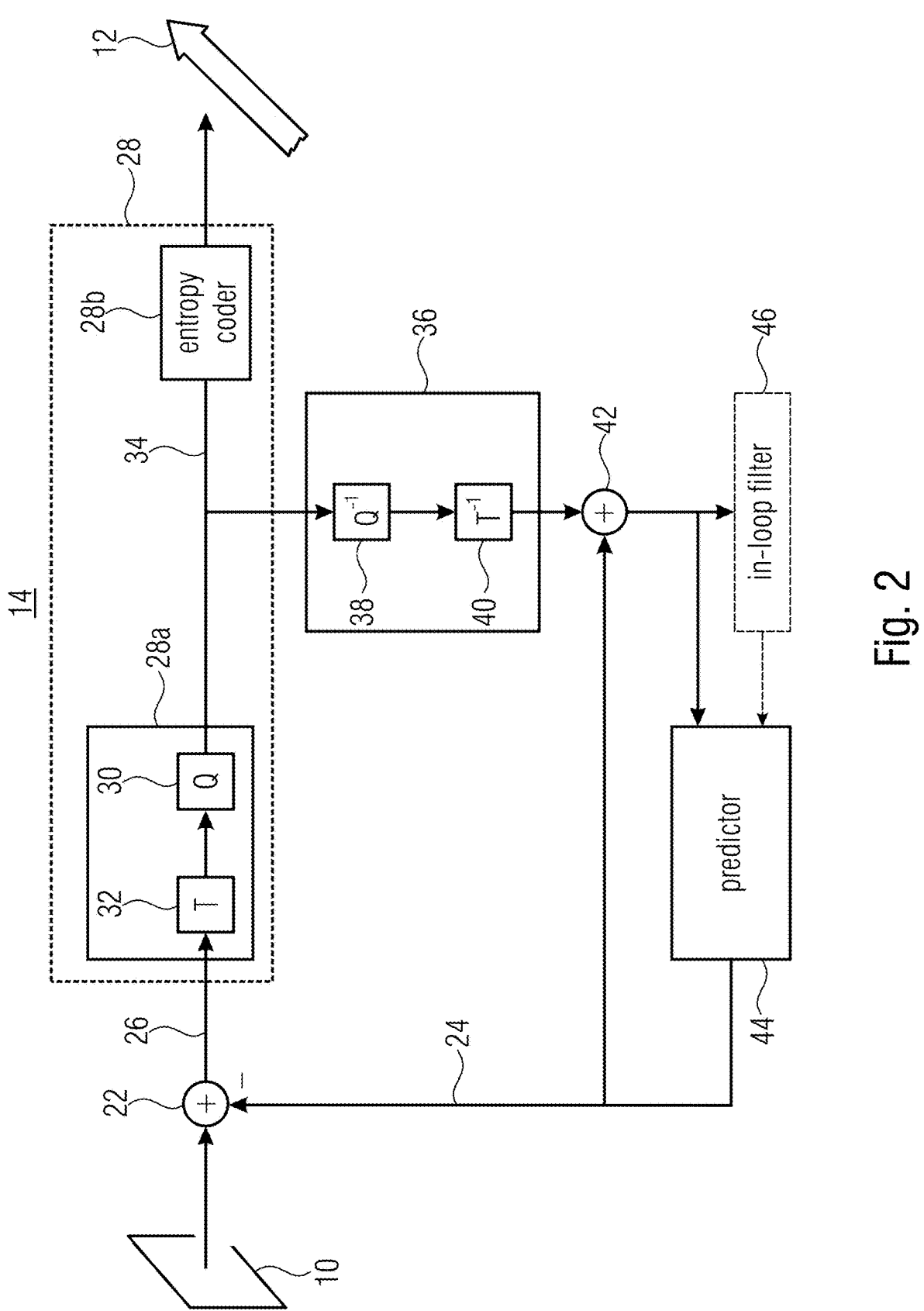
FIG. 2 shows an embodiment of an encoder.

Before starting with focusing the description of the present application onto intra-prediction modes, a more specific example for a possible block-based encoder, i.e. for a possible implementation of encoder 14, as described with respect to FIG. 2 with then presenting two corresponding examples for a decoder fitting to FIGS. 1 and 2, respectively.

FIG. 2 shows a possible implementation of encoder 14 of FIG. 1, namely one where the encoder is configured to use transform coding for encoding the prediction residual although this is nearly an example and the present application is not restricted to that sort of prediction residual coding. According to FIG. 2, encoder 14 comprises a subtractor 22 configured to subtract from the inbound signal, i.e. picture 10 or, on a block basis, current block 18, the corresponding prediction signal 24 so as to obtain the prediction residual signal 26 which is then encoded by a prediction residual encoder 28 into a datastream 12. The prediction residual encoder 28 is composed of a lossy encoding stage 28a and a lossless encoding stage 28b. The lossy stage 28a receives the prediction residual signal 26 and comprises a quantizer 30 which quantizes the samples of the prediction residual signal 26. As already mentioned above, the present example uses transform coding of the prediction residual signal 26 and accordingly, the lossy encoding stage 28a comprises a transform stage 32 connected between subtractor 22 and quantizer 30 so as to transform such a spectrally decomposed prediction residual 26 with a quantization of quantizer 30 taking place on the transformed coefficients where presenting the residual signal 26. The transform may be a DCT, DST, FFT, Hadamard transform or the like. The transformed and quantized prediction residual signal 34 is then subject to lossless coding by the lossless encoding stage 28b which is an entropy coder entropy coding quantized prediction residual signal 34 into datastream 12. Encoder 14 further comprises the prediction residual signal reconstruction stage 36 connected to the output of quantizer 30 so as to reconstruct from the transformed and quantized prediction residual signal 34 the prediction residual signal in a manner also available at the decoder, i.e. taking the coding loss is quantizer 30 into account. To this end, the prediction residual reconstruction stage 36 comprises a dequantizer 38 which perform the inverse of the quantization of quantizer 30, followed by an inverse transformer 40 which performs the inverse transformation relative to the transformation performed by transformer 32 such as the inverse of the spectral decomposition such as the inverse to any of the above-mentioned specific transformation examples. Encoder 14 comprises an adder 42 which adds the reconstructed prediction residual signal as output by inverse transformer 40 and the prediction signal 24 so as to output a reconstructed signal, i.e. reconstructed samples. This output is fed into a predictor 44 of encoder 14 which then determines the prediction signal 24 based thereon. It is predictor 44 which supports all the prediction modes already discussed above with respect to FIG. 1. FIG. 2 also illustrates that in case of encoder 14 being a video encoder, encoder 14 may also comprise an in-loop filter 46 with filters completely reconstructed pictures which, after having been filtered, form reference pictures for predictor 44 with respect to inter-predicted block.

As already mentioned above, encoder 14 operates block-based. For the subsequent description, the block bases of interest is the one subdividing picture 10 into blocks for which the intra-prediction mode is selected out of a set or plurality of intra-prediction modes supported by predictor 44 or encoder 14, respectively, and the selected intra-prediction mode performed individually. Other sorts of blocks into which picture 10 is subdivided may, however, exist as well. For instance, the above-mentioned decision whether picture 10 is inter-coded or intra-coded may be done at a granularity or in units of blocks deviating from blocks 18. For instance, the inter/intra mode decision may be performed at a level of coding blocks into which picture 10 is subdivided, and each coding block is subdivided into prediction blocks. Prediction blocks with encoding blocks for which it has been decided that intra-prediction is used, are each subdivided to an intra-prediction mode decision. To this, for each of these prediction blocks, it is decided as to which supported intra-prediction mode should be used for the respective prediction block. These prediction blocks will form blocks 18 which are of interest here. Prediction blocks within coding blocks associated with inter-prediction would be treated differently by predictor 44. They would be inter-predicted from reference pictures by determining a motion vector and copying the prediction signal for this block from a location in the reference picture pointed to by the motion vector. Another block subdivisioning pertains the subdivisioning into transform blocks at units of which the transformations by transformer 32 and inverse transformer 40 are performed. Transformed blocks may, for instance, be the result of further subdivisioning coding blocks. Naturally, the examples set out herein should not be treated as being limiting and other examples exist as well. For the sake of completeness only, it is noted that the subdivisioning into coding blocks may, for instance, use multi-tree subdivisioning, and prediction blocks and/or transform blocks may be obtained by further subdividing coding blocks using multi-tree subdivisioning, as well.

Figure 3:
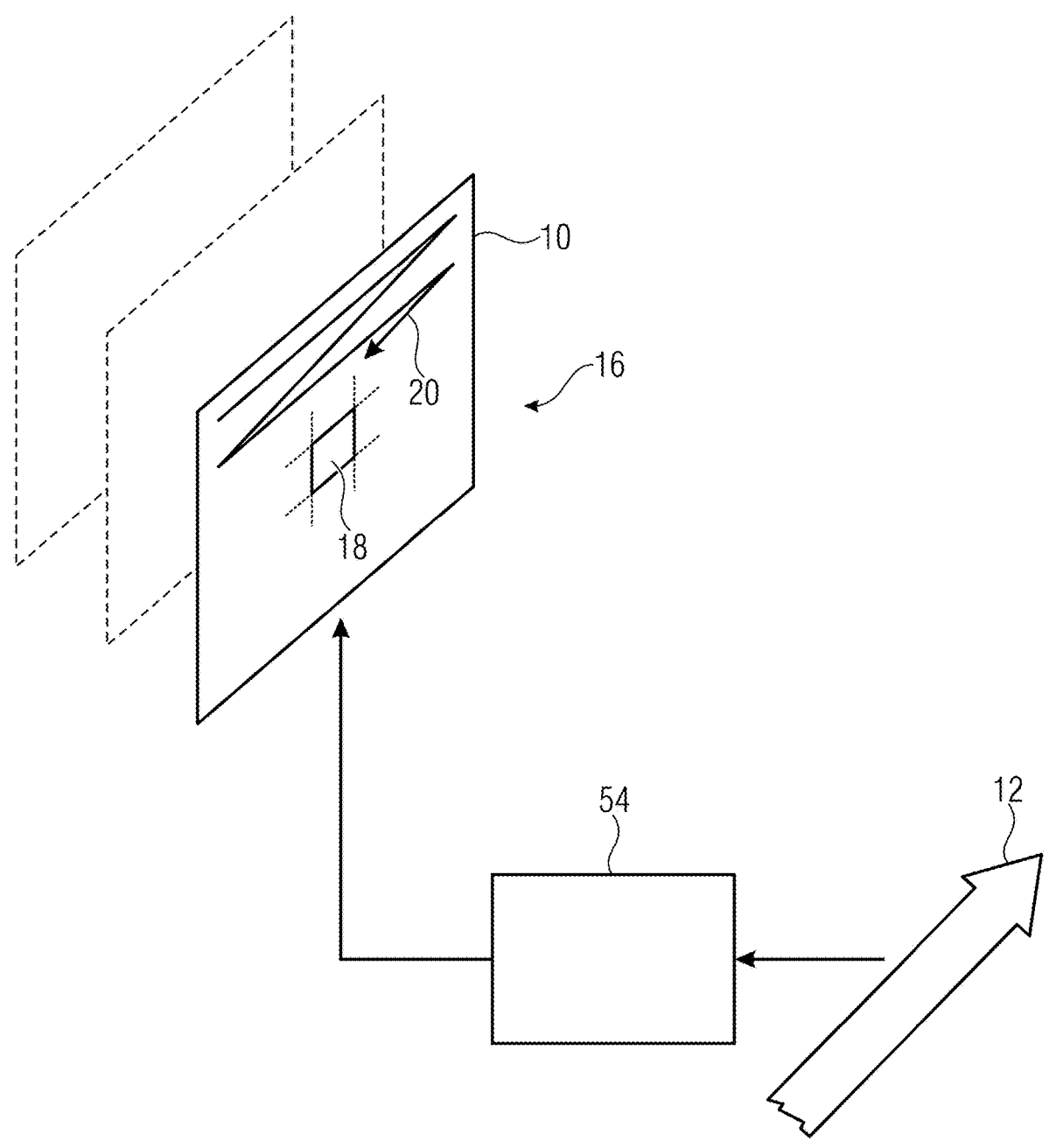
FIG. 3 shows an embodiment of a reconstruction of a picture.

A decoder 54 or apparatus for block-wise decoding fitting to the encoder 14 of FIG. 1 is depicted in FIG. 3. This decoder 54 does the opposite of encoder 14, i.e. it decodes from datastream 12 picture 10 in a block-wise manner and supports, to this end, a plurality of intra-prediction modes. The decoder 54 may comprise a residual provider 156, for example. All the other possibilities discussed above with respect to FIG. 1 are valid for the decoder 54, too. To this, decoder 54 may be a still picture decoder or a video decoder and all the prediction modes and prediction possibilities are supported by decoder 54 as well. The difference between encoder 14 and decoder 54 lies, primarily, in the fact that encoder 14 chooses or selects coding decisions according to some optimization such as, for instance, in order to minimize some cost function which may depend on coding rate and/or coding distortion. One of these coding options or coding parameters may involve a selection of the intra-prediction mode to be used for a current block 18 among available or supported intra-prediction modes. The selected intra-prediction mode may then be signaled by encoder 14 for current block 18 within datastream 12 with decoder 54 redoing the selection using this signalization in datastream 12 for block 18. Likewise, the subdivisioning of picture 10 into blocks 18 may be subject to optimization within encoder 14 and corresponding subdivision information may be conveyed within datastream 12 with decoder 54 recovering the subdivision of picture 10 into blocks 18 on the basis of the subdivision information. Summarizing the above, decoder 54 may be a predictive decoder operating on a block-basis and besides intra-prediction modes, decoder 54 may support other prediction modes such as inter-prediction modes in case of, for instance, decoder 54 being a video decoder. In decoding, decoder 54 may also use the coding order 20 discussed with respect to FIG. 1 and as this coding order 20 is obeyed both at encoder 14 and decoder 54, the same neighboring samples are available for a current block 18 both at encoder 14 and decoder 54. Accordingly, in order to avoid unnecessary repetition, the description of the mode of operation of encoder 14 shall also apply to decoder 54 as far the subdivision of picture 10 into blocks is concerned, for instance, as far as prediction is concerned and as far as the coding of the prediction residual is concerned. Differences lie in the fact that encoder 14 chooses, by optimization, some coding options or coding parameters and signals within, or inserts into, datastream 12 the coding parameters which are then derived from the datastream 12 by decoder 54 so as to redo the prediction, subdivision and so forth.

Figure 4:
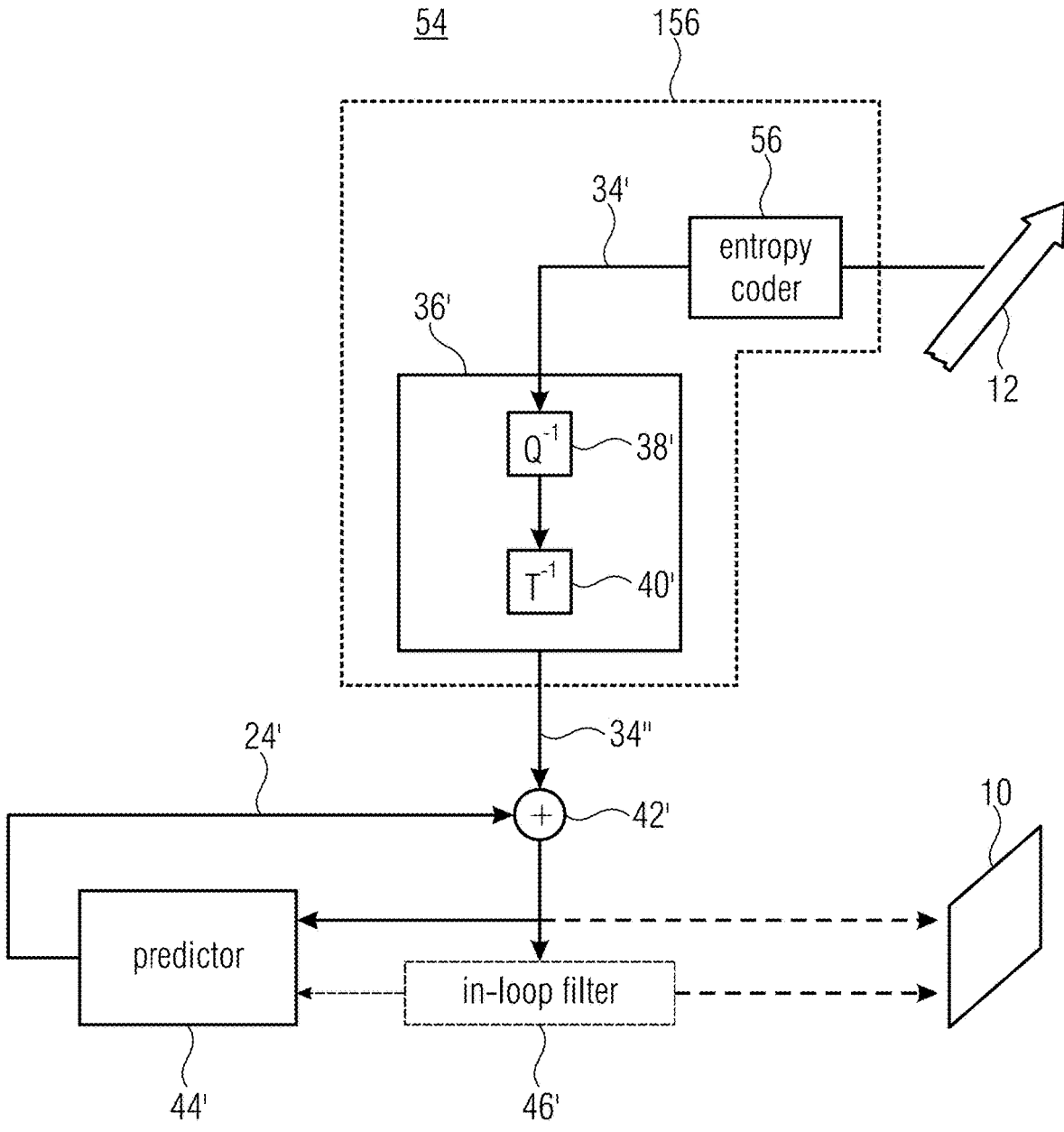
FIG. 4 shows an embodiment of a decoder.

FIG. 4 shows a possible implementation of the decoder 54 of FIG. 3, namely one fitting to the implementation of encoder 14 of FIG. 1 as shown in FIG. 2. As many elements of the encoder 54 of FIG. 4 are the same as those occurring in the corresponding encoder of FIG. 2, the same reference signs, provided with an apostrophe, are used in FIG. 4 in order to indicate these elements. In particular, adder 42', optional in-loop filter 46' and predictor 44' are connected into a prediction loop in the same manner that they are in encoder of FIG. 2. The reconstructed, i.e. dequantized and retransformed prediction residual signal applied to adder 42' is derived by a sequence of entropy decoder 56 which inverses the entropy encoding of entropy encoder 28$b$, followed by the residual signal reconstruction stage 36' which is composed of dequantizer 38' and inverse transformer 40' just as it is the case on encoding side. The decoder's output is the reconstruction of picture 10. The reconstruction of picture 10 may be available directly at the output of adder 42' or, alternatively, at the output of in-loop filter 46'. Some post-filter may be arranged at the decoder's output in order to subject the reconstruction of picture 10 to some post-filtering in order to improve the picture quality, but this option is not depicted in FIG. 4.

Again, with respect to FIG. 4 the description brought forward above with respect to FIG. 2 shall be valid for FIG. 4 as well with the exception that merely the encoder performs the optimization tasks and the associated decisions with respect to coding options. However, all the description with respect to block-subdivisioning, prediction, dequantization and retransforming is also valid for the decoder 54 of FIG. 4.

3 ALWIP (AFFINE LINEAR WEIGHTED INTRA PREDICTOR)

Some non-limiting examples regarding ALWIP are herewith discussed, even if ALWIP is not always necessary to embody the techniques discussed here.

The present application is concerned, inter alia, with an improved block-based prediction mode concept for block-wise picture coding such as usable in a video codec such as HEVC or any successor of HEVC. The prediction mode may be an intra prediction mode, but theoretically the concepts described herein may be transferred onto inter prediction modes as well where the reference samples are part of another picture.

A block-based prediction concept allowing for an efficient implementation such as a hardware friendly implementation is sought.

This object is achieved by the subject-matter of the independent claims of the present application.

Intra-prediction modes are widely used in picture and video coding. In video coding, intra-prediction modes compete with other prediction modes such as inter-prediction modes such as motion-compensated prediction modes. In intra-prediction modes, a current block is predicted on the basis of neighboring samples, i.e. samples already encoded as far as the encoder side is concerned, and already decoded as far as the decoder side is concerned. Neighboring sample values are extrapolated into the current block so as to form a prediction signal for the current block with the prediction residual being transmitted in the datastream for the current block. The better the prediction signal is, the lower the prediction residual is and, accordingly, a lower number of bits is necessary to code the prediction residual.

In order to be effective, several aspects should be taken into account in order to form an effective frame work for intra-prediction in a block-wise picture coding environment. For instance, the larger the number of intra-prediction modes supported by the codec, the larger the side information rate consumption is in order to signal the selection to the decoder. On the other hand, the set of supported intra-prediction modes should be able to provide a good prediction signal, i.e. a prediction signal resulting in a low prediction residual.

In the following, there is disclosed—as a comparison embodiment or basis example—an apparatus (encoder or decoder) for block-wise decoding a picture from a data stream, the apparatus supporting at least one intra-prediction mode according to which the intra-prediction signal for a block of a predetermined size of the picture is determined by applying a first template of samples which neighbours the current block onto an affine linear predictor which, in the sequel, shall be called Affine Linear Weighted Intra Predictor (ALWIP).

The apparatus may have at least one of the following properties (the same may apply to a method or to another technique, e.g. implemented in a non-transitory storage unit storing instructions which, when executed by a processor, cause the processor to implement the method and/or to operate as the apparatus):

3.1 Predictors May be Complementary to Other Predictors

The intra-prediction modes which might form the subject of the implementational improvements described further below may be complementary to other intra prediction modes of the codec. Thus, they may be complementary to the DC-, Planar-, or Angular-Prediction modes defined in the HEVC codec resp. the JEM reference software. The latter three types of intra-prediction modes shall be called conventional intra prediction modes from now on. Thus, for a given block in intra mode, a flag needs to be parsed by the decoder which indicates whether one of the intra-prediction modes supported by the apparatus is to be used or not.

3.2 More than One Proposed Prediction Modes

The apparatus may contain more than one ALWIP mode. Thus, in case that the decoder knows that one of the ALWIP modes supported by the apparatus is to be used, the decoder needs to parse additional information that indicates which of the ALWIP modes supported by the apparatus is to be used.

The signalization of the mode supported may have the property that the coding of some ALWIP modes may require less bins than other ALWIP modes. Which of these modes require less bins and which modes require more bins may either depend on information that can be extracted from the already decoded bitstream or may be fixed in advance.

4 SOME ASPECTS

FIG. 2 shows the decoder 54 for decoding a picture from a data stream 12. The decoder 54 may be configured to decode a predetermined block 18 of the picture. In particular, the predictor 44 may be configured for mapping a set of P neighboring samples neighboring the predetermined block 18 using a linear or affine linear transformation [e.g., ALWIP] onto a set of Q predicted values for samples of the predetermined block.

Figure 5:
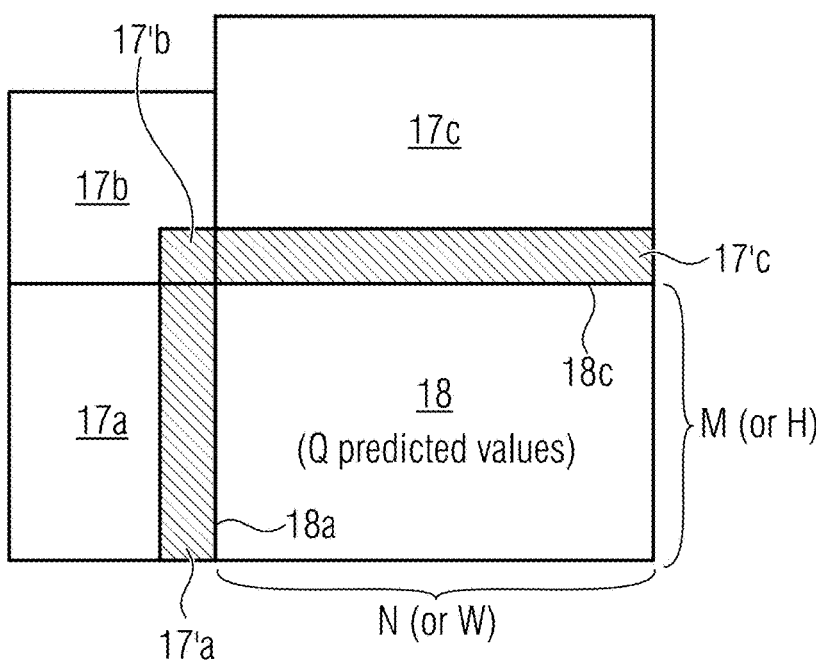
FIG. 5 shows schematic diagram of a prediction of a block for encoding and/or decoding, according to an embodiment.

As shown in FIG. 5, a predetermined block 18 comprises Q values to be predicted (which, at the end of the operations, will be "predicted values"). If the block 18 has M row and N columns, $Q=M\blacksquare N$. The Q values of the block 18 may be in the spatial domain (e.g., pixels) or in the transform domain (e.g., DCT, Discrete Wavelet Transform, etc.). The Q values of the block 18 may be predicted on the basis of P values taken from the neighboring blocks 17a-17c, which are in general adjacent to the block 18. The P values of the neighboring blocks 17a-17c may be in the closest positions (e.g., adjacent) to the block 18. The P values of the neighboring blocks 17a-17c have already been processed and predicted. The P values are indicated as values in portions 17'a-17'c, to distinguish them from the blocks they are part of (in some examples, 17'b is not used).

Figure 6:
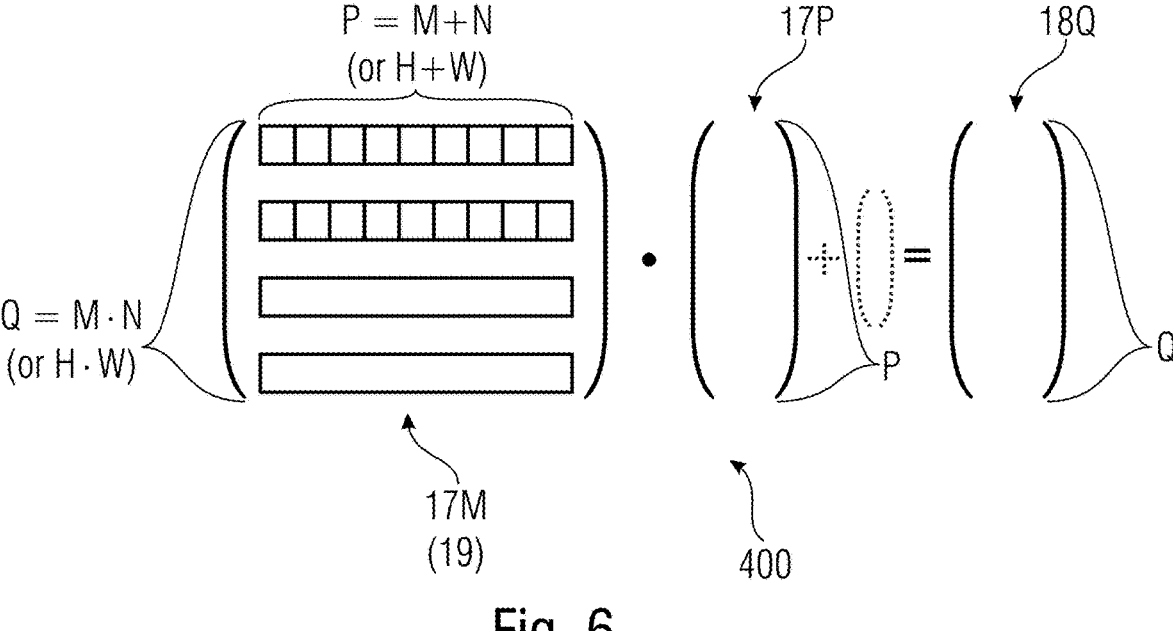
FIG. 6 shows a matrix operation for a prediction of a block for encoding and/or decoding according to an embodiment.

As shown in FIG. 6, in order to perform the prediction, it is possible to operate with a first vector 17P with P entries (each entry being associated to a particular position in the neighboring portions 17'a-17'c), a second vector 18Q with Q entries (each entry being associated with a particular position in the block 18), and a mapping matrix 17M (each row being associated to a particular position in the block 18, each column being associated to a particular position in the neighboring portions 17'a-17'c). The mapping matrix 17M therefore performs the prediction of the P values of the neighboring portions 17'a-17'c into values of the block 18 according to a predetermined mode. The entries in the mapping matrix 17M may be therefore understood as weighting factors. In the following passages, we will refer to the neighboring portions of the boundary using the signs 17a-17c instead of 17'a-17'c.

In the art there are known several conventional modes, such as DC mode, planar mode and 65 directional prediction modes. There may be known, for example, 67 modes.

However, it has been noted that it is also possible to make use of different modes, which are here called linear or affine linear transformations. The linear or affine linear transformation comprises $P\blacksquare Q$ weighting factors, among which at least $\frac{1}{4}P\blacksquare Q$ weighting factors are non-zero weighting values, which comprise, for each of the Q predicted values, a series of P weighting factors relating to the respective predicted value. The series, when being arranged one below the other according to a raster scan order among the samples of the predetermined block, form an envelope which is omnidirectionally non-linear.

It is possible to map the P positions of the neighboring values $17'a$-$17'c$ (template), the Q positions of the neighboring samples $17'a$-$17'c$, and at the values of the $P*Q$ weighting factors of the matrix 17M. A plane is an example of the envelope of the series for a DC transformation (which is a plane for the DC transformation). The envelope is evidently planar and therefore is excluded by the definition of the linear or affine linear transformation (ALWIP). Another example is a matrix resulting in an emulation of an angular mode: an envelope would be excluded from the ALWIP definition and would, frankly speaking, look like a hill leading obliquely from top to bottom along a direction in the P/Q plane. The planar mode and the 65 directional prediction modes would have different envelopes, which would however be linear in at least one direction, namely all directions for the exemplified DC, for example, and the hill direction for an angular mode, for example.

To the contrary, the envelope of the linear or affine transformation will not be omnidirectionally linear. It has been understood that such kind of transformation may be optimal, in some situations, for performing the prediction for the block 18. It has been noted that it is preferable that at least ¼ of the weighting factors are different from zero (i.e., at least the 25% of the $P*Q$ weighting factors are different from 0).

The weighting factors may be unrelated with each other according to any regular mapping rule. Hence, a matrix 17M may be such that the values of its entries have no apparent recognizable relationship. For example, the weighting factors cannot be described by any analytical or differential function.

In examples, an ALWIP transformation is such that a mean of maxima of cross correlations between a first series of weighting factors relating to the respective predicted value, and a second series of weighting factors relating to predicted values other than the respective predicted value, or a reversed version of the latter series, whatever leads to a higher maximum, may be lower than a predetermined threshold (e.g., 0.2 or 0.3 or 0.35 or 0.1, e.g., a threshold in a range between 0.05 and 0.035). For example, for each couple $(i_1, i_2)$ of rows of the ALWIP matrix 17M, a cross correlation may be calculated by multiplying the P values of the $i_1{}^{th}$ row with by the P values of the $i_2{}^{th}$ row. For each obtained cross correlation, the maximum value may be obtained. Hence, a mean (average) may be obtained for the whole matrix 17M (i.e. the maxima of the cross correlations in all combinations are averaged). After that, the threshold may be e.g., 0.2 or 0.3 or 0.35 or 0.1, e.g., a threshold in a range between 0.05 and 0.035.

The P neighboring samples of blocks $17a$-$17c$ may be located along a one-dimensional path extending along a border (e.g., $18c$, $18a$) of the predetermined block 18. For each of the Q predicted values of the predetermined block 18, the series of P weighting factors relating to the respective predicted value may be ordered in a manner traversing the one-dimensional path in a predetermined direction (e.g., from left to right, from top to down, etc.).

In examples, the ALWIP matrix 17M may be non-diagonal or non-block diagonal.

An example of ALWIP matrix 17M for predicting a 4×4 block 18 from 4 already predicted neighboring samples may be:

```
{
{ 37, 59, 77, 28},
{ 32, 92, 85, 25},
{ 31, 69, 100, 24},
{ 33, 36, 106, 29},
{ 24, 49, 104, 48},
{ 24, 21, 94, 59},
{ 29, 0, 80, 72},
{ 35, 2, 66, 84},
{ 32, 13, 35, 99},
{ 39, 11, 34, 103},
{ 45, 21, 34, 106},
{ 51, 24, 40, 105},
{ 50, 28, 43, 101},
{ 56, 32, 49, 101},
{ 61, 31, 53, 102},
{ 61, 32, 54, 100}
}.
```

(Here, {37, 59, 77, 28} is the first row; {32, 92, 85, 25} is the second row; and {61, 32, 54, 100} is the $16^{th}$ row of the matrix 17M.) Matrix 17M has dimension 16×4 and includes 64 weighting factors (as a consequence of 16*4=64). This is because matrix 17M has dimension Q×P, where Q=M*N, which is the number of samples of the block 18 to be predicted (block 18 is a 4×4 block), and P is the number of samples of the already predicted samples. Here, M=4, N=4, Q=16 (as a consequence of M*N=4*4=16), P=4. The matrix is non-diagonal and non-block diagonal, and is not described by a particular rule.

As can be seen, less than ¼ of the weighting factors are 0 (in the case of the matrix shown above, one weighting factor out of sixty-four is zero). The envelope formed by these values, when arranged one below the other one according to a raster scan order, form an envelope which is omnidirectionally non-linear.

Even if the explanation above is mainly discussed with reference to a decoder (e.g., the decoder 54), the same may be performed at the encoder (e.g., encoder 14).

In some examples, for each block size (in the set of block sizes), the ALWIP transformations of intra-prediction modes within the second set of intra-prediction modes for the respective block size are mutually different. In addition, or alternatively, a cardinality of the second set of intra-prediction modes for the block sizes in the set of block sizes may coincide, but the associated linear or affine linear transformations of intra-prediction modes within the second set of intra-prediction modes for different block sizes may be non-transferable onto each other by scaling.

In some examples the ALWIP transformations may be defined in such a way that they have "nothing to share" with conventional transformations (e.g., the ALWIP transformations may have "nothing" to share with the corresponding conventional transformations, even though they have been mapped via one of the mappings above).

In examples, ALWIP modes are used for both luma components and chroma components, but in other examples ALWIP modes are used for luma components but are not used for chroma components.

5 AFFINE LINEAR WEIGHTED INTRA PREDICTION MODES WITH ENCODER SPEEDUP (E.G., TEST CE3-1.2.1)

5.1 Description of a Method or Apparatus

Affine linear weighted intra prediction (ALWIP) modes tested in CE3-1.2.1 may be the same as proposed in JVET-L0199 under test CE3-2.2.2, except for the following changes:

|

Harmonization with multiple reference line (MRL) intra prediction, especially encoder estimation and signaling, i.e. MRL is not combined with ALWIP and transmitting an MRL index is restricted to non-ALWIP blocks.

Subsampling now mandatory for all blocks W×H≥32×32 (was optional for 32×32 before); therefore, the additional test at the encoder and sending the subsampling flag has been removed.

ALWIP for 64×N and N×64 blocks (with N≤32) has been added by downsampling to 32×N and N×32, respectively, and applying the corresponding ALWIP modes.

Moreover, test CE3-1.2.1 includes the following encoder optimizations for ALWIP:

Combined mode estimation: conventional and ALWIP modes use a shared Hadamard candidate list for full RD estimation, i.e. the ALWIP mode candidates are added to the same list as the conventional (and MRL) mode candidates based on the Hadamard cost.

EMT intra fast and PB intra fast are supported for the combined mode list, with additional optimizations for reducing the number of full RD checks.

Only MPMs of available left and above blocks are added to the list for full RD estimation for ALWIP, following the same approach as for conventional modes.

5.2 Complexity Assessment

In Test CE3-1.2.1, excluding computations invoking the Discrete Cosine Transform, at most 12 multiplications per sample were needed to generate the prediction signals. Moreover, a total number of 136492 parameters, each in 16 bits, were required. This corresponds to 0.273 Megabyte of memory.

5.3 Experimental Results

Evaluation of the test was performed according to the common test conditions JVET-J1010 0, for the intra-only (AI) and random-access (RA) configurations with the VTM software version 3.0.1. The corresponding simulations were conducted on an Intel Xeon cluster (E5-2697A v4, AVX2 on, turbo boost off) with Linux OS and GCC 7.2.1 compiler.

TABLE 1

| Result of CE3-1.2.1 for VTM AI configuration | | | | |
| --- | --- | --- | --- | --- |
| | Y | U | V | enc time | dec time |
| Class A1 | −2.08% | −1.68% | −1.60% | 155% | 104% |
| Class A2 | −1.18% | −0.90% | −0.84% | 153% | 103% |
| Class B | −1.18% | −0.84% | −0.83% | 155% | 104% |
| Class C | −0.94% | −0.63% | −0.76% | 148% | 106% |
| Class E | −1.71% | −1.28% | −1.21% | 154% | 106% |
| Overall | −1.36% | −1.02% | −1.01% | 153% | 105% |
| Class D | −0.99% | −0.61% | −0.76% | 145% | 107% |
| Class F (optional) | −1.38% | −1.23% | −1.04% | 147% | 104% |

TABLE 2

| Result of CE3-1.2.1 for VTM RA configuration | | | | |
| --- | --- | --- | --- | --- |
| | Y | U | V | enc time | dec time |
| Class A1 | −1.25% | −1.80% | −1.95% | 113% | 100% |
| Class A2 | −0.68% | −0.54% | −0.21% | 111% | 100% |
| Class B | −0.82% | −0.72% | −0.97% | 113% | 100% |
| Class C | −0.70% | −0.79% | −0.82% | 113% | 99% |
| Class E | | | | | |

TABLE 2-continued

| Result of CE3-1.2.1 for VTM RA configuration | | | | |
| --- | --- | --- | --- | --- |
| | Y | U | V | enc time | dec time |
| Overall | −0.85% | −0.92% | −0.98% | 113% | 100% |
| Class D | −0.65% | −1.06% | −0.51% | 113% | 102% |
| Class F (optional) | −1.07% | −1.04% | −0.96% | 117% | 99% |

5.4 Affine Linear Weighted Intra Prediction with Complexity Reduction (e.g. Test CE3-1.2.2)

The technique tested in CE2 is related to "Affine Linear Intra Predictions" described in JVET-L0199 [1], but simplifies it in terms of memory requirements and computational complexity:

There may be only three different sets of prediction matrices (e.g. $S_0$, $S_1$, $S_2$, see also below) and bias vectors (e.g. for providing offset values) covering all block shapes. As a consequence, the number of parameters is reduced to 14400 10-bit values, which is less memory than stored in a 128×128 CTU.

The input and output size of the predictors is further reduced. Moreover, instead of transforming the boundary via DCT, averaging or downsampling may be performed to the boundary samples and the generation of the prediction signal may use linear interpolation instead of the inverse DCT. Consequently, a maximum of four multiplications per sample may be necessary for generating the prediction signal.

6. EXAMPLES

It is here discussed how to perform some predictions (e.g., as shown in FIG. 6) with ALWIP predictions.

In principle, with reference to FIG. 6, in order to obtain the Q=M*N values of a M×N block 18 to be predicted, multiplications of the Q*P samples of the Q×P ALWIP prediction matrix 17M by the P samples of the P×1 neighboring vector 17P should be performed. Hence, in general, in order to obtain each of the Q=M*N values of the M×N block 18 to be predicted, at least P=M+N value multiplications are necessary.

These multiplications have extremely unwanted effects. The dimension P of the boundary vector 17P is in general dependent on the number M+N of boundary samples (bins or pixels) 17a, 17c neighboring (e.g. adjacent to) the M×N block 18 to be predicted. This means that, if the size of block 18 to be predicted is large, the number M+N of boundary pixels (17a, 17c) is accordingly large, hence increasing the dimension P=M+N of the P×1 boundary vector 17P, and the length of each row of the Q×P ALWIP prediction matrix 17M, and accordingly, also the numbers of multiplications necessary (in general terms, Q=M*N=W*H, where W (Width) is another symbol for N and H (Height) is another symbol for M; P, in the case that the boundary vector is only formed by one row and/or one column of samples, is P=M+N=H+W).

This problem is, in general, exacerbated by the fact that in microprocessor-based systems (or other digital processing systems), multiplications are, in general, power-consuming operations. It may be imagined that a large number of multiplications carried for an extremely high number of samples for a large number of blocks causes a waste of computational power, which is in general unwanted.

Accordingly, it would be preferable to reduce the number $Q*P$ of multiplications necessary for predicting the M×N block 18.

It has been understood that it is possible to somehow reduce the computational power necessary for each intra-prediction of each block 18 to be predicted by intelligently choosing operations alternative to multiplications and which are easier to be processed.

In particular, with reference to FIGS. 7.1-7.4, it has been understood that an encoder or decoder may predict a pre-determined block (e.g. 18) of the picture using a plurality of neighboring samples (e.g. 17a, 17c), by reducing (e.g. at step 811), (e.g. by averaging or down-sampling), the plurality of neighboring samples (e.g. 17a, 17c) to obtain a reduced set of samples values lower, in number of samples, than compared to the plurality of neighboring samples, subjecting (e.g. at step 812) the reduced set of sample values to a linear or affine linear transformation to obtain predicted values for predetermined samples of the predetermined block.

In some cases, the decoder or encoder may also derive, e.g. by interpolation, prediction values for further samples of the predetermined block on the basis of the predicted values for the predetermined samples and the plurality of neighboring samples. Accordingly, an upsampling strategy may be obtained.

In examples, it is possible to perform (e.g. at step 811) some averages on the samples of the boundary 17, so as to arrive at a reduced set 102 (FIGS. 7.1-7.4) of samples with a reduced number of samples (at least one of the samples of the reduced number of samples 102 may be the average of two samples of the original boundary samples, or a selection of the original boundary samples). For example, if the original boundary has $P=M+N$ samples, the reduced set of samples may have $P_{red}=M_{red}+N_{red}$, with at least one of $M_{red}<M$ and $N_{red}<N$, so that $P_{red}<P$. Hence, the boundary vector 17P which will be actually used for the prediction (e.g. at step 812b) will not have P×1 entries, but $P_{red}×1$ entries, with $P_{red}<P$. Analogously, the ALWIP prediction matrix 17M chosen for the prediction will not have Q×P dimension, but $Q×P_{red}$ (or $Q_{red}×P_{red}$, see below) with a reduced number of elements of the matrix at least because $P_{red}<P$ (by virtue of at least one of $M_{red}<M$ and $N_{red}<N$).

In some examples (e.g. FIGS. 7.2, 7.3), it is even possible to further reduce the number of multiplications, if the block obtained by ALWIP (at step 812) is a reduced block having size $M'_{red}×N'_{red}$, with $M'_{red}<M$ and/or $N'_{red}<N$ (i.e. the samples directly predicted by ALWIP are less in number than the samples of the block 18 to be actually predicted). Thus, setting $Q_{red}=M'_{red}*N'_{red}$, this will bring to obtain an ALWIP prediction by using, instead of $Q*P_{red}$ multiplications, $Q_{red}*P_{red}$ multiplications (with $Q_{red}*P_{red}<Q*P_{red}<Q*P$). This multiplication will predict a reduced block, with dimension $M'_{red}×N'_{red}$. It will be notwithstanding possible to perform (e.g. at a subsequent step 813) an upsampling (e.g., obtained by interpolation) from the reduced $M'_{red}×N'_{red}$ predicted block into the final M×N predicted block.

These techniques may be advantageous since, while the matrix multiplication involves a reduced number ($Q_{red}*P_{red}$ or $Q*P_{red}$) of multiplications, both the initial reducing (e.g., averaging or downsampling) and the final transformation (e.g. interpolation) may be performed by reducing (or even avoiding) multiplications. For example, downsampling, averaging and/or interpolating may be performed (e.g. at steps 811 and/or 813) by adopting non-computationally-power-demanding binary operations such as additions and shifting.

Also, the addition is an extremely easy operation which can be easily performed without much computational effort.

This shifting operation may be used, for example, for averaging two boundary samples and/or for interpolating two samples (support values) of the reduced predicted block (or taken from the boundary), to obtain the final predicted block. (For interpolation two sample values are necessary. Within the block we always have two predetermined values, but for interpolating the samples along the left and above border of the block we only have one predetermined value, as in FIG. 7.2, therefore we use a boundary sample as a support value for interpolation.)

A two-step procedure may be used, such as:

first summing the values of the two samples;

then halving (e.g., by right-shifting) the value of the sum.

Alternatively, it is possible to:

first halving (e.g., by left-shifting) the each of the samples;

then summing the values of the two halved samples.

Even easier operations may be performed when down-sampling (e.g., at step 811), as it is only necessary to select one sample amount a group of samples (e.g., samples adjacent to each other).

Hence, it is now possible to define technique(s) for reducing the number of multiplications to be performed. Some of these techniques may be based, inter alia, on at least one of the following principles:

Even if the block 18 to be actually predicted has size M×N, block may be reduced (in at least one of the two dimensions) and an ALWIP matrix with reduced size $Q_{red}×P_{red}$ (with $Q_{red}=M'_{red}*N_{red}$, $P_{red}=N_{red}+M_{red}$, with $M'_{red}<M$ and/or $N'_{red}<N$ and/or $M_{red}<M$ and/or $N_{red}<N$) may be applied. Hence, the boundary vector 17P will have size $P_{red}×1$, implying only $P_{red}<P$ multiplications (with $P_{red}=M_{red}+N_{red}$ and $P=M+N$).

The $P_{red}×1$ boundary vector 17P may be obtained easily from the original boundary 17, e.g.:

By downsampling (e.g. by choosing only some samples of the boundary); and/or

By averaging multiple samples of the boundary (which may be easily obtained by addition and shifting, without multiplications).

In addition or alternatively, instead of predicting by multiplication all the $Q=M*N$ values of the block 18 to be predicted, it is possible to only predict a reduced block with reduced dimensions (e.g., $Q_{red}=M'_{red}*N'_{red}$ with $M'_{red}<M$ and/or $N'_{red}<N$). The remaining samples of the block 18 to be predicted will be obtained by interpolation, e.g. using the $Q_{red}$ samples as support values for the remaining $Q-Q_{red}$ values to be predicted.

According to an example illustrated in FIG. 7.1, a 4×4 block 18 ($M=4$, $N=4$, $Q=M*N=16$) is to be predicted and a neighborhood 17 of samples 17a (a vertical row column with four already-predicted samples) and 17c (a horizontal row with four already-predicted samples) have already been predicted at previous iterations (the neighborhoods 17a and 17c may be collectively indicated with 17). A priori, by using the equation shown in FIG. 5, the prediction matrix 17M should be a Q×P=16×8 matrix (by virtue of $Q=M*N=4*4$ and $P=M+N=4+4=8$), and the boundary vector 17P should have 8×1 dimension (by virtue of $P=8$). However, this would drive to the necessity of performing 8 multiplications for each of the 16 samples of the 4×4 block

18 to be predicted, hence leading to the necessity of performing 16*8=128 multiplications in total. (It is noted that the average number of multiplications per sample is a good assessment of the computational complexity. For conventional intra-predictions, four multiplications per sample are required and this increases the computational effort to be involved. Hence, it is possible to use this as an upper limit for ALWIP would ensures that the complexity is reasonable and does not exceed the complexity of conventional intra prediction.)

Notwithstanding, it has been understood that, by using the present technique, it is possible to reduce, at step 811, the number of samples 17a and 17c neighboring the block 18 to be predicted from P to $P_{red}$<P. In particular, it has been understood that it is possible to average (e.g. at 100 in FIG. 7.1) boundary samples (17a, 17c) which are adjacent to each other, to obtain a reduced boundary 102 with two horizontal rows and two vertical columns, hence operating as the block 18 were a 2×2 block (the reduced boundary being formed by averaged values). Alternatively, it is possible to perform a downsampling, hence selecting two samples for the row 17c and two samples for the column 17a. Hence, the horizontal row 17c, instead of having the four original samples, is processed as having two samples (e.g. averaged samples), while the vertical column 17a, originally having four samples, is processed as having two samples (e.g. averaged samples). It is also possible to understand that, after having subdivided the row 17c and the column 17a in groups 110 of two samples each, one single sample is maintained (e.g., the average of the samples of the group 110 or a simple choice among the samples of the group 110). Accordingly, a so-called reduced set 102 of sample values is obtained, by virtue of the set 102 having only four samples ($M_{red}$=2, $N_{red}$=2, $P_{red}$=$M_{red}$+$N_{red}$=4, with $P_{red}$<P).

It has been understood that it is possible to perform operations (such as the averaging or downsampling 100) without carrying out too many multiplications at the processor-level: the averaging or downsampling 100 performed at step 811 may be simply obtained by the straightforward and computationally-non-power-consuming operations such as additions and shifts.

It has been understood that, at this point, it is possible to subject the reduced set of sample values 102 to a linear or affine linear (ALWIP) transformation 19 (e.g., using a prediction matrix such as the matrix 17M of FIG. 5). In this case, the ALWIP transformation 19 directly maps the four samples 102 onto the sample values 104 of the block 18. No interpolation is necessary in the present case.

In this case, the ALWIP matrix 17M has dimension $Q \times P_{red}$=16×4: this follows the fact that all the Q=16 samples of the block 18 to be predicted are directly obtained by ALWIP multiplication (no interpolation needed).

Hence, at step 812a, a suitable ALWIP matrix 17M with dimension $Q \times P_{red}$ is selected. The selection may at least partially be based, for example, on signalling from the datastream 12. The selected ALWIP matrix 17M may also be indicated with $A_k$, where k may be understood as an index, which may be signalled in the datastream 12 (in some cases the matrix is also indicated as $A_{idx}^m$, see below). The selection may be performed according to the following scheme: for each dimension (e.g., pair of height/width of the block 18 to be predicted), an ALWIP matrix 17M is chosen among, for example, one of the three sets of matrixes $S_0$, $S_1$, $S_2$ (each of the three sets $S_0$, $S_1$, $S_2$ may group a plurality of ALWIP matrixes 17M of the same dimensions, and the ALWIP matrix to be chosen for the prediction will be one of them).

At step 812b, a multiplication between the selected $Q \times P_{red}$ ALWIP matrix 17M (also indicated as $A_k$) and the $P_{red} \times 1$ boundary vector 17P is performed.

At step 812c, an offset value (e.g., $b_k$) may be added, e.g. to all the obtained values 104 of the vector 18Q obtained by ALWIP. The value of the offset ($b_k$ or in some cases also indicated with $b_{1,2,3}^i$, see below) may be associated to the particular selected ALWIP matrix ($A_k$), and may be based on an index (e.g., which may be signalled in the datastream 12).

Hence, a comparison between using the present technique and non-using the present technique is here resumed:

Without the present technique:

Block 18 to be predicted, the block having dimensions M=4, N=4;

Q=M*N=4*4=16 values to be predicted;

P=M+N=4+4=8 boundary samples

P=8 multiplications for each of the Q=16 values to be predicted, a total number of P*Q=8*16=128 multiplications;

With the present technique, we have:

Block 18 to be predicted, the block having dimensions M=4, N=4;

Q=M*N=4*4=16 values to be predicted at the end;

Reduced dimension of the boundary vector: $P_{red}$=$M_{red}$+$N_{red}$=2+2=4;

$P_{red}$=4 multiplications for each of the Q=16 values to be predicted by ALWIP, a total number of $P_{red}$*Q=4*16=64 multiplications (the half of 128!)

the ratio between the number of multiplications and the number of final values to be obtained and is $P_{red}$*Q/Q=4, i.e. the half than the P=8 multiplications for each sample to be predicted!

As can be understood, by relying on straightforward and computationally-non-power-demanding operations such as averaging (and, in case, additions and/or shifts and/or downsampling) it is possible to obtain an appropriate value at step 812.

With reference to FIG. 7.2, the block 18 to be predicted is here an 8×8 block (M=8, N=8) of 64 samples. Here, a priori, a prediction matrix 17M should have size $Q \times P$=64×16 (Q=64 by virtue of Q=M*N=8*8=64, M=8 and N=8 and by virtue of P=M+N=8+8=16). Hence, a priori, there would be needed P=16 multiplications for each of the Q=64 samples of the 8×8 block 18 to be predicted, to arrive at 64*16=1024 multiplications for the whole 8×8 block 18!

However, as can be seen in FIG. 7.2, there can be provided a method 820 according to which, instead of using all the 16 samples of the boundary, only 8 values (e.g., 4 in the horizontal boundary row 17c and 4 in the vertical boundary column 17a between original samples of the boundary) are used. From the boundary row 17c, 4 samples may be used instead of 8 (e.g., they may be two-by-two averages and/or selections of one sample out of two). Accordingly, the boundary vector is not a P×1=16×1 vector, but a $P_{red} \times 1$=8×1 vector only ($P_{red}$=$M_{red}$+$N_{red}$=4+4). It has been understood that it is possible to select or average (e.g., two by two) samples of the horizontal row 17c and samples of the vertical columns 17a to have, instead of the original P=16 samples, only $P_{red}$=8 boundary values, forming the reduced set 102 of sample values. This reduced set 102 will permit to obtain a reduced version of block 18, the reduced version having $Q_{red}$=$M_{red}$*$N_{red}$=4*4=16 samples (instead of Q=M*N=8*8=64). It is possible to apply an ALWIP matrix for predicting a block having size $M_{red} \times N_{red}$=4×4. The reduced version of block 18 includes the samples indicated with grey in the scheme 106 in FIG. 7.2: the samples indicated with grey squared (including samples 118' and 118") form a 4×4 reduced block with $Q_{red}$=16 values obtained at the step of subjecting 812. The 4×4 reduced block has been obtained by applying the linear transformation 19 at the step of subjecting 812. After having obtain the values of the 4×4 reduced block, it is possible to obtain the values of the remaining samples (samples indicated with white samples in the scheme 106) for example by interpolation.

In respect to method 810 of FIG. 7.1, this method 820 may additionally include a step 813 of deriving, e.g. by interpolation, prediction values for the remaining $Q-Q_{red}$=64–16=48 samples (white squares) of the M×N=8×8 block 18 to be predicted. The remaining $Q-Q_{red}$=64–16=48 samples may be obtained from the $Q_{red}$=16 directly obtained samples by interpolation (the interpolation may also make use of values of the boundary samples, for example). As can be seen in FIG. 7.2, while the samples 118' and 118" have been obtained at step 812 (as indicated by the grey square), the sample 108' (intermediate to the samples 118' and 118" and indicated with white square) is obtained by interpolation between the sample 118' and 118" at step 813. It has been understood that interpolations may also be obtained by operations similar to those for averaging such as shifting and adding. Hence, in FIG. 7.2, the value 108' may in general be determined as a value intermediate between the value of the sample 118' and the value of the sample 118" (it may be the average).

By performing interpolations, at step 813 it is also possible to arrive at the final version of the M×N=8×8 block 18 based on multiple sample values indicated in 104.

Hence, a comparison between using the present technique and non-using it is:
    Without the present technique:
        Block 18 to be predicted, the block having dimensions M=8, N=8 and
        Q=M*N=8*8=64 samples in the block 18 to be predicted;
        P=M+N=8+8=16 samples in the boundary 17;
        P=16 multiplications for each of the Q=64 values to be predicted,
        a total number of P*Q=16*64=1028 multiplications
        the ratio between the number of multiplications and the number of final values to be obtained is P*Q/Q=16
    With the present technique:
        Block 18 to be predicted, having dimensions M=8, N=8
        Q=M*N=8*8=64 values to be predicted at the end;
        but an $Q_{red}$×$P_{red}$ ALWIP matrix to be used, with $P_{red}$=$M_{red}$+$N_{red}$, $Q_{red}$=$M_{red}$*$N_{red}$, $M_{red}$=4, $N_{red}$=4
        $P_{red}$=$M_{red}$+$N_{red}$=4+4=8 samples in the boundary, with $P_{red}$<P
        $P_{red}$=8 multiplications for each of the $Q_{red}$=16 values of the 4×4 reduced block to be predicted (formed by grey squares in scheme 106),
        a total number of $P_{red}$*$Q_{red}$=8*16=128 multiplications (much less than 1024!)
        the ratio between the number of multiplications and the number of final values to be obtained is $P_{red}$*$Q_{red}$/Q=128/64=2 (much less than the 16 obtained without the present technique!).
    Accordingly, the herewith presented technique is 8 times less power-demanding than the previous one.

FIG. 7.3 shows another example (which may be based on the method 820), in which the block 18 to be predicted is a rectangular 4×8 block (M=8, N=4) with Q=4*8=32 samples to be predicted. The boundary 17 is formed by the horizontal row 17c with N=8 samples and the vertical column 17a with M=4 samples. Hence, a priori, the boundary vector 17P would have dimension P×1=12×1, while the prediction ALWIP matrix should be a Q×P=32×12 matrix, hence causing the need of Q*P=32*12=384 multiplications.

However, it is possible, for example, to average or downsample at least the 8 samples of the horizontal row 17c, to obtain a reduced horizontal row with only 4 samples (e.g., averaged samples). In some examples, the vertical column 17a would remain as it is (e.g. without averaging). In total, the reduced boundary would have dimension $P_{red}$=8, with $P_{red}$<P. Accordingly, the boundary vector 17P will have dimension $P_{red}$×1=8×1. The ALWIP prediction matrix 17M will be a matrix with dimensions M*$N_{red}$*$P_{red}$=4*4*8=64. The 4×4 reduced block (formed by the grey columns in the schema 107), directly obtained at the subjecting step 812, will have size $Q_{red}$=M*$N_{red}$=4*4=16 samples (instead of the Q=4*8=32 of the original 4×8 block 18 to be predicted). Once the reduced 4×4 block is obtained by ALWIP, it is possible to add an offset value $b_k$ (step 812c) and to perform interpolations at step 813. As can be seen at step 813 in FIG. 7.3, the reduced 4×4 block is expanded to the 4×8 block 18, where the values 108', non-obtained at step 812, are obtained at step 813 by interpolating the values 118' and 118" (grey squares) obtained at step 812.

Hence, a comparison between using the present technique and non-using it is:
    Without the present technique:
        Block 18 to be predicted, the block having dimensions M=4, N=8
        Q=M*N=4*8=32 values to be predicted;
        P=M+N=4+8=12 samples in the boundary;
        P=12 multiplications for each of the Q=32 values to be predicted,
        a total number of P*Q=12*32=384 multiplications
        the ratio between the number of multiplications and the number of final values to be obtained is P*Q/Q=12
    With the present technique:
        Block 18 to be predicted, the block having dimensions M=4, N=8
        Q=M*N=4*8=32 values to be predicted at the end;
        but a $Q_{red}$×$P_{red}$=16×8 ALWIP matrix ca be used, with M=4, $N_{red}$=4, $Q_{red}$=M*$N_{red}$=16, $P_{red}$=M+$N_{red}$=4+4=8
        $P_{red}$=M+$N_{red}$=4+4=8 samples in the boundary, with $P_{red}$<P
        $P_{red}$=8 multiplications for each of the $Q_{red}$=16 values of the reduced block to be predicted,
        a total number of $Q_{red}$*$P_{red}$=16*8=128 multiplications (less than 384!)
        the ratio between the number of multiplications and the number of final values to be obtained is $P_{red}$*$Q_{red}$/Q=128/32=4 (much less than the 12 obtained without the present technique!).
    Hence, with the present technique, the computational effort is reduced to one third.

FIG. 7.4 shows a case of a block 18 to be predicted with dimensions M×N=16×16 and having Q=M*N=16*16=256 values to be predicted at the end, with P=M+N=16+16=32 boundary samples. This would lead to a prediction matrix with dimensions Q×P=256×32, which would imply 256*32=8192 multiplications!

However, by applying the method 820, it is possible, at step 811, to reduce (e.g. by averaging or downsampling) the number of boundary samples, e.g., from 32 to 8: for example, for every group 120 of four consecutive samples of the row 17a, one single sample (e.g., selected among the four samples, or the average of the samples) remains. Also for every group of four consecutive samples of the column 17c, one single sample (e.g., selected among the four samples, or the average of the samples) remains.

Here, the ALWIP matrix 17M is a $Q_{red} \times P_{red} = 64 \times 8$ matrix: this comes from the fact that it has been chosen $P_{red} = 8$ (by using 8 averaged or selected samples from the 32 ones of the boundary) and by the fact that the reduced block to be predicted at step 812 is an 8×8 block (in the scheme 109, the grey squares are 64).

Hence, once the 64 samples of the reduced 8×8 block are obtained at step 812, it is possible to derive, at step 813, the remaining $Q - Q_{red} = 256 - 64 = 192$ values 104 of the block 18 to be predicted.

In this case, in order to perform the interpolations, it has been chosen to use all the samples of the boundary column 17a and only alternate samples in the boundary row 17c. other choices may be made.

While with the present method the ratio between the number of multiplications and the number of finally obtained values is $Q_{red} * P_{red}/Q = 8*64/256 = 2$, which is much less than the 32 multiplications for each value without the present technique!

A comparison between using the present technique and non-using it is:
Without the present technique:
  Block 18 to be predicted, the block having dimensions M=16, N=16
  Q=M*N=16*16=256 values to be predicted;
  P=M+N=16*16=32 samples in the boundary;
  P=32 multiplications for each of the Q=256 values to be predicted,
  a total number of P*Q=32*256=8192 multiplications;
  the ratio between the number of multiplications and the number of final values to be obtained is P*Q/Q=32
With the present technique:
  Block 18 to be predicted, the block having dimensions M=16, N=16
  Q=M*N=16*16=256 values to be predicted at the end;
  but a $Q_{red} \times P_{red} = 64 \times 8$ ALWIP matrix to be used, with $M_{red} = 4$, $N_{red} = 4$, $Q_{red} = 8*8 = 64$
  samples to be predicted by ALWIP, $P_{red} = M_{red} + N_{red} = 4 + 4 = 8$
  $P_{red} = M_{red} + N_{red} = 4 + 4 = 8$ samples in the boundary, with $P_{red} < P$
  $P_{red} = 8$ multiplications for each of the $Q_{red} = 64$ values of the reduced block to be predicted,
  a total number of $Q_{red} * P_{red} = 64*4 = 256$ multiplications (less than 8192!)
  the ratio between the number of multiplications and the number of final values to be obtained is $P_{red} * Q_{red}/Q = 8*64/256 = 2$ (much less than the 32 obtained without the present technique!).
Accordingly, the computational power required by the present technique is 16 times less than the traditional technique!

Therefore, it is possible to predict a predetermined block (18) of the picture using a plurality of neighboring samples (17) by
  reducing (100, 813) the plurality of neighboring samples to obtain a reduced set (102) of samples values lower, in number of samples, than compared to the plurality of neighboring samples (17),
  subjecting (812) the reduced set of sample values (102) to a linear or affine linear transformation (19, 17M) to obtain predicted values for predetermined samples (104, 118', 188") of the predetermined block (18).

In particular, it is possible to perform the reducing (100, 813) by downsampling the plurality of neighboring samples to obtain the reduced set (102) of samples values lower, in number of samples, than compared to the plurality of neighboring samples (17).

Alternatively, it is possible to perform the reducing (100, 813) by averaging the plurality of neighboring samples to obtain the reduced set (102) of samples values lower, in number of samples, than compared to the plurality of neighboring samples (17).

Further, it is possible to derive (813), by interpolation, prediction values for further samples (108, 108') of the predetermined block (18) on the basis of the predicted values for the predetermined samples (104, 118', 118") and the plurality of neighboring samples (17).

The plurality of neighboring samples (17a, 17c) may extend one-dimensionally along two sides (e.g. towards right and toward below in FIGS. 7.1-7.4) of the predetermined block (18). The predetermined samples (e.g. those which are obtained by ALWIP in step 812) may also be arranged in rows and columns and, along at least one of the rows and columns, the predetermined samples may be positioned at every $n^{th}$ position from a sample (112) of the predetermined sample 112 adjoining the two sides of the predetermined block 18.

Based on the plurality of neighboring samples (17), it is possible to determine for each of the at least one of the rows and the columns, a support value (118) for one (118) of the plurality of neighboring positions, which is aligned to the respective one of the at least one of the rows and the columns. It is also possible to derive, by interpolation, the prediction values 118 for the further samples (108, 108') of the predetermined block (18) on the basis of the predicted values for the predetermined samples (104, 118', 118") and the support values for the neighboring samples (118) aligned to the at least one of rows and columns.

The predetermined samples (104) may be positioned at every $n^{th}$ position from the sample (112) which adjoins the two sides of the predetermined block 18 along the rows and the predetermined samples are positioned at every $m^{th}$ position from the sample (112) of the predetermined sample which (112) adjoins the two sides of the predetermined block (18) along the columns, wherein n, m>1. In some cases, n=m (e.g., in FIGS. 7.2 and 7.3, where the samples 104, 118', 118", directly obtained by ALWIP at 812 and indicated with grey squares, are alternated, along rows and columns, to the samples 108, 108' subsequently obtained at step 813).

Along at least one of the rows (17c) and columns (17a), it may be possible to perform the determining the support values e.g. by downsampling or averaging (122), for each support value, a group (120) of neighboring samples within the plurality of neighboring samples which includes the neighboring sample (118) for which the respective support value is determined. Hence, in FIG. 7.4, at step 813 it is possible to obtain the value of sample 119 by using the values of the predetermined sample 118''' (previously obtained at step 812) and the neighboring sample 118 as support values.

The plurality of neighboring samples may extend one-dimensionally along two sides of the predetermined block (18). It may be possible to perform the reduction (811) by grouping the plurality of neighboring samples (17) into groups (110) of one or more consecutive neighboring samples and performing a downsampling or an averaging on each of the group (110) of one or more neighboring samples which has two or more than two neighboring samples.

In examples, the linear or affine linear transformation may comprise $P_{red}*Q_{red}$ or $P_{red}*Q$ weighting factors with $P_{red}$ being the number of sample values (102) within the reduced set of sample values and $Q_{red}$ or Q is the number predetermined samples within the predetermined block (18). At least $\frac{1}{4}$ $P_{red}*Q_{red}$ Or $\frac{1}{4}$ $P_{red}*Q$ weighting factors are non-zero weighting values. The $P_{red}*Q_{red}$ or $P_{red}*Q$ weighting factors may comprise, for each of the Q or $Q_{red}$ predetermined samples, a series of $P_{red}$ weighting factors relating to the respective predetermined sample, wherein the series, when being arranged one below the other according to a raster scan order among the predetermined samples of the predetermined block (18), form an envelope which is omni-directionally non-linear. The $P_{red}*Q$ or $P_{red}*Q_{red}$ weighting factors may be unrelated to each other via any regular mapping rule.

A mean of maxima of cross correlations between a first series of weighting factors relating to the respective predetermined sample, and a second series of weighting factors relating to predetermined samples other than the respective predetermined sample, or a reversed version of the latter series, whatever leads to a higher maximum, is lower than a predetermined threshold. The predetermined threshold may 0.3 [or in some cases 0.2 or 0.1]. The $P_{red}$ neighboring samples (17) may be located along a one-dimensional path extending along two sides of the predetermined block (18) and, for each of the Q or $Q_{red}$ predetermined samples, the series of $P_{red}$ weighting factors relating to the respective predetermined sample are ordered in a manner traversing the one-dimensional path in a predetermined direction.

6.1 Description of a Method and Apparatus

For predicting the samples of a rectangular block of width W (also indicated with N) and height H (also indicated with M), Affine-linear weighted intra prediction (ALWIP) may take one line of H reconstructed neighboring boundary samples left of the block and one line of W reconstructed neighboring boundary samples above the block as input. If the reconstructed samples are unavailable, they may be generated as it is done in the conventional intra prediction.

A generation of the prediction signal (e.g., the values for the complete block 18) may be based on at least some of the following three steps:

1. Out of the boundary samples 17, samples 102 (e.g., four samples in the case of W=H=4 and/or eight samples in other case) may be extracted by averaging or down-sampling (e.g., step 811).
2. A matrix vector multiplication, followed by addition of an offset, may be carried out with the averaged samples (or the samples remaining from downsampling) as an input. The result may be a reduced prediction signal on a subsampled set of samples in the original block (e.g., step 812).
3. The prediction signal at the remaining position may be generated, e.g. by upsampling, from the prediction signal on the subsampled set, e.g., by linear interpolation (e.g., step 813).

Thanks to steps 1. (811) and/or 3. (813), the total number of multiplications needed in the computation of the matrix-vector product may be such that it is always smaller or equal than 4*W*H. Moreover, the averaging operations on the boundary and the linear interpolation of the reduced prediction signal are carried out by solely using additions and bit-shifts. In other words, in examples at most four multiplications per sample are needed for the ALWIP modes.

In some examples, the matrices (e.g., 17M) and offset vectors (e.g., $b_k$) needed to generate the prediction signal may be taken from sets (e.g., three sets), e.g., $S_0$, $S_1$, $S_2$, of matrices which may be stored, for example, in storage unit(s) of the decoder and of the encoder.

In some examples, the set $S_0$ may comprise (e.g., consist of) $n_0$ (e.g., $n_0=16$ or $n_0=18$ or another number) matrices $A_0^i$, $i \in \{0, \ldots, n_0-1\}$ each of which may have 16 rows and 4 columns and 18 offset vectors $b_0^i$, $i \in \{0, \ldots, n_0-1\}$ each of size 16 to perform the technique according to FIG. 7.1. Matrices and offset vectors of this set are used for blocks 18 of size 4×4. Once the boundary vector has been reduced to a $P_{red}=4$ vector (as for step 811 of FIG. 7.1), it is possible to map the $P_{red}=4$ samples of the reduced set of samples 102 directly into the Q=16 samples of the 4×4 block 18 to be predicted.

In some examples, the set $S_1$ may comprise (e.g., consist of) $n_1$ (e.g., $n_1=8$ or $n_1=18$ or another number) matrices $A_1^i$, $i \in \{0, \ldots, n_1-1\}$, each of which may have 16 rows and 8 columns and 18 offset vectors $b_1^i$, $i \in \{0, \ldots, n_1-1\}$ each of size 16 to perform the technique according to FIG. 7.2 or 7.3. Matrices and offset vectors of this set $S_1$ may be used for blocks of sizes 4×8, 4×16, 4×32, 4×64, 16×4, 32×4, 64×4, 8×4 and 8×8. Additionally, it may also be used for blocks of size W×H with max (W, H)>4 and min (W, H)=4, i.e. for blocks of size 4×16 or 16×4, 4×32 or 32×4 and 4×64 or 64×4. The 16×8 matrix refers to the reduced version of the block 18, which is a 4×4 block, as obtained in FIGS. 7.2 and 7.3.

Additionally or alternatively, the set $S_2$ may comprise (e.g., consists of) $n_2$ (e.g., $n_2=6$ or $n_2=18$ or another number) matrices $A_2^i$, $i \in \{0, \ldots, n_2-1\}$, each of which may have 64 rows and 8 columns and of 18 offset vectors $b_2^i$, $i \in \{0, \ldots, n_2-1\}$ of size 64. The 64×8 matrix refers to the reduced version of the block 18, which is an 8×8 block, e.g. as obtained in FIG. 7.4. Matrices and offset vectors of this set may be used for blocks of sizes 8×16, 8×32, 8×64, 16×8, 16×16, 16×32, 16×64, 32×8, 32×16, 32×32, 32×64, 64×8, 64×16, 64×32, 64×64.

Matrices and offset vectors of that set or parts of these matrices and offset vectors may be used for all other block-shapes.

6.2 Averaging or Downsampling of the Boundary

Here, features are provided regarding step 811.

As explained above, the boundary samples (17a, 17c) may be averaged and/or downsampled (e.g., from P samples to $P_{red} < P$ samples).

In a first step, the input boundaries $bdry^{top}$ (e.g., 17c) and $bdry^{left}$ (e.g., 17a) may be reduced to smaller boundaries $bdry_{red}^{top}$ and $bdry_{red}^{left}$ to arrive at the reduced set 102. Here, $bdry_{red}^{top}$ and $bdry_{red}^{left}$ both consists of 2 samples in the case of a 4×4-block and both consist of 4 samples in other cases.

In the case of a 4×4-block, it is possible to define $$bdry_{red}^{top}[0] = (bdry^{top}[0] + bdry^{top}[1] + 1) \gg 1,$$

$$bdry_{red}^{top}[1] = (bdry^{top}[2] + bdry^{top}[3] + 1) \gg 1,$$

and define $bdry_{red}^{left}$ analogously. Accordingly, $bdry_{red}^{top}[0]$, $bdry_{red}^{top}[1]$, $bdry_{red}^{left}[0]$ $bdry_{red}^{left}[1]$ are average values obtained e.g. using bit-shifting operations In all other cases (e.g., for blocks of wither width or height different from 4), if the block-width W is given as $W=4*2^k$, for $0 \leq i < 4$ one defines $$bdry_{red}^{top}[i] = \left(\left(\sum_{j=0}^{2^k-1} bdry^{top}[i*2^k + j]\right) + 1 \ll (k-1)\right) \gg k.$$

and defines $bdry_{red}^{left}$ analogously.

In still other cases, it is possible to downsample the boundary (e.g., by selecting one particular boundary sample from a group of boundary samples) to arrive at a reduce number of samples. For example, $bdry_{red}^{top}[0]$ may be chosen among $bdry^{top}[0]$ and $bdry^{top}[1]$, and $bdry_{red}^{top}[1]$ may be chosen among $bdry^{top}[2]$ and $bdry^{top}[3]$. It is also possible to define $bdry_{red}^{left}$ analogously.

The two reduced boundaries $bdry_{red}^{top}$ and $bdry_{red}^{left}$ may be concatenated to a reduced boundary vector $bdry_{red}$ (associated to the reduced set 102), also indicated with 17P. The reduced boundary vector $bdry_{red}$ may be thus of size four ($P_{red}=4$) for blocks of shape 4×4 (example of FIG. 7.1) and of size eight ($P_{red}=8$) for blocks of all other shapes (examples of FIG. 7.2-7.4).

Here, if mode<18 (or the number of matrixes in the set of matrixes), it is possible to define $$bdry_{red}=[bdry_{red}^{top}, bdry_{red}^{left}].$$

If mode≥18, which corresponds to the transposed mode of mode—17, it is possible to define $$bdry_{red}=[bdry_{red}^{left}, bdry_{red}^{top}].$$

Hence, according to a particular state (one state: mode<18; one other state: mode≥18) it is possible to distribute the predicted values of the output vector along a different scan order (e.g., one other scan order: $[bdry_{red}^{top}, bdry_{red}^{left}]$; one scan order: $[bdry_{red}^{left}, bdry_{red}^{top}]$).

Other strategies may be carried out. In other examples, the mode index 'mode' is not necessarily in the range 0 to 35 (other ranges may be defined). Further, it is not necessary that each of the three sets $S_0$, $S_1$, $S_2$ has 18 matrixes (hence, instead of expressions like mode≥18, it is possible to mode≥$n_0$, $n_1$, $n_2$, which are the number of matrixes for each set of matrixes $S_0$, $S_1$, $S_2$, respectively). Further, the sets may have different numbers of matrixes each (for example, it may be that $S_0$ has 16 matrixes $S_1$ has eight matrixes, and $S_2$ has six matrixes).

The mode and transposed information are not necessarily stored and/or transmitted as one combined mode index 'mode': in some examples there is the possibility of signalling explicitly as a transposed flag and the matrix index (0-15 for $S_0$, 0-7 for $S_1$ and 0-5 for $S_2$).

In some cases, the combination of the transposed flag and matrix index may be interpreted as a set index. For example, there may be one bit operating as transposed flag, and some bits indicating the matrix index, collectively indicated as "set index".

6.3 Generation of the Reduced Prediction Signal by Matrix Vector Multiplication Here, features are provided regarding step 812.

Out of the reduced input vector $bdry_{red}$ (boundary vector 17P) one may generate a reduced prediction signal $pred_{red}$. The latter signal may be a signal on the downsampled block of width $W_{red}$ and height $H_{red}$. Here, $W_{red}$ and $H_{red}$ may be defined as:

$$W_{red} = 4, H_{red} = 4; \text{ if } max(W, H) \leq 8,$$

$$W_{red} = min(W, 8), H_{red} = min(H, 8); \text{ else.}$$

The reduced prediction signal $pred_{red}$ may be computed by calculating a matrix vector-product and adding an offset:

$$pred_{red}=A \cdot bdry_{red}+b.$$

Here, A is a matrix (e.g., prediction matrix 17M) that may have $W_{red}*H_{red}$ rows and 4 columns if W=H=4 and 8 columns in all other cases and b is a vector that may be of size $W_{red}*H_{red}$.

If W=H=4, then A may have 4 columns and 16 rows and thus 4 multiplications per sample may be needed in that case to compute $pred_{red}$. In all other cases, A may have 8 columns and one may verify that in these cases one has $8*W_{red}*H_{red} \leq 4*W*H$, i.e. also in these cases, at most 4 multiplications per sample are needed to compute $pred_{red}$.

The matrix A and the vector b may be taken from one of the sets $S_0$, $S_1$, $S_2$ as follows. One defines an index idx=idx (W, H) by setting idx(W, H)=0, if W=H=4, idx(W, H)=1, if max (W, H)=8 and idx(W, H)=2 in all other cases. Moreover, one may put m=mode, if mode<18 and m=mode−17, else. Then, if idx≤1 or idx=2 and min(W, H)>4, one may put $A=A_{idx}^m$ and $b=b_{idx}^m$. In the case that idx=2 and min(W, H)=4, one lets A be the matrix that arises by leaving out every row of $A_{idx}^m$ that, in the case W=4, corresponds to an odd x-coordinate in the downsampled block, or, in the case H=4, corresponds to an odd y-coordinate in the downsampled block. If mode≥18, one replaces the reduced prediction signal by its transposed signal. In alternative examples, different strategies may be carried out. For example, instead of reducing the size of a larger matrix ("leave out"), a smaller matrix of $S_1$ (idx=1) with $W_{red}=4$ and $H_{red}=4$ is used. I.e., such blocks are now assigned to $S_1$ instead of $S_2$.

Other strategies may be carried out. In other examples, the mode index 'mode' is not necessarily in the range 0 to 35 (other ranges may be defined). Further, it is not necessary that each of the three sets $S_0$, $S_1$, $S_2$ has 18 matrices (hence, instead of expressions like mode<18, it is possible to mode<$n_0$, $n_1$, $n_2$, which are the number of matrixes for each set of matrixes $S_0$, $S_1$, $S_2$, respectively). Further, the sets may have different numbers of matrixes each (for example, it may be that $S_0$ has 16 matrixes $S_1$ has eight matrixes, and $S_2$ has six matrixes).

6.4 Linear Interpolation to Generate the Final Prediction Signal

Here, features are provided regarding step 812.

Interpolation of the subsampled prediction signal, on large blocks a second version of the averaged boundary may be needed. Namely, if min(W, H)>8 and W≥H, one writes $W=8*2^l$, and for $0 \leq i < 8$ defines $$bdry_{redII}^{top}[i] = \left(\left(\sum_{j=0}^{2^l-1} bdry^{top}[i*2^l + j]\right) + 1 \ll (l-1)\right) \gg l.$$

If min(W, H)>8 and H>W, one defines $bdry_{redII}^{left}$ analogously.

In addition or alternative, it is possible to have a "hard downsampling", in which the $bdry_{redII}^{top}[i]$ is equal to $$bdry_{redII}^{top}[i] = bdry^{top}[(i+1)*2^l - 1].$$

Also, $bdry_{redII}^{left}$ can be defined analogously.

At the sample positions that were left out in the generation of pred$_{red}$, the final prediction signal may arise by linear interpolation from pred$_{red}$ (e.g., step 813 in examples of FIGS. 7.2-7.4). This linear interpolation may be unnecessary, in some examples if W=H=4 (e.g., example of FIG. 7.1).

The linear interpolation may be given as follows (other examples are notwithstanding possible). It is assumed that W≥H. Then, if H>H$_{red}$, a vertical upsampling of pred$_{red}$ may be performed. In that case, pred$_{red}$ may be extended by one line to the top as follows. If W=8, pred$_{red}$ may have width W$_{red}$=4 and may be extended to the top by the averaged boundary signal bdry$_{red}$$^{top}$, e.g. as defined above. If W>8, pred$_{red}$ is of width W$_{red}$=8 and it is extended to the top by the averaged boundary signal bdry$_{redII}$$^{top}$, e.g. as defined above. One may write pred$_{red}$ [x][−1] for the first line of pred$_{red}$. Then the signal pred$_{red}$$^{ups,ver}$ on a block of width W$_{red}$ and height 2*H$_{red}$ may be given as $$pred_{red}^{ups,ver}[x][2*y+1] = pred_{red}[x][y],$$

$$pred_{red}^{ups,ver}[x][2*y] = (pred_{red}[x][y-1] + pred_{red}[x][y]+1) \gg 1,$$

where 0≤x<W$_{red}$ and 0≤y<H$_{red}$. The latter process may be carried out k times until 2$^{k}$*H$_{red}$=H. Thus, if H=8 or H=16, it may be carried out at most once. If H=32, it may be carried out twice. If H=64, it may be carried out three times. Next, a horizontal upsampling operation may be applied to the result of the vertical upsampling. The latter upsampling operation may use the full boundary left of the prediction signal. Finally, if H>W, one may proceed analogously by first upsampling in the horizontal direction (if required) and then in the vertical direction.

This is an example of an interpolation using reduced boundary samples for the first interpolation (horizontally or vertically) and original boundary samples for the second interpolation (vertically or horizontally). Depending on the block size, only the second or no interpolation is required. If both horizontal and vertical interpolation is required, the order depends on the width and height of the block.

However, different techniques may be implemented: for example, original boundary samples may be used for both the first and the second interpolation and the order may be fixed, e.g. first horizontal then vertical (in other cases, first vertical then horizontal).

Hence, the interpolation order (horizontal/vertical) and the use of reduced/original boundary samples may be varied.

6.5 Illustration of an Example of the Entire ALWIP Process

The entire process of averaging, matrix-vector-multiplication and linear interpolation is illustrated for different shapes in FIGS. 7.1-7.4. Note, that the remaining shapes are treated as in one of the depicted cases.

1. Given a 4×4 block, ALWIP may take two averages along each axis of the boundary by using the technique of FIG. 7.1. The resulting four input samples enter the matrix-vector-multiplication. The matrices are taken from the set S$_0$. After adding an offset, this may yield the 16 final prediction samples. Linear interpolation is not necessary for generating the prediction signal. Thus, a total of (4*16)/(4*4)=4 multiplications per sample are performed. See, for example, FIG. 7.1.

2. Given an 8×8 block, ALWIP may take four averages along each axis of the boundary. The resulting eight input samples enter the matrix-vector-multiplication, by using the technique of FIG. 7.2. The matrices are taken from the set S$_1$. This yields 16 samples on the odd positions of the prediction block. Thus, a total of (8*16)/(8*8)=2 multiplications per sample are performed. After adding an offset, these samples may be interpolated, e.g., vertically by using the top boundary and, e.g., horizontally by using the left boundary. See, for example, FIG. 7.2.

3. Given an 8×4 block, ALWIP may take four averages along the horizontal axis of the boundary and the four original boundary values on the left boundary by using the technique of FIG. 7.3. The resulting eight input samples enter the matrix-vector-multiplication. The matrices are taken from the set S$_1$. This yields 16 samples on the odd horizontal and each vertical positions of the prediction block. Thus, a total of (8*16)/(8*4)=4 multiplications per sample are performed. After adding an offset, these samples are interpolated horizontally by using the left boundary, for example. See, for example, FIG. 7.3.
   The transposed case is treated accordingly.

4. Given a 16×16 block, ALWIP may take four averages along each axis of the boundary. The resulting eight input samples enter the matrix-vector-multiplication by using the technique of FIG. 7.2. The matrices are taken from the set S$_2$. This yields 64 samples on the odd positions of the prediction block. Thus, a total of (8*64)/(16*16)=2 multiplications per sample are performed. After adding an offset, these samples are interpolated vertically by using the top boundary and horizontally by using the left boundary, for example. See, for example, FIG. 7.2. See, for example, FIG. 7.4.
   For larger shapes, the procedure may be essentially the same and it is easy to check that the number of multiplications per sample is less than two.
   For W×8 blocks, only horizontal interpolation is necessary as the samples are given at the odd horizontal and each vertical positions. Thus, at most (8*64)/(16*8)=4 multiplications per sample are performed in these cases.
   Finally for W×4 blocks with W>8, let A$_k$ be the matrix that arises by leaving out every row that correspond to an odd entry along the horizontal axis of the downsampled block. Thus, the output size may be 32 and again, only horizontal interpolation remains to be performed. At most (8*32)/(16*4)=4 multiplications per sample may be performed.
   The transposed cases may be treated accordingly.

6.6 Number of Parameters Needed and Complexity Assessment

The parameters needed for all possible proposed intra prediction modes may be comprised by the matrices and offset vectors belonging to the sets S$_0$, S$_1$, S$_2$. All matrix-coefficients and offset vectors may be stored as 10-bit values. Thus, according to the above description, a total number of 14400 parameters, each in 10-bit precision, may be needed for the proposed method. This corresponds to 0,018 Megabyte of memory. It is pointed out that currently, a CTU of size 128×128 in the standard 4:2:0 chroma-subsampling consists of 24576 values, each in 10 bit.

Thus, the memory requirement of the proposed intra-prediction tool does not exceed the memory requirement of the current picture referencing tool that was adopted at the last meeting. Also, it is pointed out that the conventional intra prediction modes require four multiplications per sample due to the PDPC tool or the 4-tap interpolation filters for the angular prediction modes with fractional angle positions. Thus, in terms of operational complexity the proposed method does not exceed the conventional intra prediction modes.

6.7 Signalization of the Proposed Intra Prediction Modes

For luma blocks, 35 ALWIP modes are proposed, for example, (other numbers of modes may be used). For each Coding Unit (CU) in intra mode, a flag indicating if an ALWIP mode is to be applied on the corresponding Prediction Unit (PU) or not is sent in the bitstream. The signalization of the latter index may be harmonized with MRL in the same way as for the first CE test. If an ALWIP mode is to be applied, the index predmode of the ALWIP mode may be signaled using an MPM-list with 3 MPMS.

Here, the derivation of the MPMs may be performed using the intra-modes of the above and the left PU as follows. There may be tables, e.g. three fixed tables $\text{map\_angular\_to\_alwip}_{idx}$, $idx \in \{0,1,2\}$ that may assign to each conventional intra prediction mode $\text{predmode}_{Angular}$ an ALWIP mode $$\text{predmode}_{ALWIP} = \text{map\_angular\_to\_alwip}_{idx}[\text{predmode}_{Angular}].$$

For each PU of width W and height H one defines and index $$\text{idx}(PU) = \text{idx}(W,H) \in \{0,1,2\}$$

that indicates from which of the three sets the ALWIP-parameters are to be taken as in section 4 above. If the above Prediction Unit $PU_{above}$ is available, belongs to the same CTU as the current PU and is in intra mode, if $\text{idx}(PU) = \text{idx}(PU_{above})$ and if ALWIP is applied on $PU_{above}$ with ALWIP-mode $\text{predmode}_{ALWIP}{}^{above}$, one puts $$\text{mode}_{ALWIP}{}^{above} = \text{predmode}_{ALWIP}{}^{above}.$$

If the above PU is available, belongs to the same CTU as the current PU and is in intra mode and if a conventional intra prediction mode $\text{predmode}_{Angular}{}^{above}$ is applied on the above PU, one puts $$\text{mode}_{ALWIP}{}^{above} = \text{map\_angular\_to\_alwip}_{idx(PU_{above})}[\text{predmode}_{Angular}{}^{above}].$$

In all other cases, one puts $$\text{mode}_{ALWIP}{}^{above} = -1$$

which means that this mode is unavailable. In the same way but without the restriction that the left PU needs to belong to the same CTU as the current PU, one derives a mode $$\text{mode}_{ALWIP}{}^{left}.$$

Finally, three fixed default lists $\text{list}_{idx}$, $idx \in \{0,1,2\}$ are provided, each of which contains three distinct ALWIP modes. Out of the default list $\text{list}_{idx(PU)}$ and the modes $\text{mode}_{ALWIP}{}^{above}$ and $\text{mode}_{ALWIP}{}^{left}$, one constructs three distinct MPMs by substituting −1 by default values as well as eliminating repetitions.

6.8 Adapted MPM-List Derivation for Conventional Luma and Chroma Intra-Prediction Modes The proposed ALWIP-modes may be harmonized with MPM-based coding of the conventional intra-prediction modes as follows. The luma and chroma MPM-list derivation processes for the conventional intra-prediction modes may use fixed tables $\text{map\_lwip\_to\_angular}_{idx}$, $idx \in \{0,1,2\}$, mapping an ALWIP-mode $\text{predmode}_{LWIP}$ on a given PU to one of the conventional intra-prediction modes $$\text{predmode}_{Angular} = \text{map\_lwip\_to\_angular}_{idx(PU)}[\text{predmode}_{LWIP}].$$

For the luma MPM-list derivation, whenever a neighboring luma block is encountered which uses an ALWIP-mode $\text{predmode}_{LWIP}$, this block may be treated as if it was using the conventional intra-prediction mode $\text{predmode}_{Angular}$. For the chroma MPM-list derivation, whenever the current luma block uses an ALWIP-mode, the same mapping may be used to translate the ALWIP-mode to a conventional intra prediction mode.

7 IMPLEMENTATION EFFICIENT EMBODIMENTS

Let's briefly summarize the above examples as they might form a basis for further extending the embodiments described herein below.

For predicting a predetermined block 18 of the picture 10, using a plurality of neighboring samples 17a,c is used.

A reduction 100, by averaging, of the plurality of neighboring samples has been done to obtain a reduced set 102 of samples values lower, in number of samples, than compared to the plurality of neighboring samples. This reduction is optional in the embodiments herein and yields the so called sample value vector mentioned in the following. The reduced set of sample values is the subject to a linear or affine linear transformation 19 to obtain predicted values for predetermined samples 104 of the predetermined block. It is this transformation, later on indicated using matrix A and offset vector b which has been obtained by machine learning (ML) and should be implementation efficiently preformed.

By interpolation, prediction values for further samples 108 of the predetermined block are derived on the basis of the predicted values for the predetermined samples and the plurality of neighboring samples. It should be said that, theoretically, the outcome of the affine/linear transformation could be associated with non-full-pel sample positions of block 18 so that all samples of block 18 might be obtained by interpolation in accordance with an alternative embodiment. No interpolation might be necessary at all, too.

The plurality of neighboring samples might extend one-dimensionally along two sides of the predetermined block, the predetermined samples are arranged in rows and columns and, along at least one of the rows and columns, wherein the predetermined samples may be positioned at every $n^{th}$ position from a sample (112) of the predetermined sample adjoining the two sides of the predetermined block. Based on the plurality of neighboring samples, for each of the at least one of the rows and the columns, a support value for one (118) of the plurality of neighboring positions might be determined, which is aligned to the respective one of the at least one of the rows and the columns, and by interpolation, the prediction values for the further samples 108 of the predetermined block might be derived on the basis of the predicted values for the predetermined samples and the support values for the neighboring samples aligned to the at least one of rows and columns. The predetermined samples may be positioned at every $n^{th}$ position from the sample 112 of the predetermined sample which adjoins the two sides of the predetermined block along the rows and the predetermined samples may be positioned at every $m^{th}$ position from the sample 112 of the predetermined sample which adjoins the two sides of the predetermined block along the columns, wherein n,m>1. It might be that n=m. Along at least one of the rows and column, the determination of the support values may be done by averaging (122), for each support value, a group 120 of neighboring samples within the plurality of neighboring samples which includes the neighboring sample 118 for which the respective support value is determined. The plurality of neighboring samples may extend one-dimensionally along two sides of the predetermined block and the reduction may be done by grouping the plurality of neighboring samples into groups 110 of one or more consecutive neighboring samples and performing an averaging on each of the group of one or more neighboring samples which has more than two neighboring samples.

For the predetermined block, a prediction residual might be transmitted in the data stream. It might be derived therefrom at the decoder and the predetermined block be reconstructed using the prediction residual and the predicted values for the predetermined samples. At the encoder, the prediction residual is encoded into the data stream at the encoder.

The picture might be subdivided into a plurality of blocks of different block sizes, which plurality comprises the predetermined block. Then, is might be that the linear or affine linear transformation for block 18 is selected depending on a width W and height H of the predetermined block such that the linear or affine linear transformation selected for the predetermined block is selected out of a first set of linear or affine linear transformations as long as the width W and height H of the predetermined block are within a first set of width/height pairs and a second set of linear or affine linear transformations as long as the width W and height H of the predetermined block are within a second set of width/height pairs which is disjoint to the first set of width/height pairs. Again, later on it gets clear that the affine/linear transformations are represented by way of other parameters, namely weights of C and, optionally, offset and scale parameters.

Decoder and encoder may be configured to subdivide the picture into a plurality of blocks of different block sizes, which comprises the predetermined block, and to select the linear or affine linear transformation depending on a width W and height H of the predetermined block such that the linear or affine linear transformation selected for the predetermined block is selected out of a first set of linear or affine linear transformations as long as the width W and height H of the predetermined block are within a first set of width/height pairs, a second set of linear or affine linear transformations as long as the width W and height H of the predetermined block are within a second set of width/height pairs which is disjoint to the first set of width/height pairs, and a third set of linear or affine linear transformations as long as the width W and height H of the predetermined block are within a third set of one or more width/height pairs, which is disjoint to the first and second sets of width/height pairs.

The third set of one or more width/height pairs merely comprises one width/height pair, W', H', and each linear or affine linear transformation within first set of linear or affine linear transformations is for transforming N' sample values to W'*H' predicted values for an W'×H' array of sample positions.

Each of the first and second sets of width/height pairs may comprise a first width/height pairs $W_p,H_p$ with $W_p$ being unequal to $H_p$ and a second width/height pair $W_q,H_q$ with $H_q=W_p$ and $W_q=H_p$.

Each of the first and second sets of width/height pairs may additionally comprise a third width/height pairs $W_p,H_p$ with $W_p$ being equal to $H_p$ and $H_p>H_q$.

For the predetermined block, a set index might be transmitted in the data stream, which indicates which linear or affine linear transformation to be selected for block 18 out of a predetermined set of linear or affine linear transformations.

The plurality of neighboring samples may extend one-dimensionally along two sides of the predetermined block and the reduction may be done by, for a first subset of the plurality of neighboring samples, which adjoin a first side of the predetermined block, grouping the first subset into first groups 110 of one or more consecutive neighboring samples and, for a second subset of the plurality of neighboring samples, which adjoin a second side of the predetermined block, grouping the second subset into second groups 110 of one or more consecutive neighboring samples and performing an averaging on each of the first and second groups of one or more neighboring samples which has more than two neighboring samples, so as to obtain first sample values from the first groups and second sample values for the second groups. Then, the linear or affine linear transformation may be selected depending on the set index out of a predetermined set of linear or affine linear transformations such that two different states of the set index result into a selection of one of the linear or affine linear transformations of the predetermined set of linear or affine linear transformations, the reduced set of sample values may be subject to the predetermined linear or affine linear transformation in case of the set index assuming a first of the two different states in form of a first vector to yield an output vector of predicted values, and distribute the predicted values of the output vector along a first scan order onto the predetermined samples of the predetermined block and in case of the set index assuming a second of the two different states in form of a second vector, the first and second vectors differing so that components populated by one of the first sample values in the first vector are populated by one of the second sample values in the second vector, and components populated by one of the second sample values in the first vector are populated by one of the first sample values in the second vector, so as to yield an output vector of predicted values, and distribute the predicted values of the output vector along a second scan order onto the predetermined samples of the predetermined block which is transposed relative to the first scan order.

Each linear or affine linear transformation within first set of linear or affine linear transformations may be for transforming $N_1$ sample values to $w_1*h_1$ predicted values for an $w_1×h_1$ array of sample positions and each linear or affine linear transformation within first set of linear or affine linear transformations is for transforming $N_2$ sample values to $w_2*h_2$ predicted values for an $w_2×h_2$ array of sample positions, wherein for a first predetermined one of the first set of width/height pairs, $w_1$ may exceed the width of the first predetermined width/height pair or $h_1$ may exceed the height of the first predetermined width/height pair, and for a second predetermined one of the first set of width/height pairs neither $w_1$ may exceed the width of the second predetermined width/height pair nor $h_1$ exceeds the height of the second predetermined width/height pair. The reducing (100), by averaging, the plurality of neighboring samples to obtain the reduced set (102) of samples values might then be done so that the reduced set 102 of samples values has $N_1$ sample values if the predetermined block is of the first predetermined width/height pair and if the predetermined block is of the second predetermined width/height pair, and the subjecting the reduced set of sample values to the selected linear or affine linear transformation might be performed by using only a first sub-portion of the selected linear or affine linear transformation which is related to a subsampling of the $w_1 \times h_1$ array of sample positions along width dimension if $w_1$ exceeds the width of the one width/height pair, or along height dimension if $h_1$ exceeds the height of the one width/height pair if the predetermined block is of the first predetermined width/height pair, and the selected linear or affine linear transformation completely if the predetermined block is of the second predetermined width/height pair.

Each linear or affine linear transformation within first set of linear or affine linear transformations may be for transforming $N_1$ sample values to $w_1 * h_1$ predicted values for an $w_1 \times h_1$ array of sample positions with $w_1 = h_1$ and each linear or affine linear transformation within first set of linear or affine linear transformations is for transforming $N_2$ sample values to $w_2 * h_2$ predicted values for an $w_2 \times h_2$ array of sample positions with $w_2 = h_2$.

All of the above described embodiments are merely illustrative in that they may form the basis for the embodiment described herein below. That is, above concepts and details shall serve to understand the following embodiments and shall serve as a reservoir of possible extensions and amendments of the embodiments described herein below. In particular, many of the above described details are optional such as the averaging of neighboring samples, the fact the neighboring samples are used as reference samples and so forth.

More generally, the embodiments described herein assume that a prediction signal on a rectangular block is generated out of already reconstructed samples such as an intra prediction signal on a rectangular block is generated out of neighboring, already reconstructed samples left and above the block. The generation of the prediction signal is based on the following steps.

1. Out of the reference samples, called boundary sample now without, however, excluding the possibility of transferring the description to reference samples positioned elsewhere, samples may be extracted by averaging. Here, the averaging is carried out either for both the boundary samples left and above the block or only for the boundary samples on one of the two sides. If no averaging is carried out on a side, the samples on that side are kept unchanged.

2. A matrix vector multiplication, optionally followed by addition of an offset, is carried out where the input vector of the matrix vector multiplication is either the concatenation of the averaged boundary samples left of the block and the original boundary samples above the block if averaging was applied only on the left side, or the concatenation of the original boundary samples left of the block and the averaged boundary samples above the block if averaging was applied only on the above side or the concatenation of the averaged boundary samples left of the block and the averaged boundary samples above the block if averaging was applied on both sides of the block. Again, alternatives would exist, such as ones where averaging isn't used at all.

3. The result of the matrix vector multiplication and the optional offset addition may optionally be a reduced prediction signal on a subsampled set of samples in the original block. The prediction signal at the remaining positions may be generated from the prediction signal on the subsampled set by linear interpolation.

The computation of the matrix vector product in Step 2 should preferably be carried out in integer arithmetic. Thus, if $x = (x_1, \ldots, x_n)$ denotes the input for the matrix vector product, i.e. x denotes the concatenation of the (averaged) boundary samples left and above the block, then out of x, the (reduced) prediction signal computed in Step 2 has should be computed using only bit shifts, the addition of offset vectors, and multiplications with integers. Ideally, the prediction signal in Step 2 would be given as $Ax+b$ where b is an offset vector that might be zero and where A is derived by some machine-learning based training algorithm. However, such a training algorithm usually only results in a matrix $A = A_{float}$ that is given in floating point precision. Thus, one is faced with the problem to specify integer operations in the aforementioned sense such that the expression $A_{float}x$ is well approximated using these integer operations. Here, it is important to mention that these integer operations are not necessarily chosen such that they approximate the expression $A_{float}x$ assuming a uniform distribution of the vector x but typically take into account that the input vectors x for which the expression $A_{float}x$ is to be approximated are (averaged) boundary samples from natural video signals where one can expect some correlations between the components $x_i$ of x.

Figure 8:
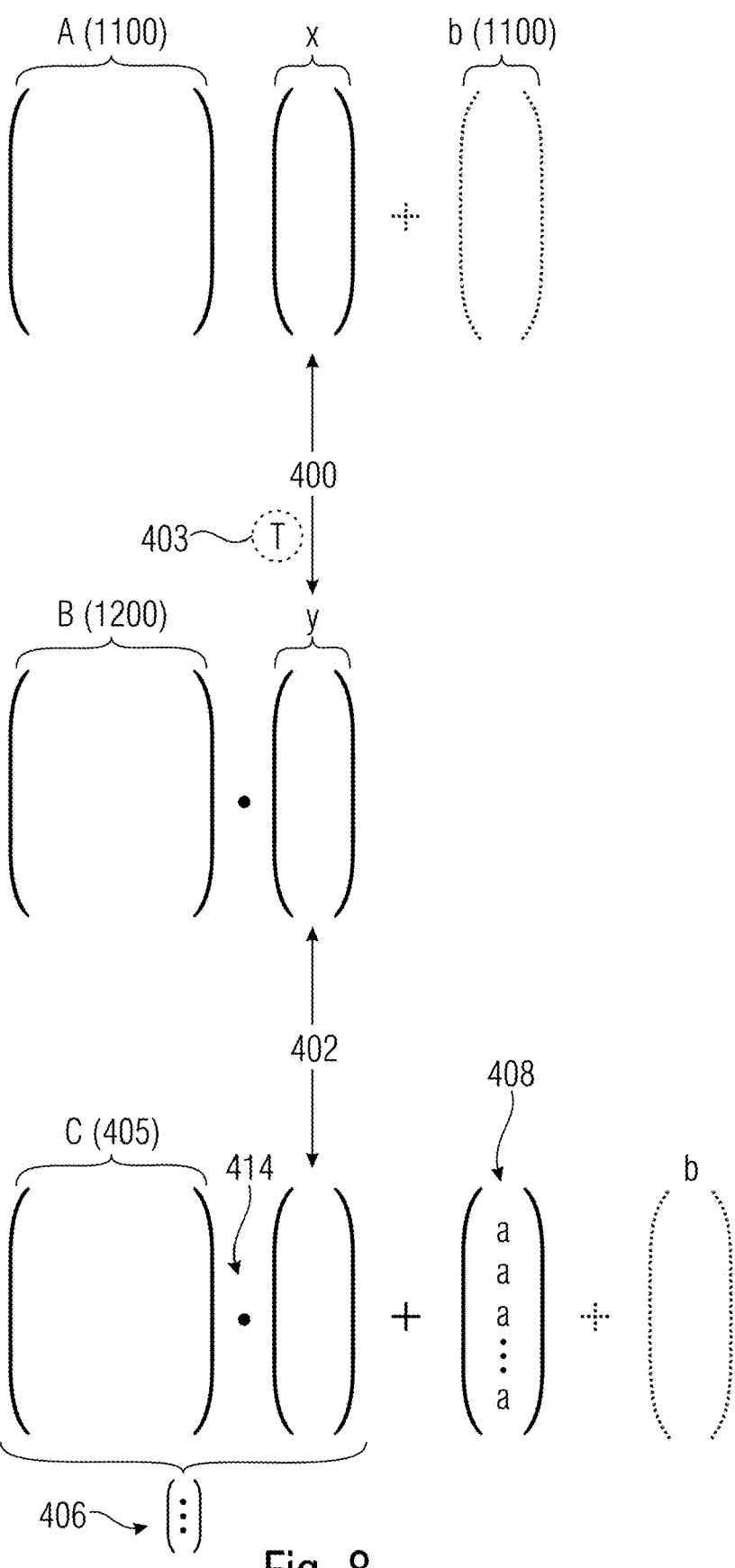
FIG. 8 shows matrix operations performed by an apparatus according to an embodiment.

FIG. 8 shows an improved ALWIP-prediction. Samples of a predetermined block can be predicted based on a first matrix-vector product between a matrix A 1100 derived by some machine-learning based training algorithm and a sample value vector 400. Optionally an offset b 1110 can be added. To achieve an integer approximation or a fixed-point approximation of this first matrix-vector product, the sample value vector can undergo an invertible linear transformation 403 to determine a further vector 402. A second matrix-vector product between a further matrix B 1200 and the further vector 402 can equal the result of the first matrix-vector product.

Because of the features of the further vector 402 the second matrix-vector product can be integer approximated by a matrix-vector product 404 between a predetermined prediction matrix C 405 and the further vector 402 plus a further offset 408. The further vector 402 and the further offset 408 can consist of integer or fixed-point values. All components of the further offset are, for example, the same. The predetermined prediction matrix 405 can be a quantized matrix or a matrix to be quantized. The result of the matrix-vector product 404 between the predetermined prediction matrix 405 and the further vector 402 can be understood as a prediction vector 406.

In the following more details regarding this integer approximation are provided.

Possible Solution According to an Example I:
Subtracting and Adding Mean Values

Figure 9A:
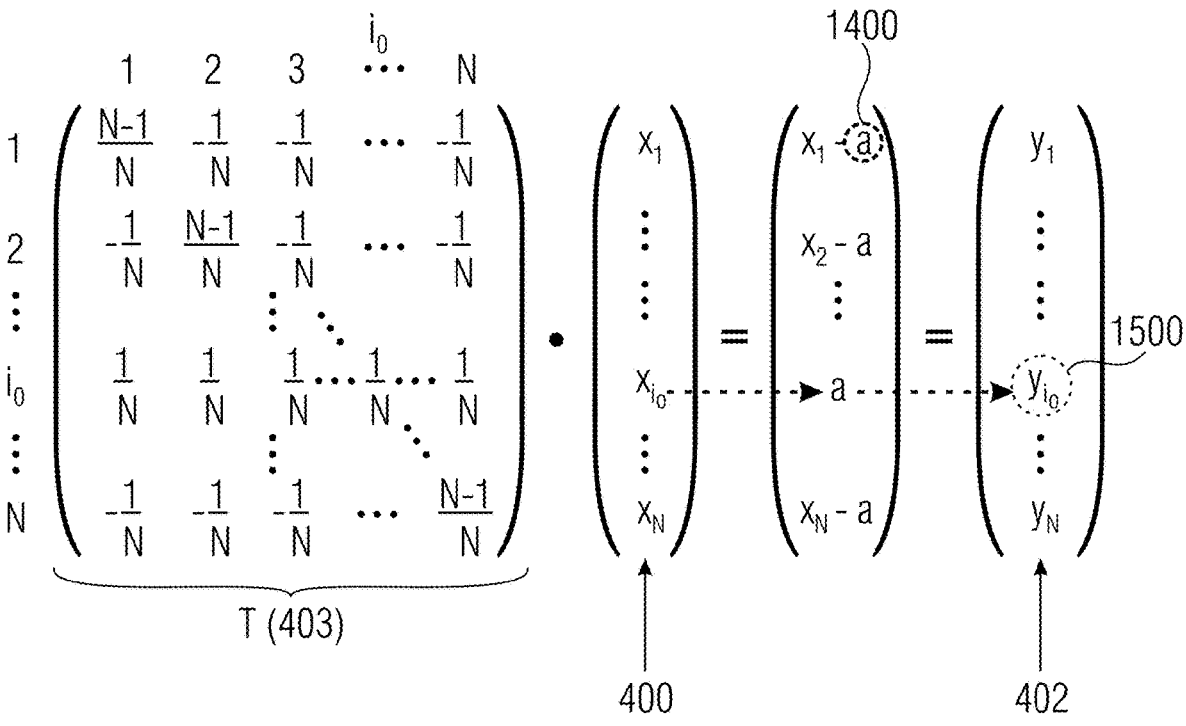
FIG. 9*a-c* show detailed matrix operations performed by an apparatus according to an embodiment.

One possible incorporation of an integer approximation of an expression $A_{float}x$ useable in a scenario above is to replace the $i_0$-th component $x_{i_0}$, i.e. a predetermined component 1500, of x, i.e. the sample value vector 400, by the mean value mean (x), i.e. a predetermined value 1400, of the components of x and to subtract this mean value from all other components. In other words, the invertible linear transform 403, as shown in FIG. 9a, is defined such that a predetermined component 1500 of the further vector 402 becomes a, and each of other components of the further vector 402, except the predetermined component 1500, equal a corresponding component of the sample value vector minus a, wherein a is a predetermined value 1400 which is, for example, an average, such as an arithmetic mean or weighted average, of components of the sample value vector 400. This operation on the input is given by an invertible transform T 403 that has an obvious integer implementation in particular if the dimension n of x is a power of two.

Figures 9B, 9C:
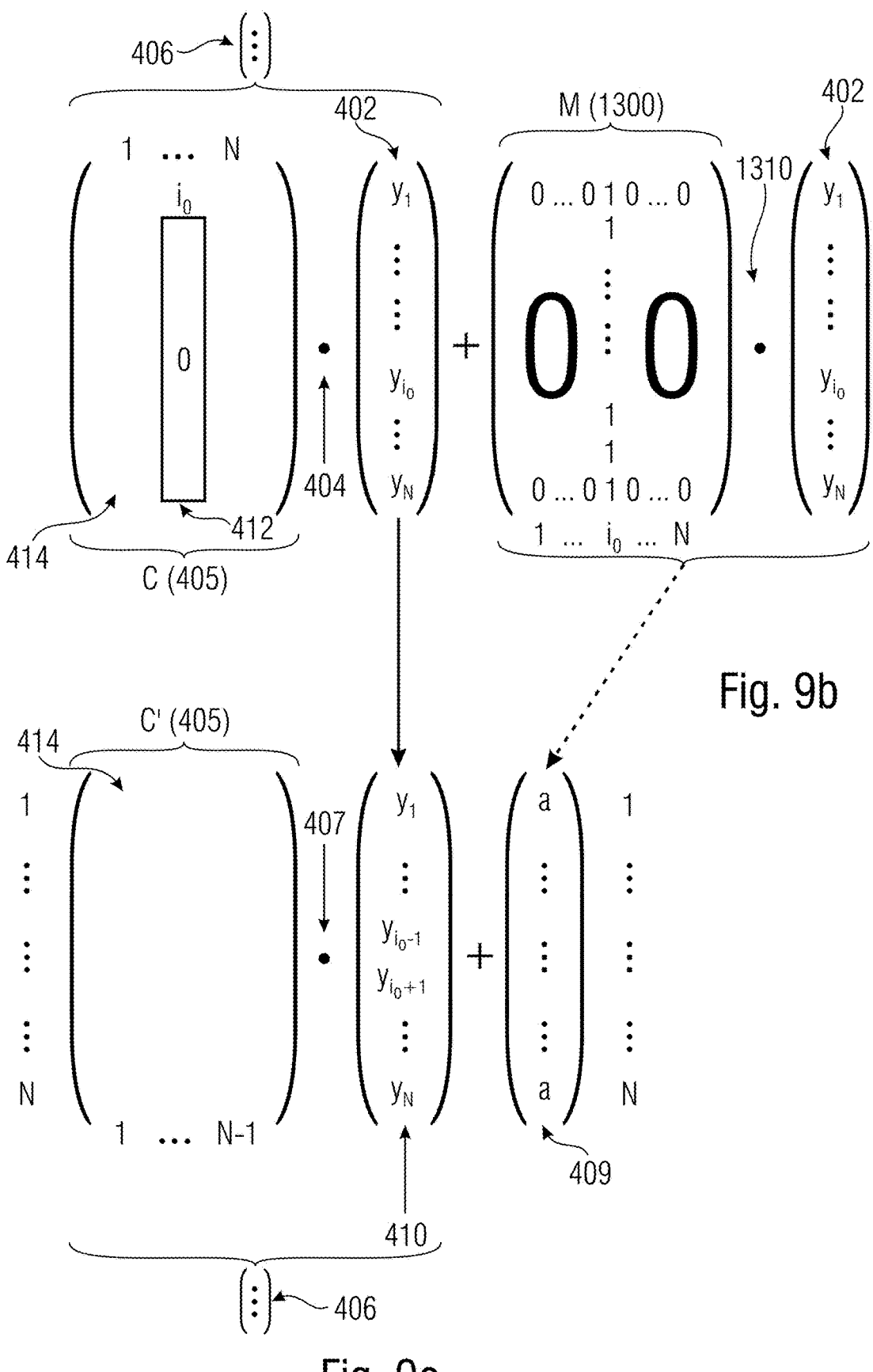

Since $A_{float}=(A_{float}T^{-1})T$, if one does such a transformation on the input x, one has to find an integral approximation of the matrix vector product By, where $B=(A_{float}T^{-1})$ and y=Tx. Since the matrix-vector product $A_{float}x$ represents a prediction on a rectangular block, i.e. a predetermined block, and since x is comprised by (e.g., averaged) boundary samples of that block, one should expect that in the case where all sample values of x are equal, i.e. where $x_i$=mean (x) for all i, each sample value in the prediction signal $A_{float}x$ should be close to mean(x) or be exactly equal to mean(x). This means that one should expect that the $i_0$-th column, i.e. the column corresponding to the predetermined component, of B is very close or equal to a column that consist only of ones. Thus, if $M(i_0)$, i.e. an integer matrix 1300, is the matrix whose $i_0$th column consists of ones and all of whose other columns are zero, writing $By=Cy+M(i_0)y$ with $C=B-M(i_0)$, one should expect that the $i_0$-th column of C, i.e. the predetermined prediction matrix 405, has rather small entries or is zero, as shown in FIG. 9b. Moreover, since the components of x are correlated, one can expect that for each $i\neq i_0$, the i-th component $y_i=x_i-\text{mean}(x)$ of y often has a much smaller absolute value than the i-th component of x. Since the matrix $M(i_0)$ is an integer matrix, an integer approximation of By is achieved if an integer approximation of Cy is given and, by the above arguments, one can expect that the quantization error that arises by quantizing each entry of C in a suitable way should only marginally impact the error in the resulting quantization of By resp. of $A_{float}x$.

In another possible incorporation of an integer approximation of an expression $A_{float}x$, the $i_0$-th component $x_{i_0}$ of x remains unaltered and the same value $x_{i_0}$ is subtracted from all other components. That is, $y_{i_0}=x_{i_0}$ and $y_i=i_i-x_{i_0}$ for each $i\neq i_0$. In other words, the predetermined value 1400 can be a component of the sample value vector 400 corresponding to the predetermined component 1500.

Alternatively, the predetermined value 1400 is a default value or a value signaled in a data stream into which a picture is coded.

It is, for example, advantageous if the predetermined value 1400 has a small deviation from prediction values of samples of the predetermined block.

According to an embodiment, an apparatus is configured to comprise a plurality of invertible linear transforms 403, each of which is associated with one component of the further vector 402. Furthermore, the apparatus is, for example, configured to select the predetermined component 1500 out of the components of the sample value vector 400 and use the invertible linear transform 403 out of the plurality of invertible linear transforms which is associated with the predetermined component 1500 as the predetermined invertible linear transform. This is, for example, due to different positions of the $i_0^{th}$ row, i.e. a row of the invertible linear transform 403 corresponding to the predetermined component, dependent on a position of the predetermined component in the further vector. If, for example, the first component, i.e. $y_1$, of the further vector 402 is the predetermined component, the $i_0^{th}$ row would replace the first row of the invertible linear transform.

As shown in FIG. 9b, matrix components 414 of the predetermined prediction matrix C 405 within a column 412, i.e. an $i_0^{th}$ column, of the predetermined prediction matrix 405 which corresponds to the predetermined component 1500 of the further vector 402 are, for example, all zero. In this case, the apparatus is, for example, configured to compute the matrix-vector product 404 by performing multiplications by computing a matrix vector product 407 between a reduced prediction matrix C' 405 resulting from the predetermined prediction matrix C 405 by leaving away the column 412 and an even further vector 410 resulting from the further vector 402 by leaving away the predetermined component 1500, as shown in FIG. 9c. Thus a prediction vector 406 can be calculated with less multiplications.

As shown in FIGS. 8, 9b and 9c, an apparatus can be configured to, in predicting the samples of the predetermined block on the basis of the prediction vector 406, compute for each component of the prediction vector 406 a sum of the respective component and a, i.e. the predetermined value 1400. This summation can be represented by a sum of the prediction vector 406 and a vector 409 with all components of the vector 409 being equal to the predetermined value 1400, as shown in FIG. 8 and FIG. 9c. Alternatively the summation can be represented by a sum of the prediction vector 406 and a matrix-vector product 1310 between an integer matrix M 1300 and the further vector 402, as shown in FIG. 9b, wherein matrix components of the integer matrix 1300 are 1 within a column, i.e. an $i_0^{th}$ column, of the integer matrix 1300 which corresponds to the predetermined component 1500 of the further vector 402, and all other components are, for example, zero.

A result of a summation of the predetermined prediction matrix 405 and the integer matrix 1300 equals or approximates, for example, the further matrix 1200, shown in FIG. 8.

In other words, a matrix, i.e. the further matrix B 1200, which results from summing each matrix component of the predetermined prediction matrix C 405 within a column 412, i.e. the $i_0^{th}$ column, of the predetermined prediction matrix 405, which corresponds to the predetermined component 1500 of the further vector 402, with one, (i.e. matric B) times the invertible linear transform 403 corresponds, for example, to a quantized version of a machine learning prediction matrix A 1100, as shown in FIG. 8, FIG. 9a and FIG. 9b. The summing of each matrix component of the predetermined prediction matrix C 405 within the $i_0^{th}$ column 412 with one can correspond to the summation of the predetermined prediction matrix 405 and the integer matrix 1300, as shown in FIG. 9b. As shown in FIG. 8 the machine learning prediction matrix A 1100 can equal the result of the further matrix 1200 times the invertible linear transform 403. This is due to $A \cdot x = BT \cdot yT^{-1}$. The predetermined prediction matrix 405 is, for example, a quantized matrix, an integer matrix and/or a fixed-point matrix, whereby the quantized version of the machine learning prediction matrix A 1100 can be realized.

Matrix Multiplication Using Integer Operations Only

For a low complexity implementation (in terms of complexity of adding and multiplying scalar values, as well as in terms of storage required for the entries of the partaking matrix), it is desirable to perform the matrix multiplications 404 using integer arithmetic only.

To calculate an approximation of z=Cy, i.e.

$$z_i = \sum_{j=1}^{n-1} C_{i,j} * y_j,$$

using operations on integers only, the real values $C_{i,j}$ must be mapped to integer values $\hat{C}_{i,j}$, according to an embodiment. This can be done for example by uniform scalar quantization, or by taking into account specific correlations between values $y_i$. The integer values represent, for example fixed-point numbers that can each be stored with a fixed number of bits n_bits, for example n_bits=8.

The matrix vector product 404 with a matrix, i.e. the predetermined prediction matrix 405, of size m×n can then be carried out like shown in this pseudo code, where <<, >> are arithmetic binary left- and right-shift operations and +, − and * operate on integer values only.

```
(1)
final_offset = 1 << (right_shift_result − 1);
for i in 0...m−1
{
    accumulator = 0
    for j in 0...n−1
    {
        accumulator: = accumulator + y[j]*C[i,j]
    }
    z[i] = (accumulator + final_offset) >> right_shift_result;
}
```

Here, the array C, i.e. the predetermined prediction matrix 405, stores the fixed point numbers, for example, as integers. The final addition of final_offset and the right-shift operation with right_shift_result reduce precision by rounding to obtain a fixed point format required at the output.

To allow for an increased range of real values representable by the integers in C, two additional matrices $\text{offset}_{i,j}$ and $\text{scale}_{i,j}$ can be used, as shown in the embodiments of FIG. 10 and FIG. 11, such that each coefficient $b_{i,j}$ of $y_j$ in the matrix-vector product $$z_i = \sum_{j=1}^{n-1} C_{i,j} * y_j$$

is given by $$b_{i,j} = (\hat{C}_{i,j} - \text{offset}_{i,j}) * \text{scale}_{i,j}.$$

The values $\text{offset}_{i,j}$ and $\text{scale}_{i,j}$ are themselves integer values. For example these integers can represent fixed-point numbers that can each be stored with a fixed number of bits, for example 8 bits, or for example the same number of bits n_bits that is used to store the values $\hat{C}_{i,j}$.

In other words, an apparatus is configured to represent the predetermined prediction matrix 405 using prediction parameters, e.g. integer values $\hat{C}_{i,j}$ and the values $\text{offset}_{i,j}$ and $\text{scale}_{i,j}$, and to compute the matrix-vector product 404 by performing multiplications and summations on the components of the further vector 402 and the prediction parameters and intermediate results resulting therefrom, wherein absolute values of the prediction parameters are representable by an n-bit fixed point number representation with n being equal to or lower than 14, or, alternatively, 10, or, alternatively, 8. For instance, the components of the further vector 402 are multiplied with the prediction parameters to yield products as intermediate results which, in turn, are subject to, or form addends of, a summation.

According to an embodiment, the prediction parameters comprise weights each of which is associated with a corresponding matrix component of the prediction matrix. In other words, the predetermined prediction matrix is, for example, replaced or represented by the prediction parameters. The weights are, for example, integer and/or fixed point values.

According to an embodiment, the prediction parameters further comprise one or more scaling factors, e.g. the values $\text{scale}_{i,j}$, each of which is associated with one or more corresponding matrix components of the predetermined prediction matrix 405 for scaling the weight, e.g. an integer value $\hat{C}_{i,j}$, associated with the one or more corresponding matrix component of the predetermined prediction matrix 405. Additionally or Alternatively, the prediction parameters comprise one or more offsets, e.g. the values $\text{offset}_{i,j}$, each of which is associated with one or more corresponding matrix components of the predetermined prediction matrix 405 for offsetting the weight, e.g. an integer value $\hat{C}_{i,j}$, associated with the one or more corresponding matrix component of the predetermined prediction matrix 405.

In order to reduce the amount of storage necessary for $\text{offset}_{i,j}$ and $\text{scale}_{i,j}$, their values can be chosen to be constant for particular sets of indices i,j. For example, their entries can be constant for each column or they can be constant for each row, or they can be constant for all i,j, as shown in FIG. 10.

For example, in one preferred embodiment, $\text{offset}_{i,j}$ and $\text{scale}_{i,j}$ are constant for all values of a matrix of one prediction mode, as shown in FIG. 11. Thus, when there are K prediction modes with with k=0 . . . . K−1, only a single value $o_k$ and a single value $s_k$ is required to calculate the prediction for mode k.

With offset representing $o_k$ and scale representing $s_k$, the calculation in (1) can be modified to be:

```
(2)
final_offset = 0;
for i in 0...n−1
{
    final_offset: = final_offset − y[i];
}
final_offset *= final_offset * offset * scale;
final_offset += 1 << (right_shift_result − 1);
for i in 0...m−1
{
    accumulator = 0
    for j in 0...n−1
    {
        accumulator: = accumulator + y[j]*C[i,j]
    }
    z[i] = (accumulator*scale + final_offset) >> right_shift_result;
}
```

Broadened Embodiments Arising from that Solution

The above solution implies the following embodiments:
1. A prediction method as in Section I, where in Step 2 of Section I, the following is done for an integer approximation of the involved matrix vector product: Out of the (averaged) boundary samples x=(x_1, . . . , x_n), for a fixed $i_0$ with $1 \leq i_0 \leq n$, the vector y=(y_1, . . . , y_n) is computed, where $y_i = x_i - \text{mean}(x)$ for $i \neq i_0$ and where $y_{i_0} = \text{mean}(x)$ and where mean (x) denotes the mean-value of x. The vector y then serves as an input for (an integer realization of) a matrix vector product Cy such that the (downsampled) prediction signal pred from Step 2 of Section I is given as pred=Cy+meanpred(x). In this equation, meanpred(x) denotes the signal that is equal to mean(x) for each sample position in the domain of the (downsampled) prediction signal. (see, e.g., FIG. 9$b$)

2. A prediction method as in Section I, where in Step 2 of Section I, the following is done for an integer approximation of the involved matrix vector product: Out of the (averaged) boundary samples $x=(x_1, \ldots, x_n)$, for a fixed $i_0$ with $1 \leq i_0 \leq n$, the vector $y=(y_1, \ldots, y_{n-1})$ is computed, where $y_i=x_i-\text{mean}(x)$ for $i<i_0$ and where $y_i=x_{i+1}-\text{mean}(x)$ for $i \geq i_0$ and where mean(x) denotes the mean-value of x. The vector y then serves as an input for (an integer realization of) a matrix vector product Cy such that the (downsampled) prediction signal pred from Step 2 of Section I is given as pred=Cy+meanpred(x). In this equation, meanpred(x) denotes the signal that is equal to mean(x) for each sample position in the domain of the (downsampled) prediction signal. (see, e.g., FIG. 9$c$)

3. A prediction method as in Section I, where the integer realization of the matrix vector product Cy is given by using coefficients $b_{i,j}=(\hat{C}_{i,j}-\text{offset}_{i,j})*\text{scale}_{i,j}$ in the matrix-vector product $z_j=\Sigma_j b_{i,j}*y_j$. (see, e.g., FIG. 10)

4. A prediction method as in Section I, where step 2 uses one of K matrices, such that multiple prediction modes can be calculated, each using a different matrix $\hat{C}_k$ with $k=0 \ldots K-1$, where the integer realization of the matrix vector product $C_k$ y is given by using coefficients $b_{i,j}=(\hat{C}_{k,i,j}-\text{offset}_k)*\text{scale}_k$ in the matrix-vector product $z_j=\Sigma_j b_{i,j}*y_j$. (see, e.g., FIG. 11)

That is, in accordance with embodiments of the present application, encoder and decoder act as follows in order to predict a predetermined block 18 of a picture 10, see FIG. 8 in combination with one of FIGS. 7.1 to 7.4. For predicting, a plurality of reference samples is used. As outlined above, embodiments of the present application would not be restricted to intra-coding and accordingly, reference samples would not be restricted to be neighboring samples, i.e. samples of picture 10 neighboring block 18. In particular, the reference samples would not be restricted to the ones arranged alongside an outer edge of block 18 such as samples abutting the block's outer edge. However, this circumstance is certainly one embodiment of the present application.

In order to perform the prediction, a sample value vector 400 is formed out of the reference samples such as reference samples 17a and 17c. A possible formation has been described above. The formation may involve an averaging, thereby reducing the number of samples 102 or the number of components of vector 400 compared to the reference samples 17 contributing to the formation. The formation may also, as described above, somehow depend on the dimension or size of block 18 such as its width and height.

It is this vector 400 which is ought to be subject to an affine or linear transform in order to obtain the prediction of block 18. Different nomenclatures have been used above. Using the most recent one, it is the aim to perform the prediction by applying vector 400 to matrix A by way of a matrix vector product within performing a summation with an offset vector b. The offset vector b is optional. The affine or linear transformation determined by A or A and b, might be determined by encoder and decoder or, to be more precise, for sake of prediction on the basis of the size and dimension of block 18 as already described above.

However, in order to achieve the above-outlined computational efficiency improvement or render the prediction more effective in terms of implementation, the affine or linear transform has been quantized, and encoder and decoder, or the predictor thereof, used the above-mentioned C and T in order to represent and perform the linear or affine transformation, with C and T, applied in the manner described above, representing a quantized version of the affine transformation. In particular, instead of applying vector 400 directly to a matrix A, the predictor in encoder and decoder, applies vector 402 resulting from the sample value vector 400 by way of subjecting same to a mapping via a predetermined invertible linear transform T. It might be that transform T as used here is the same as long as vector 400 has the same size, i.e. does not depend on the block's dimensions, i.e. width and height, or is at least the same for different affine/linear transformations. In the above, vector 402 has been denoted y. The exact matrix in order to perform the affine/linear transform as determined by machine learning would have been B. However, instead of exactly performing B, the prediction in encoder and decoder is done by way of an approximation or quantized version thereof. In particular, the representation is done via appropriately representing C in the manner outlined above with C+M representing the quantized version of B.

Accordingly, the prediction in encoder and decoder is further prosecuted by computing the matric-vector product 404 between vector 402 and the predetermined prediction matrix C appropriately represented and stored at encoder and decoder in the manner described above. The vector 406 which results from this matrix-vector product, is then used for predicting the samples 104 of block 18. As described above, for sake of prediction, each component of vector 406 might be subject to a summation with parameter a as indicated at 408 in order to compensate for the corresponding definition of C. The optional summation of vector 406 with offset vector b may also be involved in the derivation of the prediction of block 18 on the basis of vector 406. It might be that, as described above, each component of vector 406, and accordingly, each component of the summation of vector 406, the vector of all a's indicated at 408 and the optional vector b, might directly correspond to samples 104 of block 18 and, thus, indicate the predicted values of the samples. It may also be that only a sub-set of the block's samples 104 is predicted in that manner and that the remaining samples of block 18, such as 108, are derived by interpolation.

As described above, there are different embodiments for setting a. For instance, it might be the arithmetic mean of the components of vector 400. For that case, see, e.g., FIG. 9. The invertible linear transform T may be as indicated in the FIG. 9$a$. $i_0$ indicates the predetermined component of the sample value vector and vector 402, respectively, which is replaced by a. However, as also indicated above, there are other possibilities. However, as far as the representation of C is concerned, it has also been indicated above that same may be embodied differently. For instance, the matrix-vector product 404 may, in its actual computation, end up in the actual computation of a smaller matrix-vector product with lower dimensionality, see, e.g., FIG. 9$c$. In particular, as indicated above, it might be that owing to the definition of C, its whole $i_0^{th}$ column 412 gets 0 so that the actual computation of product 404 may be done by a reduced version of vector 402 which results from vector 402 by the omission of component $y_{i_0}$, namely by multiplying this reduced vector 410 with the reduced matrix C' resulting from C by leaving out the $i_0^{th}$ column 412.

The weights of C or the weights of C', i.e. the components of this matrix, may be represented and stored in fixed-point number representation. These weights 414 may, however, also, as described above, be stored in a manner related to different scales and/or offsets. Scale and offset might be defined for the whole matrix C, i.e. be equal for all weights 414 of matrix C or matrix C', or may be defined in a manner so as to be constant or equal for all weights 414 of the same row or all weights 414 of the same column of matrix C and matrix C', respectively. FIG. 10 illustrates, in this regard, that the computation of the matrix-vector product, i.e. the result of the product, may in fact be performed slightly different, namely for instance, by shifting the multiplication with the scale(s) towards the vector 402 or 404, thereby reducing the number of multiplications having to be performed further. FIG. 11 illustrates the case of using one scale and one offset for all weights 414 of C or C' such as done in above calculation (2)

8. EMBODIMENTS USING BLOCK-BASED INTRA PREDICTION MODES FOR ALL CHANNELS IN SPECIAL CASES

All the above description shall be seen as optional implementation details for the embodiments described now. Please note that in the following, the term matrix-based intra prediction (MIP) is used to denoted an intra-prediction mode, e.g., a block-based intra prediction mode, which may be embodied or equal those indicated by ALWIP above, e.g., as described with regard to FIGS. 5 to 11.

In this document, for 4:4:4 chroma-format and single tree, it is proposed that on a chroma intra-block for which the chroma-intra mode is the direct mode (DM) mode and for which the luma intra-mode is a MIP mode, the chroma intra prediction signal is to be generated using this MIP mode.

At the direct mode, the chroma-intra prediction mode is, for example, derived from the luma intra prediction mode. For example, the chroma-intra prediction mode equals the luma intra prediction mode. An exception exists for the luma-intra prediction mode being the MIP mode, where the chroma-intra prediction mode is the MIP mode only in case of a 4:4:4 color sampling format and in case of single tree, and in all other cases, the chroma-intra prediction mode is a planar mode. The 4:4:4 color sampling format represents a color sampling format according to which each color component is equally sampled.

8.1 Description of the Proposed Method

In the current VTM, MIP is used only for the luma-component [3]. If on a chroma intra-block the intra-mode is the direct mode (DM) and if the intra-mode of the co-located luma block is an MIP-mode, then the chroma block has to generate the intra-prediction signal using the planar mode. It is asserted that the main reason for this treatment of the DM-mode in the case of MIP is that for the 4:2:0 case or for the case of dual-tree, the co-located luma block can have a different shape than the chroma block. Thus, since an MIP-mode cannot be applied for all block-shapes, the MIP mode of the co-located luma block may not be applicable to the chroma block in that case.

On the other hand, it is asserted that for the case that the chroma format is 4:4:4 and that the single tree is used, the above non-applicability of a luma MIP-mode to the chroma components never holds. Thus, it is proposed that in this case, if on an intra-block the chroma-intra mode is the DM mode and if the luma intra mode is a MIP mode, the chroma intra-prediction signals are to be generated with this MIP mode.

It is asserted that this proposed change is relevant in particular if ACT (adaptive color transform) is enabled since for the case that the ACT is used on a given block, the chroma mode is inferred to be the DM-mode. It is asserted that in particular for the ACT-case, a strong correlation of the prediction signals across all channels is beneficial and that such a correlation can be increased if the same intra-prediction mode is used for all three components of a block. It is asserted that the experimental results reported below support this view in the sense that the proposed changes have a significant impact for camera captured content in the RGB-format, which is asserted to be the intersection of the cases for which MIP and ACT were primarily designed.

8.2 Embodiments of the Proposed Method

Figure 12:
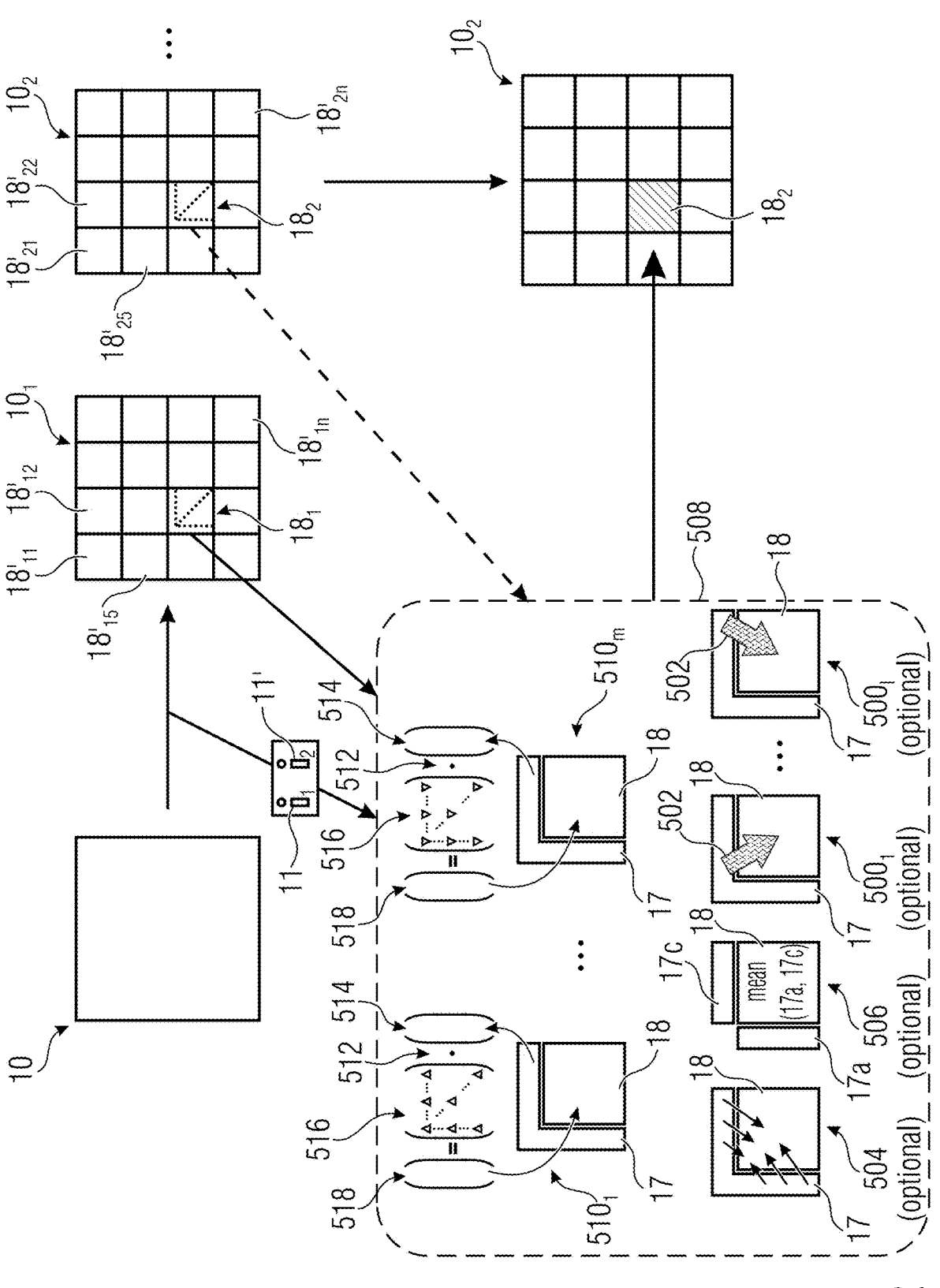
FIG. 12 shows an embodiment of a prediction of a predetermined second color component block of a picture.

FIG. 12 shows an embodiment of a prediction of a predetermined second color component block $18_2$ of a picture 10. A block based decoder, a block based encoder and/or an apparatus for predicting the picture 10 can be configured to perform this prediction.

According to an embodiment, a picture 10 of more than one color component $10_1$, $10_2$ and of a color sampling format 11, according to which each color component $10_1$, $10_2$ is equally sampled, into blocks, e.g., into first color component blocks $18'_{11}$-$18'_{1n}$ and into second color component blocks $18'_{21}$-$18'_{2n}$, using a partitioning scheme 11' according to which the picture 10 is equally partitioned with respect to each color component $10_1$, $10_2$. According to the color sampling format 11, each color component $10_1$, $10_2$ is, for example, equally sampled and, according to the partitioning scheme 11', each color component $10_1$, $10_2$ is, for example, partitioned the same way. Thus, e.g., according to the partitioning scheme 11', the first color component blocks $18'_{11}$-$18'_{1n}$ have same geometric features as the second color component blocks $18'_{21}$-$18'_{2n}$ and, according to the color sampling format 11, the first color component blocks $18'_{11}$-$18'_{1n}$ have the same sampling as the second color component blocks $18'_{21}$-$18'_{2n}$. The sampling is indicated by the sample points in a predetermined second color component block $18_2$ and a co-located intra-predicted first color component block $18_1$.

A first color component $10_1$ of the picture 10 is decoded and/or encoded in units of the blocks with selecting, for each of intra-predicted first color component blocks $18'_{11}$-$18'_{1n}$ of the picture 10, one out of a first set 508 of intra-prediction modes, the first set 508 comprising matrix-based intra prediction modes (MIP modes) $510_1$ to $510_m$ according to each of which a block inner 18 is predicted by deriving a sample value vector 514 out of references samples 17, neighboring the block inner 18, computing a matrix-vector product 512 between the sample value vector 514 and a prediction matrix 516 associated with the respective matrix-based intra prediction mode $510_1$ to $510_m$ so as to obtain a prediction vector 514, and predicting samples in the block inner 18 on the basis of the prediction vector 514. The sample value vector 514 has, for example, the features and/or functionalities as described with regard to the sample value vector 400 in FIG. 6 or as described with regard to the further vector 402 in FIGS. 8 to 11. In other words, the matrix-based intra prediction $510_1$ to $510_m$ is, for example, preformed as described with regard to one of FIGS. 5 to 11.

Optionally, a number of components of the prediction vector 518 is lower than a number of samples in the block inner 18. In this case, the samples in the block inner 18 might be predicted on the basis of the prediction vector 518 by interpolating the samples based on the components of the prediction vector 518 assigned to supporting sample positions in the bock inner 18.

Optionally, the matrix-based intra prediction modes 510₁ to 510ₘ comprised by the first set 508 of intra-prediction modes are selected, depending on block dimensions of the respective intra-predicted first color component block 18₁, so as to be one subset of matrix-based intra prediction modes out of a collection of mutually disjoint subsets of matrix-based intra prediction modes. Prediction matrices 516 associated with the collection of mutually disjoint subsets of matrix-based intra prediction modes, for example, are machine-learned, prediction matrices 516 comprised by one subset of matrix based intra-prediction modes are of mutually equal size, and prediction matrices 516 comprised by two subsets of matrix based intra-prediction modes which are selected for different block sizes are of mutually different size. In other words, prediction matrices comprised by one subset are of mutually equal size, but the prediction matrices of different subsets have different sizes.

Optionally, prediction matrices 516 associated with matrix-based intra prediction modes 510₁ to 510ₘ comprised by the first set 508 of intra-prediction modes are of mutually equal size and machine-learned.

Optionally, intra prediction modes comprised by the first set 508 of intra-prediction modes, other than the matrix-based intra prediction modes 510₁ to 510ₘ comprised by the first set 508 of intra-prediction modes, comprise a DC mode 506, a planar mode 504 and directional modes 500₁ to 500ₗ.

A second color component 102 of the picture 10 is decoded and/or encoded in units of the blocks by intra-predicting a predetermined second color component block 18₂ of the picture 10 using the matrix-based intra prediction mode selected for a co-located intra-predicted first color component block 18₁. Thus, a decoder and/or an encoder needs to be able to adopt the MIP mode 510₁ to 510ₘ for at least one intra coded 2nd/3rd color component block. This is, for example, performed in case of an initial prediction mode of the predetermined second color component block 18₂ being a direct mode.

At the direct mode, the intra prediction mode of the predetermined second color component block 18₂ is, for example, derived from the intra prediction mode of the co-located intra-predicted first color component block 18₁. For example, the intra prediction mode of the predetermined second color component block 18₂ equals the intra prediction mode of the co-located intra-predicted first color component block 18₁. In other words, in case of the intra prediction mode of the co-located intra-predicted first color component block 18₁ being a MIP mode 510₁ to 510ₘ, the predetermined second color component block 18₂ is also predicted by the same MIP mode 510₁ to 510ₘ.

According to an embodiment, the direct mode can be inferred, if no index indicating a prediction mode is signaled for the predetermined second color component block 18₂ in a data stream. Otherwise the mode signaled in the data stream is used for the prediction of the predetermined second color component block 18₂.

In other words, for each of second color component blocks 18'₂₁-18'₂ₙ of the picture 10, one out of a first option and a second option can be selected. According to the first option an intra-prediction mode for the respective second color component block 18'₂₁-18'₂ₙ is derived based on an intra-prediction mode selected for a co-located intra-predicted first color component block 18'₁₁-18'₁ₙ, so that the intra-prediction mode for the respective second color component block 18'₂₁-18'₂ₙ equals the intra-prediction mode selected for the co-located intra-predicted first color component block 18'₁₁-18'₁ₙ in case of the intra-prediction mode selected for the co-located intra-predicted first color component block 18'₁₁-18'₁ₙ is one of the matrix-based intra prediction modes 510₁ to 510ₘ. The intra-prediction mode for the respective second color component block 18'₂₁-18'₂ₙ can also equal the intra-prediction mode selected for the co-located intra-predicted first color component block 18'₁₁-18'₁ₙ in case of the intra-prediction mode selected for the co-located intra-predicted first color component block 18'₁₁-18'₁ₙ is one of other intra prediction modes than the matrix-based intra prediction modes 510₁ to 510ₘ, like a planar intra-prediction mode 504, a DC intra-prediction mode 506 and/or a directional intra-prediction mode 500₁-500ₗ. The first option can represent the direct mode. According to the second option an intra-prediction mode for the respective second color component block 18'₂₁-18'₂ₙ is selected based on an intra mode index present in the data stream for the respective second color component block 18'₂₁-18'₂ₙ. Optionally, the intra mode index is present in the data stream in addition to a further intra mode index present in the data stream for the co-located intra-predicted first color component block 18'₁₁-18'₁ₙ for the selection out of the first set 508 of intra-prediction modes. The intra mode index present in the data stream for the respective second color component block 18'₂₁-18'₂ₙ indicates, for example, a prediction mode out of the first set 508 of intra-prediction modes to be selected for the prediction of the respective second color component block 18'₂₁-18'₂ₙ.

According to an embodiment, an apparatus for predicting a predetermined block of a picture, a block-based decoder and/or a block-based encoder is configured to use the same MIP mode 510₁ to 510ₘ for the predetermined second color component block 18₂ as for the co-located intra-predicted first color component block 18₁ in case of a 4:4:4 color sampling format 11 of the picture 10 and in case of a prediction mode of the predetermined second color component block 18₂ being a direct mode, wherein the co-located intra-predicted first color component block 18₁ and the predetermined second color component block 18₂ represent the predetermined block associated with different color components, i.e. the first color component and the second color component. The co-located intra-predicted first color component block 18₁ and the predetermined second color component block 18₂ comprise, for example, the same geometrical features and the same spatial positioning in the picture 10. In other words, a first color component coding tree, e.g., a luma coding tree, equals a second color component coding tree, e.g., a chroma coding tree. A single tree is, for example, used. The picture 10 is equally partitioned with respect to each color component 10₁, 10₂. The partitioning scheme 11' defines, for example, a single tree treatment of the picture 10.

According to an embodiment, a dual tree treatment of the picture 10 is also possible. The dual tree treatment can be associated with a further partitioning scheme 11' according to which the picture 10 is partitioned with respect to the first color component 10₁ using first partitioning information in a data stream and the picture 10 is partitioned with respect to the second color component 10₂ using second partitioning information which is present in data stream separate from the first partition information.

In case of dual tree or not single tree, the apparatus for predicting a predetermined block of a picture, the block-based decoder and/or the block-based encoder is, for example, configured to use a planar intra prediction mode $504$ in case of the prediction mode of the co-located intra-predicted first color component block $18_1$ being a MIP mode $510_1$ to $510_m$ and the prediction mode of the predetermined second color component block $18_2$ being a direct mode. However, in case of the prediction mode of the co-located intra-predicted first color component block $18_1$ being not a MIP mode, e.g., the prediction mode of the co-located intra-predicted first color component block $18_1$ being a DC intra-prediction mode $506$, a planar intra-prediction mode $504$ or a directional intra-prediction mode $500_1$-$500_l$ (e.g. an angular intra-prediction mode), and the prediction mode of the predetermined second color component block $18_2$ being a direct mode, the prediction mode of the predetermined second color component block $18_2$ equals the prediction mode of the co-located intra-predicted first color component block $18_1$. This can also apply in case of using single tree but not a 4:4:4 color sampling format $11$, e.g., in case of using a 4:1:1 color sampling format $11$, a 4:2:2 color sampling format $11$ or a 4:2:0 color sampling format $11$.

The color sampling format $11$ can be represented by x:y:z, wherein a first number x refers, for example, to the size of a color component block $18'$ and the two following numbers y and z both refer to $2^{nd}$ and/or $3^{rd}$ color component samples. They, i.e. y and z, are both relative to the first number and define the horizontal and vertical sampling respectively. A signal with 4:4:4 has no compression (so it is not sub-sampled) and transports both first color component and further color component data, e.g., $2^{nd}$ and/or $3^{rd}$ color component samples, i.e. chroma samples, entirely. In a four by two array of pixels, 4:2:2 has half the chroma samples of 4:4:4, and 4:2:0 and 4:1:1 have a quarter of the chroma information available. The 4:2:2 signal will have half the sampling rate horizontally, but will maintain full sampling vertically. 4:2:0, on the other hand, will only sample colors out of half the pixels on the first row and ignores the second row of the sample completely and 4:1:1 will only sample a colors of one pixels on the first row and a colors of one pixels on the second row of the sample, i.e. the 4:1:1 signal will have quarter of the sampling rate horizontally, but will maintain full sampling vertically.

According to an embodiment, the apparatus for predicting a predetermined block of a picture, the block-based decoder and/or the block-based encoder is configured to use a prediction mode of the co-located intra-predicted first color component block $18_1$ as a prediction mode of the predetermined second color component block independent of the color sampling format $11$ and/or independent of the partitioning scheme of the picture $10$ with respect to each color component, i.e. using single tree or dual tree, in case of the prediction mode of the co-located intra-predicted first color component block $18_1$ being not a MIP mode $510_1$ to $510_m$, e.g., being a DC intra-prediction mode $506$, a planar intra-prediction mode $504$ or a directional intra-prediction mode $500_1$-$500_l$ and in case of the prediction mode of the predetermined second color component block $18_2$ being the direct mode.

At the DC intra-prediction mode $506$, for example, one value, quasi a DC value, is derived on the basis of neighbouring samples $17$, spatially neighbouring a predetermined block $18$, e.g., the co-located intra-predicted first color component block $18_1$ and/or the predetermined second color component block $18_2$, and this one DC value is attributed to all samples of the predetermined block $18$ so as to obtain the intra-prediction signal.

At the planar intra-prediction mode $504$, for example, a two-dimensional linear function defined by a horizontal slope, a vertical slope and an offset is derived based on neighboring samples $17$, spatially neighbouring a predetermined block $18$, e.g., the co-located intra-predicted first color component block $18_1$ and/or the predetermined second color component block $18_2$, with this linear function defining predicted sample values of the predetermined block $18$.

At directional intra-prediction modes $500_1$-$500_l$, e.g., angular intra-prediction modes, reference samples $17$ neighboring the predetermined block $18$, e.g., the co-located intra-predicted first color component block $18_1$ and/or the predetermined second color component block $18_2$, are used in order to fill the predetermined block $18$ so as to obtain an intra-prediction signal for the predetermined block $18$. In particular, the reference samples $17$ which are arranged alongside a boundary of the predetermined block $18$ such as alongside the upper and left hand edge of the predetermined block $18$, represent picture content which is extrapolated, or copied, along a predetermined direction $502$ into the inner of the predetermined block $18$. Before the extrapolation or copying, the picture content represented by the neighboring samples $17$ might be subject to interpolation filtering or differently speaking may be derived from the neighboring samples $17$ by way of interpolation filtering. The angular intra-prediction modes $500_1$-$500_l$, mutually differ in the intra-prediction direction $502$. Each angular intra-prediction mode $500_1$-$500_l$ may have an index associated with, wherein the association of indexes to the angular intra-prediction modes $500_1$-$500_l$ may be such that the directions $502$, when ordering the angular intra-prediction modes $500_1$-$500_l$ according to the associated mode indexes, monotonically rotate clockwise or anticlockwise.

FIG. $13$ shows the prediction of a predetermined second color component block $18_2$ of a picture $10$ dependent on different partitioning schemes and color sampling formats in more detail.

The prediction is shown for a picture $10a$, a further picture $10b$ and an even further picture $10c$, wherein different conditions are set for the different pictures.

According to an embodiment, an apparatus, e.g., the block based decoder, the block based encoder and/or the apparatus for predicting a picture, comprises or has access to a set $11'$ of partitioning schemes to select and/or obtain a partitioning scheme for a picture $10$. The set $11'$ of partitioning schemes comprises the partitioning scheme $11'_1$, i.e. a first partitioning scheme, according to which the picture $10$ is equally partitioned with respect to each color component $10_1$, $10_2$ and optionally a further partitioning scheme $11'_2$ according to which the picture $10$ is partitioned with respect to the first color component $10_1$ using first partitioning information $11'_{2a}$ in a data stream $12$ and the picture $10$ is partitioned with respect to the second color component $10_2$ using second partitioning information $11'_{2b}$ which is present in the data stream $12$ separate from the first partition information $11'_{2a}$. The first partitioning scheme $11'_1$ can represent a single tree treatment of the picture $10$ and the further partitioning scheme $11'_2$ can represent a dual tree treatment of the picture.

At the further partitioning scheme $11'_2$ the first color component $10_1$ is partitioned differently than the second color component $10_2$. One of the color components $10_1$, $10_2$ can be finely divided and another color component $10_1$, $10_2$ can be roughly divided. It is also possible, that borders of second color component blocks $18'_{21}$-$18'_{24}$ are not located at the same position as borders of first color component blocks $18'_{11}$-$18'_{116}$. Boarders of second color component blocks $18'_{21}$-$18'_{24}$ can pass through block inner of first color component blocks $18'_{11}$-$18'_{116}$, as shown in the $10_{2alternative}$ or at the partitioning of the further picture $10b$.

For the picture $10a$ the same prediction as described with regard to FIG. 12 can be applied, wherein the first partitioning scheme $11'_1$ is selected out of the set $11'$ of partitioning schemes and wherein the color sampling format is used, according to which each color component $10a_1$, $10a_2$ is equally sampled.

Figure 13:
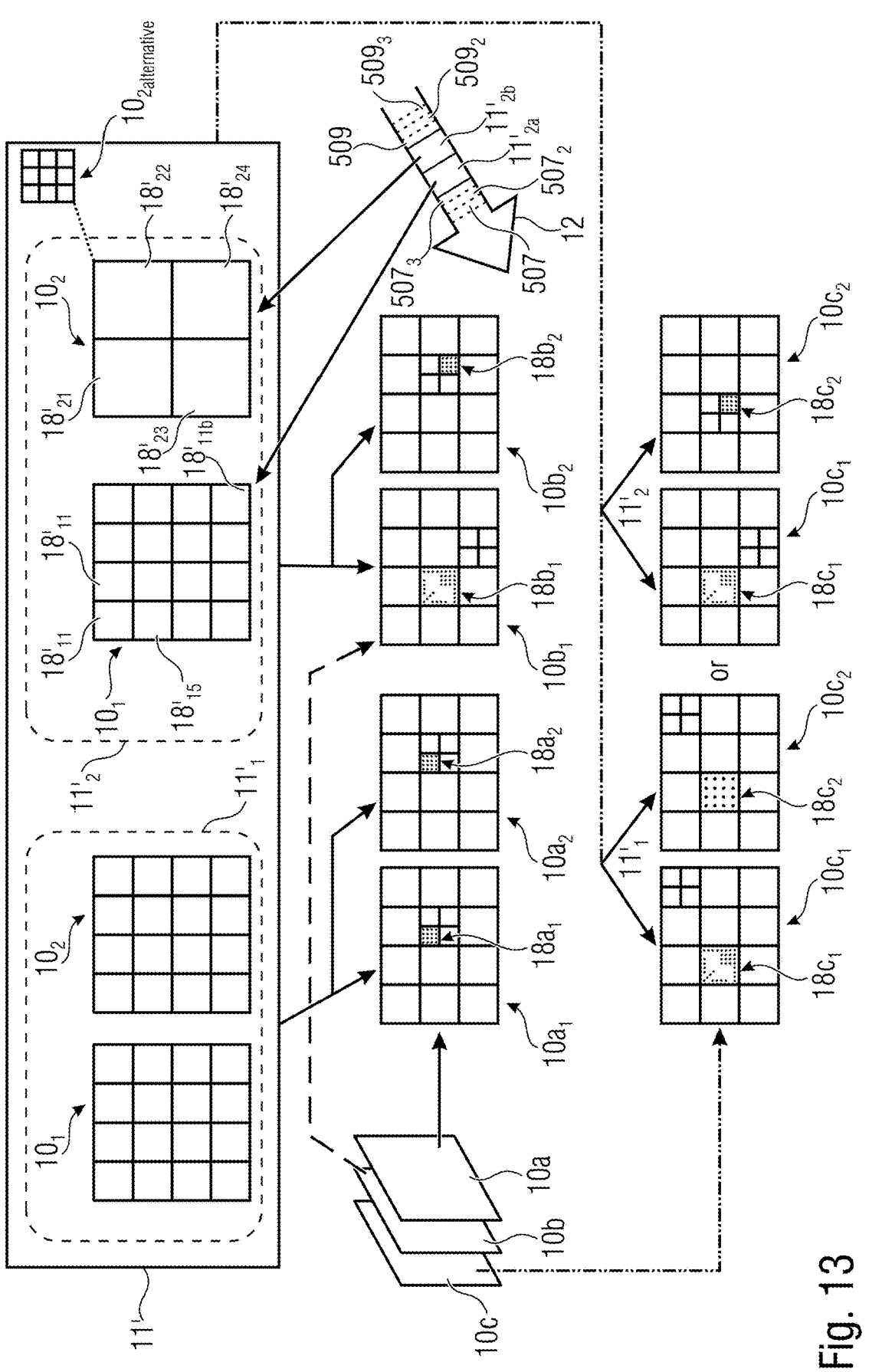
FIG. 13 shows an embodiment of different predictions of a predetermined second color component block of a picture.

The apparatus in FIG. 13 is, for example configured to select for each of intra-predicted second color component blocks of the picture $10a$, one out of a first option and a second option. According to the first option an intra-prediction mode for the respective intra-predicted second color component block, e.g. for a predetermined second color component block $18a_2$, is derived based on an intra-prediction mode selected for a co-located intra-predicted first color component block $18a_1$ in a manner so that the intra-prediction mode for the respective intra-predicted second color component block $18a_2$ equals the intra-prediction mode selected for the co-located intra-predicted first color component block $18a_1$ in case of the intra-prediction mode selected for the co-located intra-predicted first color component block $18a_1$ is one of the matrix-based intra prediction modes $510_1$-$510_m$, as shown in FIG. 12. According to the second option an intra-prediction mode for the respective intra-predicted second color component block $18a_2$ is selected based on an intra mode index $509$ present in the data stream $12$ for the respective intra-predicted second color component block $18a_2$. The intra mode index $509$ is, for example, present in the data stream $12$ in addition to a further intra mode index $507$ present in the data stream $12$ for the co-located intra-predicted first color component block $18a_1$ for the selection out of the first set of intra-prediction modes.

Optionally the apparatus is configured to partition the further picture $10b$ of more than one color component $10b_1$, $10b_2$ and of a color sampling format, according to which each color component is equally sampled, into further blocks using the further partitioning scheme $11'_2$. Thus the first color component $10b_1$ has the same color sampling as the second color component $10b_2$ but different block sizes. As shown in FIG. 13, a predetermined second color component further block $18b_2$ of the further picture $10b$ has, for example, a quarter of the size of a co-located first color component further block $18b_1$ of the further picture $10b$. The further picture $10b$ is, for example, sampled with a 4:4:4 color sampling format.

In case of using the further partitioning scheme $11'_2$ the co-located first color component further block $18b_1$ of the predetermined second color component further block $18b_2$ is, for example, determined based on a pixel positioned in both blocks $18b_1$ and $18b_2$. According to an embodiment, this pixel is positioned on the left top corner, on the right top corner, on the left lower corner, on the right lower corner and/or in the middle of the predetermined second color component further block $18b_2$.

The first color component $10b_1$ of the further picture $10b$ is decoded in units of the further blocks with selecting, for each of intra-predicted first color component further blocks of the further picture $10b$, one out of the first set of intra-prediction modes.

For each of the intra-predicted second color component further blocks of the further picture $10b$, one out of a first option and a second option can be selected. According to the first option an intra-prediction mode for the respective intra-predicted second color component further block, e.g., a predetermined second color component further block $18b_2$, is derived based on an intra-prediction mode selected for a co-located first color component further block $18b_1$ in a manner so that the intra-prediction mode for the respective intra-predicted second color component further block $18b_2$ equals a planar intra-prediction mode $504$ in case of the intra-prediction mode selected for the co-located first color component further block $18b_1$ is one of the matrix-based intra prediction modes $510_1$-$510_m$. In case of the intra-prediction mode selected for the co-located first color component further block $18b_1$ is not one of the matrix-based intra prediction modes $510_1$-$510_m$, e.g. the intra-prediction mode is a planar intra-prediction mode $504$, a DC intra-prediction mode $506$ or a directional intra-prediction mode $500_1$-$500_p$, the intra-prediction mode for the respective intra-predicted second color component further block $18b_2$ equals the intra-prediction mode selected for the co-located first color component further block $18b_1$. According to the second option an intra-prediction mode for the respective intra-predicted second color component further block $18b_2$ is selected based on an intra mode index $509_2$ present in the data stream $12$ for the respective intra-predicted second color component further block $18b_2$. The intra mode index $509_2$ is, for example, present in the data stream $12$ in addition to a further intra mode index $507_2$ present in the data stream $12$ for the co-located intra-predicted first color component further block $18b_1$ for the selection out of the first set of intra-prediction modes.

Optionally, the apparatus is configured to partition the even further picture $10c$ of more than one color component and of a different color sampling format, according to which the more than one color components are differently sampled. As shown in FIG. 13 the first color component $10c_1$ is differently sampled than the second color component $10c_2$. The sampling is indicated by sample points. According to the embodiment shown in FIG. 13 the even further picture is sampled according to a 4:2:1 color sampling format. But it is clear, that also other color sampling formats except for a 4:4:4 color sampling format can be used. This is shown once for the usage of the first partitioning scheme $11'_1$ and once for the usage of the further partitioning scheme $11'_2$. Independent of the partitioning scheme $11'$ the following prediction of the even further picture $10c$ can be performed.

The first color component $10c_1$ of the even further picture $10c$ is decoded in units of the even further blocks with selecting, for each of intra-predicted first color component even further blocks of the even further picture $10c$, one out of the first set of intra-prediction modes.

Furthermore, the apparatus is, for example, configured to select for each of intra-predicted second color component even further blocks of the even further picture $10c$, one out of a first option and a second option. According to the first option an intra-prediction mode for the respective intra-predicted second color component even further block $18c_2$ is derived based on an intra-prediction mode selected for a co-located first color component even further block $18c_1$ in a manner so that the intra-prediction mode for the respective intra-predicted second color component even further block $18c_2$ equals a planar intra-prediction mode $504$ in case of the intra-prediction mode selected for the co-located first color component even further block $18c_1$ is one of the matrix-based intra prediction modes $510_1$-$510_m$. In case of the intra-prediction mode selected for the co-located first color component even further block $18c_1$ is not one of the matrix-based intra prediction modes $510_1$-$510_m$, e.g. the intra-prediction mode is a planar intra-prediction mode $504$, a DC intra-prediction mode $506$ or a directional intra-prediction mode $500_1$-$500_p$, the intra-prediction mode for the respective intra-predicted second color component even further block $18c_2$ equals the intra-prediction mode selected for the co-located first color component further block $18c_1$. According to the second option an intra-prediction mode for the respective intra-predicted second color component even further block $18c_2$ is selected based on an intra mode index $509_3$ present in the data stream for the respective intra-predicted second color component even further block $18c_2$. Optionally, the intra mode index $509_3$ is present in the data stream $12$ in addition to an even further intra mode index $507_3$ present in the data stream $12$ for the co-located intra-predicted first color component even further block $18c_1$ for the selection out of the first set of intra-prediction modes.

According to an embodiment, the selection out of the first and second options depends on a signalization present in the data stream $12$ for the respective intra-predicted second color component block $18a_2$, the respective intra-predicted second color component further block $18b_2$ and/or the respective intra-predicted second color component even further block $18c_2$, if a residual coding color transform mode is signaled to be deactivated for the block $18a_2$, $18b_2$ and/or $18c_2$ in the data stream $12$, e.g. ACT (adaptive color transform) is deactivated. No signalization is necessary, if the residual coding color transform mode is signaled to be activated for the block $18a_2$, $18b_2$ and/or $18c_2$ in the data stream $12$, e.g. ACT (adaptive color transform) is activated. In this case, i.e. the residual coding color transform mode is signaled to be activated for the block $18a_2$, $18b_2$ and/or $18c_2$, e.g. ACT (adaptive color transform) is activated, the apparatus can be configured to infer that the first option is to be selected.

For the case that the ACT is used on a given block, the chroma mode, for example, is inferred to be the DM-mode, i.e. the first option. It is asserted that in particular for the ACT-case, a strong correlation of the prediction signals across all channels is beneficial and that such a correlation can be increased if the same intra-prediction mode is used for all three components of a block. It is asserted that the experimental results reported below support this view in the sense that the proposed changes have a significant impact for camera captured content in the RGB-format, which is asserted to be the intersection of the cases for which MIP and ACT were primarily designed.

8.3 Experimental Results

In this section, experimental results are reported according to the common test conditions for 4:4:4. In Table 1 and Table 2, results are reported for the proposed change compared to the VTM-7.0 anchor for the AI and the RA configuration, respectively. The corresponding simulations were conducted on an Intel Xeon cluster (E5-2697A v4, AVX2 on, turbo boost off) with Linux OS and GCC 7.2.1 compiler. Results are reported for RGB and YUV according to the CE-8 conditions. The single-tree is always enabled since for single-tree off, the proposed change does not change the bit-stream.

TABLE 1

RGB-result of the proposed change: Reference is VTM-8.0 anchor, test is VTM-8.0 with the proposed changes, AI configuration. Single tree is enabled in anchor and test.

| | G | R | B | enc time | dec time |
|---|---|---|---|---|---|
| TGM 1080 | −0.05% | −0.05% | −0.03% | 100% | 101% |
| TGM 720 | −0.49% | −0.35% | −0.31% | 99% | 102% |
| Animation | −1.08% | −1.10% | −0.95% | 101% | 99% |

TABLE 1-continued

RGB-result of the proposed change: Reference is VTM-8.0 anchor, test is VTM-8.0 with the proposed changes, AI configuration. Single tree is enabled in anchor and test.

| | G | R | B | enc time | dec time |
|---|---|---|---|---|---|
| Mixed | −0.81% | −0.74% | −0.65% | 98% | 99% |
| Camera-captured | −3.30% | −0.94% | −1.34% | 95% | 98% |
| Overall | −0.88% | −0.49% | −0.49% | 99% | 101% |
| TGM 1080 | −0.05% | −0.05% | −0.03% | 100% | 101% |
| TGM 720 | −0.49% | −0.35% | −0.31% | 99% | 102% |

TABLE 2

RGB-result of the proposed change: Reference is VTM-8.0 anchor, test is VTM-8.0 with the proposed changes, RA configuration. Single tree is enabled in anchor and test.

| | G | R | B | enc time | dec time |
|---|---|---|---|---|---|
| TGM 1080 | −0.03% | −0.01% | −0.03% | 100% | 100% |
| TGM 720 | −0.30% | −0.22% | −0.29% | 99% | 104% |
| Animation | −0.50% | −0.56% | −0.48% | 98% | 102% |
| Mixed | −0.81% | −0.63% | −0.59% | 99% | 100% |
| Camera-captured | −1.35% | −0.46% | −0.77% | 98% | 98% |
| Overall | −0.50% | −0.31% | −0.36% | 99% | 102% |
| TGM 1080 | −0.03% | −0.01% | −0.03% | 100% | 100% |
| TGM 720 | −0.30% | −0.22% | −0.29% | 99% | 104% |

TABLE 3

YUV-results of the proposed change: Reference is VTM-8.0 anchor, test is VTM-8.0 with the proposed changes, AI configuration. Single tree is enabled in anchor and test.

| | Y | U | V | enc time | dec time |
|---|---|---|---|---|---|
| TGM 1080 | −0.01% | −0.02% | −0.02% | 100% | 101% |
| TGM 720 | −0.08% | 0.01% | −0.04% | 100% | 99% |
| Animation | −0.19% | −0.09% | −0.19% | 100% | 101% |
| Mixed | −0.10% | −0.17% | −0.19% | 100% | 102% |
| Camera-captured | −0.12% | −0.29% | −0.16% | 99% | 99% |
| Overall | −0.09% | −0.09% | −0.11% | 100% | 100% |
| TGM 1080 | −0.01% | −0.02% | −0.02% | 100% | 101% |
| TGM 720 | −0.08% | 0.01% | −0.04% | 100% | 99% |

TABLE 4

YUV-results of the proposed change: Reference is VTM-8.0 anchor, test is VTM-8.0 with the proposed changes, RA configuration. Single tree is enabled in anchor and test.

| | Y | U | V | enc time | dec time |
|---|---|---|---|---|---|
| TGM 1080 | 0.04% | 0.03% | −0.01% | 100% | 103% |
| TGM 720 | −0.03% | 0.06% | −0.08% | 100% | 98% |
| Animation | −0.07% | −0.15% | −0.16% | 99% | 99% |
| Mixed | −0.14% | −0.15% | −0.26% | 100% | 102% |
| Camera-captured | −0.08% | −0.13% | −0.09% | 99% | 101% |
| Overall | −0.05% | −0.05% | −0.11% | 100% | 100% |
| TGM 1080 | 0.04% | 0.03% | −0.01% | 100% | 103% |
| TGM 720 | −0.03% | 0.06% | −0.08% | 100% | 98% |

8.4 Conclusion

In this document, it is proposed to enable MIP for all three channels in the case of 4:4:4 content and single tree. For this case, if on an intra-block the luma component uses a MIP mode and if the chroma intra mode is the DM-mode, it is proposed to generate the chroma intra-prediction signals with this MIP mode. It is proposed to adopt the technology described in the present document to the next working draft of the VVC.

9. REFERENCES

[1] P. Helle et al., "Non-linear weighted intra prediction", JVET-L0199, Macao, China, October 2018.

[2] F. Bossen, J. Boyce, K. Suehring, X. Li, V. Seregin, "JVET common test conditions and software reference configurations for SDR video", JVET-K1010, Ljubljana, SI, July 2018.

[3] B. Bross, J. Chen, S. Liu, Y.-K. Wang, Versatile Video Coding (Draft 7), Document JVET-P2001, Version 14, Geneva, Switzerland, October 2019

[ . . . ] Common test conditions for 4:4:4

FURTHER EMBODIMENTS AND EXAMPLES

Generally, examples may be implemented as a computer program product with program instructions, the program instructions being operative for performing one of the methods when the computer program product runs on a computer. The program instructions may for example be stored on a machine readable medium.

Other examples comprise the computer program for performing one of the methods described herein, stored on a machine-readable carrier.

In other words, an example of method is, therefore, a computer program having program instructions for performing one of the methods described herein, when the computer program runs on a computer.

A further example of the methods is, therefore, a data carrier medium (or a digital storage medium, or a computer-readable medium) comprising, recorded thereon, the computer program for performing one of the methods described herein. The data carrier medium, the digital storage medium or the recorded medium are tangible and/or non-transitionary, rather than signals which are intangible and transitory.

A further example of the method is, therefore, a data stream or a sequence of signals representing the computer program for performing one of the methods described herein. The data stream or the sequence of signals may for example be transferred via a data communication connection, for example via the Internet.

A further example comprises a processing means, for example a computer, or a programmable logic device performing one of the methods described herein.

A further example comprises a computer having installed thereon the computer program for performing one of the methods described herein.

A further example comprises an apparatus or a system transferring (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some examples, a programmable logic device (for example, a field programmable gate array) may be used to perform some or all of the functionalities of the methods described herein. In some examples, a field programmable gate array may cooperate with a microprocessor in order to perform one of the methods described herein. Generally, the methods may be performed by any appropriate hardware apparatus.

The above described examples are merely illustrative for the principles discussed above. It is understood that modifications and variations of the arrangements and the details described herein will be apparent. It is the intent, therefore, to be limited by the scope of the impending claims and not by the specific details presented by way of description and explanation of the examples herein.

Equal or equivalent elements or elements with equal or equivalent functionality are denoted in the following description by equal or equivalent reference numerals even if occurring in different figures.

The invention claimed is:

1. A video decoder comprising one or more processors, the one or more processors configured to:
   determine that a picture is in a 4:4:4 color sampling format;
   determine, based at least in part on an index signaled in a data stream, a matrix-based intra prediction (MIP) mode;
   decode a luma block of the picture using the MIP mode;
   determine, for a chroma block of the picture, whether a coding tree of the chroma block is a single tree;
   select an intra prediction mode for decoding the chroma block; wherein:
      the selected intra prediction mode is the MIP mode in response to the determination that the coding tree of the chroma block is the single tree; and
      the selected intra prediction mode is a planar intra prediction mode in response to the determination that the coding tree of the chroma block is not the single tree; and
   decode the chroma block using the selected intra prediction mode.

2. The video decoder of claim 1, wherein the single tree indicates that the coding tree of the chroma block is the same as a coding tree of the luma block.

3. The video decoder of claim 1, wherein the one or more processors is further configured to:
   determine the MIP mode from a set of MIP modes depending at least in part on dimensions of the luma block.

4. The video decoder of claim 1, wherein to decode the luma block, the one or more processors is further configured to:
   multiply a vector based at least in part on top and left neighboring samples of the luma block by a matrix corresponding to the MIP mode and generate a prediction of the luma block.

5. A video decoding method comprising:
   determining that a picture is in a 4:4:4 color sampling format;
   determining, based at least in part on an index signaled in a data stream, a matrix-based intra prediction (MIP) mode;
   decoding a luma block of the picture using the MIP mode;
   determining, for a chroma block of the picture, whether a coding tree of the chroma block is a single tree;
   selecting an intra prediction mode for decoding the chroma block; wherein:

the selected intra prediction mode is the MIP mode in response to the determination that the coding tree of the chroma block is the single tree; and the selected intra prediction mode is a planar intra prediction mode in response to the determination that the coding tree of the chroma block is not the single tree; and decoding the chroma block using the selected intra prediction mode.

6. The method of claim 5, wherein the single tree indicates that the coding tree of the chroma block is the same as a coding tree of the luma block.

7. The method of claim 5, further comprising determining the MIP mode from a set of MIP modes depending at least in part on dimensions of the luma block.

8. The method of claim 5, wherein decoding the luma block comprises:

multiplying a vector based at least in part on top and left neighboring samples of the luma block by a matrix corresponding to the MIP mode and generating a prediction of the luma block.

9. A non-transitory processor readable medium having stored thereon instructions for causing at least one processor to perform the method of claim 5.

10. A video encoder comprising one or more processors, the one or more processors configured to:

determine that a picture is in a 4:4:4 color sampling format;

signal, in a data stream, an index indicating a matrix-based intra prediction (MIP) mode for encoding a luma block of the picture;

encode the luma block using the MIP mode;

determine, for a chroma block of the picture, whether a coding tree of the chroma block is a single tree;

select an intra prediction mode for encoding the chroma block; wherein:

the selected intra prediction mode is the MIP mode in response to the determination that the coding tree of the chroma block is the single tree; and the selected intra prediction mode is a planar intra prediction mode in response to the determination that the coding tree of the chroma block is not the single tree; and encode the chroma block using the selected intra prediction mode.

11. The video encoder of claim 10, wherein the single tree indicates that the coding tree of the chroma block is the same as a coding tree of the luma block.

12. The video encoder of claim 10, wherein the one or more processors is further configured to:

determine the MIP mode from a set of MIP modes depending at least in part on dimensions of the luma block.

13. The video encoder of claim 10, wherein to encode the luma block, the one or more processors is further configured to:

multiply a vector based at least in part on top and left neighboring samples of the luma block by a matrix corresponding to the MIP mode and generate a prediction of the luma block.

14. A video encoding method comprising:

determining that a picture is in a 4:4:4 color sampling format;

signaling, in a data stream, an index indicating a matrix-based intra prediction (MIP) mode for encoding a luma block of the picture;

encoding the luma block using the MIP mode;

determining, for a chroma block of the picture, whether a coding tree of the chroma block is a single tree;

selecting an intra prediction mode for encoding the chroma block; wherein:

the selected intra prediction mode is the MIP mode in response to the determination that the coding tree of the chroma block is the single tree; and the selected intra prediction mode is a planar intra prediction mode in response to the determination that the coding tree of the chroma block is not the single tree; and encoding the chroma block using the selected intra prediction mode.

15. The method of claim 14, wherein the single tree indicates that the coding tree of the chroma block is the same as a coding tree of the luma block.

16. The method of claim 14, further comprising determining the MIP mode from a set of MIP modes depending at least in part on dimensions of the luma block.

17. The method of claim 14, wherein encoding the luma block comprises:

multiplying a vector based at least in part on top and left neighboring samples of the luma block by a matrix corresponding to the MIP mode and generating a prediction of the luma block.

18. A non-transitory processor readable medium having stored thereon instructions for causing at least one processor to perform the method of claim 14.

* * * * *